(12) United States Patent
Kurotobi et al.

(10) Patent No.: US 12,528,554 B2
(45) Date of Patent: Jan. 20, 2026

(54) ELECTRONIC DEVICE AND SYSTEM FOR WIRELESS CONTROL IN VIEW OF TIRE PRESSURE

(71) Applicant: Shimano Inc., Osaka (JP)

(72) Inventors: Tadaharu Kurotobi, Osaka (JP); Koji Yuasa, Osaka (JP); Satoshi Idogaki, Osaka (JP)

(73) Assignee: Shimano Inc., Osaka (JP)

(*) Notice: Subject to any disclaimer, the term of this patent is extended or adjusted under 35 U.S.C. 154(b) by 191 days.

(21) Appl. No.: 17/943,783

(22) Filed: Sep. 13, 2022

(65) Prior Publication Data

US 2023/0083770 A1  Mar. 16, 2023

(30) Foreign Application Priority Data

Sep. 14, 2021 (JP) .................... 2021-149499

(51) Int. Cl.
| | |
|---|---|
| B62J 45/20 | (2020.01) |
| B62J 1/02 | (2006.01) |
| B62J 45/40 | (2020.01) |
| B62K 25/04 | (2006.01) |
| B62M 25/08 | (2006.01) |
| H04W 4/48 | (2018.01) |

(52) U.S. Cl.
CPC .............. *B62J 45/20* (2020.02); *B62J 45/40* (2020.02); *B62M 25/08* (2013.01); *B62J 1/02* (2013.01); *B62K 25/04* (2013.01); *H04W 4/48* (2018.02)

(58) Field of Classification Search
CPC . B62J 45/20; B62J 1/02; B62K 25/04; H04W 4/48; B62M 25/08
See application file for complete search history.

(56) References Cited

U.S. PATENT DOCUMENTS

| | | | | |
|---|---|---|---|---|
| 9,394,030 | B2* | 7/2016 | Shipman | B62M 9/122 |
| 10,906,608 | B2* | 2/2021 | Nishino | B60T 8/00 |
| 10,988,205 | B2* | 4/2021 | Tsuchizawa | B62J 45/41 |
| 11,753,108 | B2* | 9/2023 | Idogaki | B62M 25/08 |
| | | | | 474/70 |

(Continued)

FOREIGN PATENT DOCUMENTS

| | | | | |
|---|---|---|---|---|
| DE | 102005041458 B3 * | 6/2007 | | B62J 45/20 |
| DE | 102016003001 A1 * | 10/2016 | | B60L 15/20 |

(Continued)

OTHER PUBLICATIONS

Machine translation DE-102005041458-B3 (Year: 2007).*
Machine translation KR 20150089602 A (Year: 2015).*
Machine translation DE-102016003001-A1 (Year: 2016).*

*Primary Examiner* — Kenneth M Dunne
(74) *Attorney, Agent, or Firm* — Global IP Counselors, LLP; David Tarnoff

(57) ABSTRACT

An electronic device is configured to suitably control of a human-powered vehicle component. The electronic device includes a communicator configured to wirelessly communicate with a pressure detector detecting pressure of at least one tire of the human-powered vehicle. The electronic device is provided in a human-powered vehicle component including at least one of a transmission mounted to the human-powered vehicle, a suspension mounted to the human-powered vehicle, and an adjustable seatpost mounted to the human-powered vehicle.

10 Claims, 26 Drawing Sheets

(56) References Cited

U.S. PATENT DOCUMENTS

| | | | |
|---|---|---|---|
| 11,884,357 B2* | 1/2024 | Shahana | B62K 25/286 |
| 2014/0102237 A1* | 4/2014 | Jordan | B62M 25/08 |
| | | | 74/473.12 |
| 2018/0290714 A1* | 10/2018 | Fossato | B62J 45/00 |
| 2019/0001763 A1 | 1/2019 | Jordan et al. | |
| 2019/0031283 A1* | 1/2019 | Suzuki | B62M 9/122 |
| 2019/0248438 A1* | 8/2019 | Masuda | B62J 45/20 |
| 2020/0140029 A1* | 5/2020 | Shipman | B62J 1/08 |
| 2020/0207435 A1* | 7/2020 | Salvioli Mariani | B62J 6/16 |
| 2020/0223513 A1* | 7/2020 | Ho | B62M 25/04 |
| 2021/0070393 A1 | 3/2021 | Mishima et al. | |
| 2021/0331550 A1* | 10/2021 | Schoolcraft, Jr. | B60W 40/10 |
| 2021/0331766 A1* | 10/2021 | Rizzo | B62M 6/50 |
| 2022/0017042 A1* | 1/2022 | Zhang | B60R 25/23 |
| 2022/0210650 A1* | 6/2022 | Ericksen | H04W 4/80 |
| 2023/0023599 A1* | 1/2023 | Coaplen | B62J 1/08 |
| 2023/0083520 A1* | 3/2023 | Yuasa | B62J 45/4152 |
| | | | 701/37 |

FOREIGN PATENT DOCUMENTS

| | | | |
|---|---|---|---|
| DE | 10 2020 114 186 A1 | 12/2020 | |
| DE | 10 2020 213 221 A1 | 6/2021 | |
| KR | 20150089602 A * | 8/2015 | B62J 45/20 |

* cited by examiner

|    |      | FC      |      |
|----|------|---------|------|
|    |      | 24      | 38   |
|    |      | Low     | Top  |
| 34 | 1st  | ~~0.67~~ | 1.06 |
| 32 | 2nd  | ~~0.75~~ | 1.19 |
| 28 | 3rd  | 0.86    | 1.36 |
| 24 | 4th  | 1.00    | 1.58 |
| 21 | 5th  | 1.14    | 1.81 |
| 19 | 6th  | 1.26    | 2.00 |
| 17 | 7th  | 1.41    | 2.24 |
| 15 | 8th  | 1.60    | 2.53 |
| 13 | 9th  | 1.85    | 2.92 |
| 11 | 10th | 2.18    | 3.45 |

Fig. 18

ELECTRONIC DEVICE AND SYSTEM FOR WIRELESS CONTROL IN VIEW OF TIRE PRESSURE

CROSS-REFERENCE TO RELATED APPLICATIONS

This application claims priority to Japanese Patent Application No. 2021-149499, filed on Sep. 14, 2021. The entire disclosure of Japanese Patent Application No. 2021-149499 is hereby incorporated herein by reference.

BACKGROUND

Technical Field

The present disclosure generally relates to an electronic device and an electronic system provided in a human-powered vehicle.

Background Information

For example, U.S. Patent Application Publication No. 2019/0001763 A discloses an electronic device that transmits information on detected pressure of a tire to a mobile phone.

SUMMARY

An object of the present disclosure is to provide an electronic device and an electronic system that relate to a pressure detector that detects a pressure of a tire of a human-powered vehicle and can improve convenience.

An electronic device for a human-powered vehicle according to a first aspect of the present disclosure includes a communicator configured to wirelessly communicate with a pressure detector detecting pressure of at least one tire of the human-powered vehicle. The electronic device is configured to be provided in a human-powered vehicle component including at least one of a transmission mounted to the human-powered vehicle, a suspension mounted to the human-powered vehicle, and an adjustable seatpost mounted to the human-powered vehicle. The electronic device according to the first aspect receives information on the pressure of the tire by a receiver provided in the human-powered vehicle component including at least one of the transmission, the suspension, and the adjustable seatpost and mounted to the human-powered vehicle, does not need an external device such as a mobile phone to receive the information on the pressure of the tire, and thus improves convenience.

The electronic device of a second aspect according to the first aspect further includes an electronic controller configured to output a signal to control the human-powered vehicle component in accordance with information received by the communicator from the pressure detector. The electronic device according to the second aspect can suitably control the human-powered vehicle component in accordance with the pressure of at least one tire of the human-powered vehicle.

In the electronic device of a third aspect according to the second aspect, the communicator is configured to intermittently receive a wireless signal from the pressure detector, and has a non-reception time shorter than a transmission time of a signal by the pressure detector. In the electronic device according to the third aspect, even though intermittently receiving the wireless signal from the pressure detector to suppress the power consumption, the communicator can suitably receive the wireless signal.

In the electronic device of a fourth aspect according to the second or third aspect, the electronic controller has a configuration in which a power consumption state is switched between a first power state and a second power state having a higher power consumption than the first power state. The first power state is switched to the second power state upon receipt of a wireless signal from the pressure detector by the communicator where the electronic controller is in the first power state. The electronic device according to the fourth aspect can suitably control the human-powered vehicle component while suppressing the power consumption.

The electronic device of a fifth aspect according to any one of the first to fourth aspects further includes an information acquirer configured to acquire at least one of information on the human-powered vehicle and information on the human-powered vehicle component, and a storage configured to store first information detected by the pressure detector or second information acquired by the information acquirer in association with each other. The electronic device according to the fifth aspect can acquire information indicating the relevance between the information on at least one of the human-powered vehicle and the human-powered vehicle component and the information on the pressure of at least one tire of the human-powered vehicle.

An electronic device for a human-powered vehicle according to a sixth aspect of the present disclosure includes a communicator configured to wirelessly communicate with a pressure detector detecting pressure of at least one tire of the human-powered vehicle. The communicator is configured to intermittently receive a wireless signal from the pressure detector, and has a non-reception time shorter than a transmission time of a signal by the pressure detector. In the electronic device according to the sixth aspect, even though intermittently receiving the wireless signal from the pressure detector to suppress the power consumption, the communicator can suitably receive the wireless signal and thus improve convenience of the electronic device.

The electronic device of a seventh aspect according to the sixth aspect further includes an electronic controller configured to control the human-powered vehicle component in accordance with information received by the communicator from the pressure detector. The electronic device according to the seventh aspect can suitably control the human-powered vehicle component in accordance with the pressure of at least one tire of the human-powered vehicle.

In the electronic device of an eighth aspect according to the seventh aspect, the electronic controller has a configuration in which a power consumption state is switched between a first power state and a second power state having a higher power consumption than the first power state. The first power state is switched to the second power state upon receipt of the wireless signal from the pressure detector by the communicator where the electronic controller is in the first power state. The electronic device according to the eighth aspect can suitably control the human-powered vehicle component while suppressing the power consumption.

The electronic device of a ninth aspect according to any one of the sixth to eighth aspects further includes an information acquirer configured to acquire at least one of information on the human-powered vehicle and information on the human-powered vehicle component, and a storage configured to store first information detected by the pressure detector or second information acquired by the information acquirer in association with each other. The electronic device according to the ninth aspect can acquire information indicating the relevance between the information on at least one of the human-powered vehicle and the human-powered vehicle component and the information on the pressure of at least one tire of the human-powered vehicle.

An electronic device for a human-powered vehicle according to a tenth aspect of the present disclosure includes a communicator configured to wirelessly communicate with a pressure detector detecting pressure of at least one tire of the human-powered vehicle, and an electronic controller configured to control a human-powered vehicle component in accordance with information received by the communicator from the pressure detector. The electronic controller has a configuration in which a power consumption state is switched between a first power state and a second power state having a higher power consumption than the first power state. The first power state is switched to the second power state upon receipt of a wireless signal from the pressure detector by the communicator where the electronic controller is in the first power state. The electronic device according to the tenth aspect can suitably control the human-powered vehicle component in accordance with the pressure of at least one tire of the human-powered vehicle while suppressing the power consumption and thus improve convenience of the electronic device.

The electronic device of an eleventh aspect according to the tenth aspect further includes an information acquirer configured to acquire at least one of information on the human-powered vehicle and information on the human-powered vehicle component, and a storage configured to store first information detected by the pressure detector or second information acquired by the information acquirer in association with each other. The electronic device according to the eleventh aspect can acquire information indicating the relevance between the information on the pressure of at least one tire of the human-powered vehicle and the information on the human-powered vehicle component.

An electronic device for a human-powered vehicle according to a twelfth aspect of the present disclosure includes an information acquirer configured to acquire at least one of information on the human-powered vehicle and information on a component mounted to the human-powered vehicle, and a storage configured to store first information detected by a pressure detector detecting pressure of at least one tire of the human-powered vehicle and second information acquired by the information acquirer in association with each other. The electronic device according to the twelfth aspect can acquire information indicating the relevance between the information on at least one of the human-powered vehicle and the human-powered vehicle component and the information on the pressure of at least one tire of the human-powered vehicle, and thus improve convenience of the electronic device.

An electronic device for a human-powered vehicle according to a thirteenth aspect of the present disclosure includes a pressure detector configured to detect pressure of at least one tire of the human-powered vehicle, and a communicator configured to wirelessly communicate with an external device. The pressure detector has a configuration in which a power consumption state is switched between a first power state and a second power state having a higher power consumption than the first power state. The first power state is switched to the second power state upon receipt of a wireless signal from the external device by the communicator where the pressure detector is in the first power state. The electronic device according to the thirteenth aspect can suitably control the pressure detector while suppressing the power consumption.

An electronic system according to a fourteenth aspect of the present disclosure includes the electronic device according to any one of the first to twelfth aspects and the pressure detector or the electronic device according to the thirteenth aspect. The electronic system of the fourteenth aspect can suitably control the human-powered vehicle component and the pressure detector.

An electronic device and an electronic system of the present disclosure relates to a pressure detector that detects a pressure of a tire of a human-powered vehicle and can improve convenience.

BRIEF DESCRIPTION OF THE DRAWINGS

Referring now to the attached drawings which form a part of this original disclosure.

FIG. 18 is a diagram illustrating a shift table in a state where use of a gear ratio around a minimum value is inhibited.

DETAILED DESCRIPTION OF EMBODIMENTS

Figure 1:
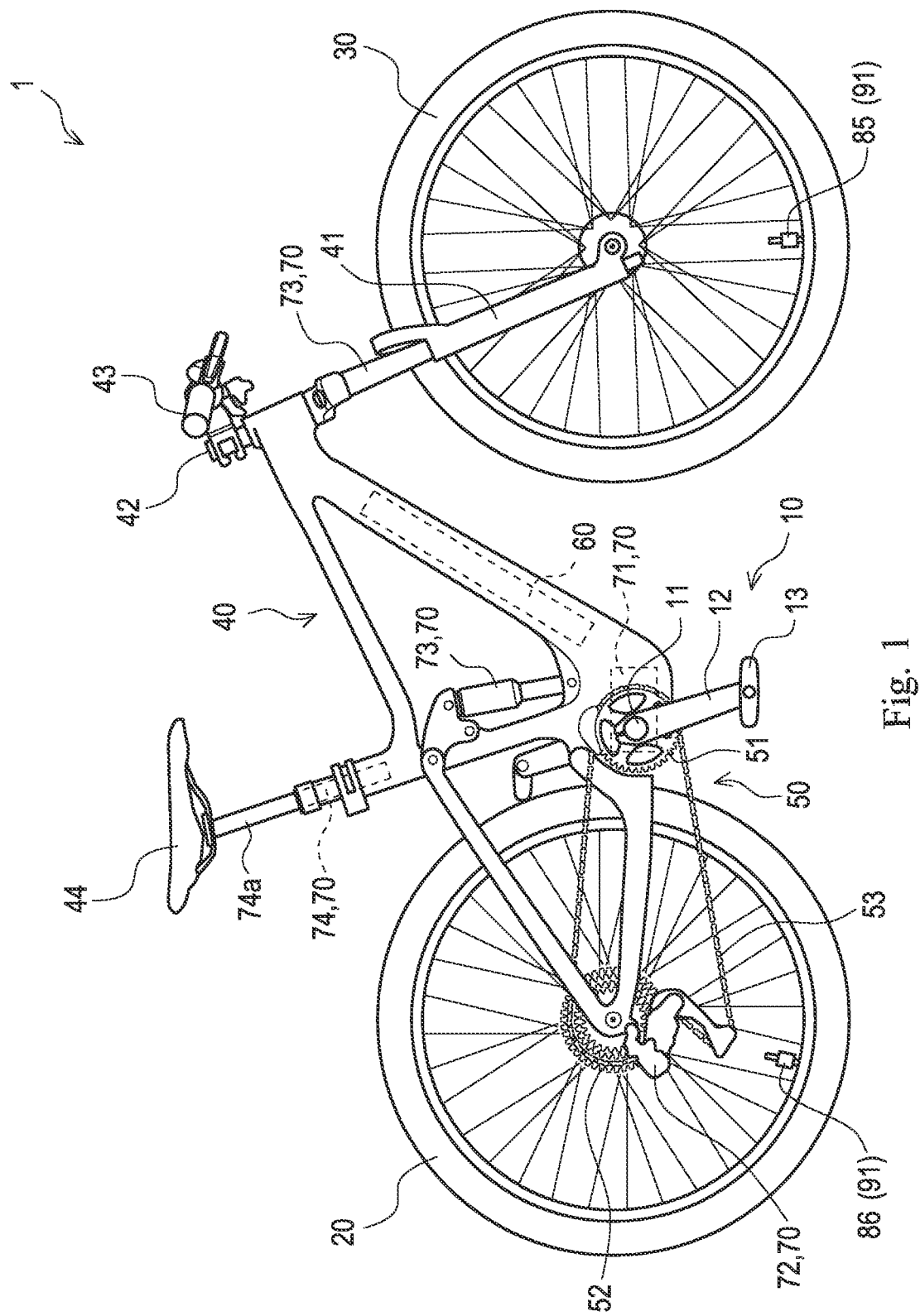
FIG. 1 is a side elevational view of a human-powered vehicle including a human-powered vehicle control device according to a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A human-powered vehicle 1 including a human-powered vehicle control device 80 according to a first embodiment will be described with reference to FIGS. 1 and 2. The human-powered vehicle 1 is a vehicle that has at least one wheel and can be driven by at least human driving force. The human-powered vehicle 1 includes various types of bicycles such as a mountain bike, a road bike, a city bike, a cargo bike, a hand bike, and a recumbent bike. The number of wheels included in the human-powered vehicle 1 is not limited. The human-powered vehicle 1 includes, for example, a single-wheeled vehicle and a vehicle having two or more wheels. The human-powered vehicle 1 is not limited to a vehicle that can be driven only by a human driving force. The human-powered vehicle 1 includes an E-bike that uses not only a human driving force but also a driving force of an electric motor for propulsion. The E-bike includes a power-assisted bicycle whose propulsion is assisted by an electric motor. Hereinafter, in the embodiment, the human-powered vehicle 1 is described as a bicycle.

The human-powered vehicle 1 includes a crank 10, a rear wheel 20, a front wheel 30, a frame 40, a drive mechanism 50, a battery 60, a human-powered vehicle component 70, and the control device 80.

The crank 10 illustrated in FIG. 1 includes a crankshaft 11 rotatable with respect to the frame 40 and a pair of crank arms 12 provided at both ends in an axial direction of the crankshaft 11. Pedals 13 are coupled to each of the pair of crank arms 12.

The rear wheel 20 and the front wheel 30 are supported by the frame 40. The front wheel 30 is attached to a front fork 41 provided at a front part of the frame 40. A handlebar 43 is coupled to the front fork 41 with a stem 42 interposed therebetween. The rear wheel 20 is attached to a rear part of the frame 40. A seat 44 is provided on an upper part of the frame 40.

The drive mechanism 50 couples the crank 10 to the rear wheel 20. The drive mechanism 50 includes a front sprocket assembly 51 coupled to the crankshaft 11, a rear sprocket assembly 52 coupled to the rear wheel 20, and a chain 53 coupling the front sprocket assembly 51 to the rear sprocket assembly 52.

The front sprocket assembly 51 includes at least one front sprocket. The front sprocket assembly 51 includes two front sprockets having different numbers of teeth. The front sprocket assembly 51 can include two or more front sprockets having different numbers of teeth. In a case where the front sprocket assembly 51 includes two or more front sprockets having different numbers of teeth, in a state where the front sprocket assembly 51 is attached to the human-powered vehicle 1, a front sprocket having the largest number of teeth is disposed farther from a center surface of the frame of the bicycle than a front sprocket having the smallest number of teeth. The rear sprocket assembly 52 includes at least one rear sprocket.

The rear sprocket assembly 52 includes two or more rear sprockets having different numbers of teeth. The rear sprocket assembly 52 can include two or more rear sprockets having different numbers of teeth. In a case where the rear sprocket assembly 52 includes two or more rear sprockets, in a state where the rear sprocket assembly 52 is attached to the human-powered vehicle 1, a rear sprocket having the largest number of teeth is disposed closest to the center surface of the frame of the bicycle than a rear sprocket having the smallest number of teeth. The chain 53 is coupled to one of the front sprockets included in the front sprocket assembly 51 and one of the rear sprockets included in the rear sprocket assembly 52. A rotational force of the front sprocket assembly 51 is transmitted to the rear sprocket via the chain 53.

The drive mechanism 50 of the present embodiment transmits the front sprocket assembly 51, the rear sprocket assembly 52, and the rotational force using the chain 53, but the configuration of the drive mechanism 50 is not limited. For example, the front sprocket assembly 51 and the rear sprocket assembly 52 can include a pulley, a bevel gear, or the like instead of the sprocket. Instead of the chain 53, a belt, a shaft, or the like can be used.

A first one-way clutch can be provided between the crankshaft 11 and the front sprocket assembly 51. The first one-way clutch causes the front sprocket assembly 51 to rotate forward in a case where the crank 10 rotates forward, and allows relative rotation of the crankshaft 11 and the front sprocket assembly 51 in a case where the crank 10 rotates rearward. A second one-way clutch can be provided between the rear sprocket assembly 52 and the rear wheel 20. The second one-way clutch causes the rear wheel 20 to rotate forward in a case where the rear sprocket assembly 52 rotates forward, and allows relative rotation between the rear sprocket assembly 52 and the rear wheel 20 in a case where the rear sprocket assembly 52 rotates rearward.

The battery 60 is a power supply source of power supplied to an electric component provided in the human-powered vehicle 1. The battery 60 is provided in at least one of the inside and the outside of the frame 40. The battery 60 can supply power to the human-powered vehicle component 70. The battery 60 can be capable of supplying power to a drive unit 71. The battery 60 can include a plurality of batteries and supply power to each of a plurality of human-powered vehicle components 70. A single battery 60 can be capable of supplying power to the human-powered vehicle component 70 and the drive unit 71. The battery 60 can be provided directly in the human-powered vehicle component 70.

Figure 2:
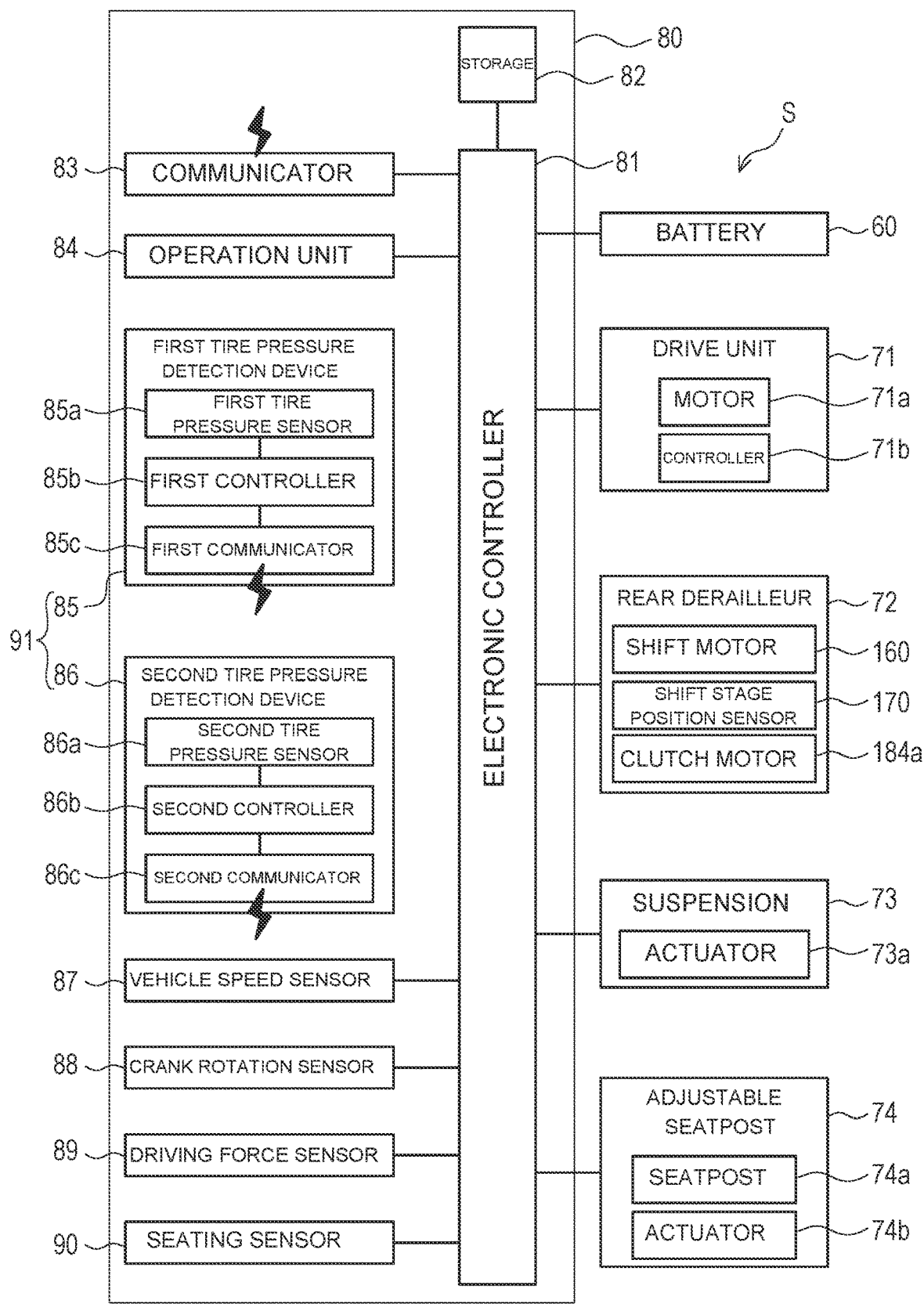
FIG. 2 is a block diagram of an electronic system included in the human-powered vehicle.

The human-powered vehicle component 70 illustrated in FIGS. 1 and 2 includes the drive unit 71, a rear derailleur 72, a suspension 73, and an adjustable seatpost 74. The drive unit 71 assists the propulsion of the human-powered vehicle 1. The drive unit 71 includes a motor 71a and an electronic controller 71b.

The motor 71a is provided to transmit a rotation to the front wheel 30 or a power transmission path of the human driving force from the pedals 13 to the rear wheel 20. In the present embodiment, the motor 71a is provided to transmit the rotation to a power transmission path from the crankshaft 11 to the front sprocket assembly 51. Preferably, a one-way clutch is provided between the motor 71a and the crankshaft 11 such that the motor 71a does not rotate by a rotational force of the crankshaft 11 in a case where the crankshaft 11 is rotated in a direction in which the human-powered vehicle 1 moves forward. The electronic controller 71b controls the motor 71a. The electronic controller 71b includes a calculation processor that executes a predetermined control program. The electronic controller 71b further includes an inverter circuit. The electronic controller 71b can control power fed to the motor 71a. The electronic controller 71b is electrically connected to an electronic controller 81 described later by a conductive line via a communicator. The conductive line includes at least one of an electric cable and an electric wire formed on a circuit board. The electronic controller 71b can be electrically connected to the electronic controller 81 via a wireless communication device. The electronic controller 71b drives the motor 71a in response to a control signal from the electronic controller 81. The electronic controller 71b can be included in the electronic controller 81.

The rear derailleur 72 is a transmission device that changes a transmission ratio as a ratio of a rotational speed of the rear wheel 20 to a rotational speed of the crankshaft 11. The transmission ratio is calculated by a value obtained by dividing the number of teeth of the front sprocket with which the chain 53 is engaged by the number of teeth of the rear sprocket with which the chain 53 is engaged. The rear derailleur 72 can change the transmission ratio by replacing the chain 53 between a plurality of rear sprockets. The rear derailleur 72 includes a shift motor 160 configured to move a movable member 120 and a pulley assembly 140 with respect to a fixing member 110, a shift stage position sensor 170 configured to detect an operation status of the rear derailleur 72, and a clutch motor 184a that switches a mode of a one-way clutch 183 to be described later. The shift motor 160, the shift stage position sensor 170, and the clutch motor 184a are electrically connected to the electronic controller 81 described later by a conductive line via a communicator. The shift motor 160, the shift stage position sensor 170, and the clutch motor 184a can be electrically connected to the electronic controller 81 wirelessly. The shift motor 160 and the clutch motor 184a are driven in response to a control signal from the electronic controller 81. The shift stage position sensor 170 outputs a signal corresponding to a detection value to the electronic controller 81. A specific configuration of the rear derailleur 72 will be described later. The shift motor 160 can include a motor, a speed reduction mechanism, the shift stage position sensor 170, and an output shaft. The shift stage position sensor 170 can detect a rotation of the speed reduction mechanism.

The suspension 73 absorbs an impact applied to the human-powered vehicle 1. The suspension 73 includes an actuator 73a that switches between a lockout state and an unlocked state and changes an attenuation rate and a stroke. The lockout state is a state where extension and contraction of the suspension 73 are restricted. The unlocked state is a state where extension and contraction of the suspension 73 are allowed. In the present embodiment, the suspension 73 includes a rear suspension corresponding to the rear wheel 20 and a front suspension corresponding to the front wheel 30. The actuator 73a is electrically connected to the electronic controller 81 described later by a conductive line via a communicator. The actuator 73a can be electrically connected to the electronic controller 81 wirelessly. The actuator 73a is driven in response to a control signal from the electronic controller 81. The electronic controller 81 can keep track of the state of the actuator 73a. The state of the actuator 73a includes, for example, a distinction between the lockout state and the unlocked state, the attenuation rate, the stroke, and the like.

The adjustable seatpost 74 changes a height of the seat 44. The adjustable seatpost 74 includes a seatpost 74a and an actuator 74b.

The seatpost 74a is provided on the upper part of the frame 40 and supports the seat 44. The actuator 74b can change a position of the seatpost 74a up and down. The actuator 74b is electrically connected to the electronic controller 81 described later by a conductive line via a communicator. The actuator 74b can be electrically connected to the electronic controller 81 wirelessly. The actuator 74b is driven in response to a control signal from the electronic controller 81. The electronic controller 81 can keep track of the state of the actuator 74b. The state of the actuator 74b includes the position of the seatpost 74a and the like.

As illustrated in FIG. 2, the control device 80 includes the electronic controller 81, a storage 82, a communicator 83, an operation unit 84, a first tire pressure detection device 85, a second tire pressure detection device 86, a vehicle speed sensor 87, a crank rotation sensor 88, a driving force sensor 89, and a seating sensor 90.

The electronic controller 81 performs control related to the human-powered vehicle 1. The electronic controller 81 includes a calculation processor that executes a predetermined control program. The calculation processor includes, for example, a central processing unit (CPU) or a micro processing unit (MPU). The electronic controller 81 can include one or a plurality of microcomputers. The electronic controller 81 is formed of one or more semiconductor chips that are mounted on a circuit board. Thus, the terms "electronic controller" and "controller" as used herein refers to hardware that executes a software program, and does not include a human being.

The storage 82 is any computer storage device or any non-transitory computer-readable medium with the sole exception of a transitory, propagating signal. The storage 82 stores information used for various control programs and various control processing. The storage 82 includes, for example, a nonvolatile memory and a volatile memory. For example, the storage 82 can include an internal memory, or other type of memory devices such as a ROM (Read Only Memory) device, a RAM (Random Access Memory) device, a hard disk, a flash drive, etc. The electronic controller 81 stores and reads data and/or programs from the storage 82.

The communicator 83 communicates with the electronic controller 81 and other devices. The communicator 83 is electrically connected to the electronic controller 81 via a conductive line. The communicator 83 is connected to an external device by wireless communication. The communicator 83 can communicate in accordance with an existing communication standard such as Bluetooth and ANT+, or can communicate in accordance with a unique communication standard. Thus, the communicator 83 is a hardware device capable of transmitting an analog signal and/or a digital signal.

The operation unit 84 is operable by a rider. The operation unit 84 can also be referred to as a user operable input device, The operation unit 84 is disposed at a position so as to be operable by the rider riding on the human-powered vehicle 1. The operation unit 84 is provided, for example, on the handlebar 43. The operation unit 84 includes a button, a lever, a touch panel, and the like. The operation unit 84 is electrically connected to the electronic controller 81 described later by a conductive line via a communicator. The operation unit 84 can be electrically connected to the electronic controller 81 wirelessly. The operation unit 84 can be used for, for example, switching of various modes related to control by the electronic controller 81, shifting by manual operation of the rider, and other various operations and settings. In a case where the operation unit 84 is operated, a signal corresponding to the operation is output to the electronic controller 81.

The first tire pressure detection device 85 detects a pressure of a tire of the front wheel 30. The first tire pressure detection device 85 is provided on the front wheel 30, and can detect the pressure of the tire of the front wheel 30. The first tire pressure detection device 85 is provided, for example, on a valve of the tire. The first tire pressure detection device 85 includes a first tire pressure sensor 85*a*, a first controller 85*b*, and a first communicator 85*c*.

The first tire pressure sensor 85*a* is a sensor that is configured to detect the pressure in the tire. The first tire pressure sensor 85*a* detects a pressure of air, nitrogen, or the like. The term "sensor" as used herein refers to a hardware device or instrument designed to detect the presence or absence of a particular event, object, substance, or a change in its environment, and to emit a signal in response. The term "sensor" as used herein do not include a human being. The first controller 85*b* is configured to perform a control related to the first tire pressure detection device 85. The first controller 85*b* includes a calculation processor that executes a predetermined control program. The first communicator 85*c* communicates with other devices. The first communicator 85*c* is connected to the communicator 83 of the control device 80 by wireless communication. The first communicator 85*c* can be electrically connected to the electronic controller 81 via a conductive path including, for example, a slip ring. The first communicator 85*c* outputs information on the pressure of the tire of the front wheel 30 detected by the first tire pressure sensor 85*a* to the electronic controller 81.

The second tire pressure detection device 86 detects a pressure of the tire of the rear wheel 20. The second tire pressure detection device 86 is provided on the rear wheel 20, and can detect the pressure of the tire of the rear wheel 20. The second tire pressure detection device 86 is provided, for example, on a valve of the tire. The second tire pressure detection device 86 includes a second tire pressure sensor 86*a*, a second controller 86*b*, and a second communicator 86*c*.

The second tire pressure sensor 86*a* is a sensor that is configured to detect the pressure in the tire of the rear wheel 20. The second tire pressure sensor 86*a* detects a pressure of air, nitrogen, or the like. The second controller 86*b* performs control related to the second tire pressure detection device 86. The second controller 86*b* includes a calculation processor that executes a predetermined control program. The second communicator 86*c* communicates with other devices. The second communicator 86*c* is connected to the communicator 83 of the control device 80 by wireless communication. The second communicator 86*c* can be electrically connected to the electronic controller 81 via a conductive path including, for example, a slip ring. The second communicator 86*c* outputs information on the pressure of the tire of the rear wheel 20 detected by the second tire pressure sensor 86*a* to the electronic controller 81.

The vehicle speed sensor 87 is configured to detect a vehicle speed of the human-powered vehicle 1. The vehicle speed sensor 87 is configured to detect a rotational speed of the wheels. The vehicle speed sensor 87 is electrically connected to the electronic controller 81 by a conductive line. The vehicle speed sensor 87 can be connected to the electronic controller 81 by wireless communication. The vehicle speed sensor 87 outputs a signal corresponding to the rotational speed of the wheels to the electronic controller 81. The electronic controller 81 calculates the vehicle speed of the human-powered vehicle 1 on the basis of the rotational speed of the wheels. The configuration of the vehicle speed sensor 87 is not limited, but for example, the vehicle speed sensor 87 can be configured by a magnetic sensor that is attached to the frame 40 or the front fork 41 and detects magnetism of a magnet provided on the rear wheel 20 or the front wheel 30.

The crank rotation sensor 88 is configured to detect a rotational speed of the crank 10 of the human-powered vehicle 1. The crank rotation sensor 88 is provided, for example, on the frame 40. The crank rotation sensor 88 detects a rotation of the crank 10 with respect to the frame 40. The configuration of the crank rotation sensor 88 is not limited, but the crank rotation sensor 88 includes, for example, a magnetic sensor that outputs a signal in accordance with a strength of a magnetic field. The crank rotation sensor 88 is provided, for example, on the crankshaft 11 or on a power transmission path from the crankshaft 11 to the front sprocket assembly 51, and detects magnetism of an annular magnet in which a strength of the magnetic field changes in a circumferential direction. The crank rotation sensor 88 is electrically connected to the electronic controller 81 by a conductive line via a communicator. The crank rotation sensor 88 can be electrically connected to the electronic controller 81 wirelessly. The crank rotation sensor 88 outputs a signal corresponding to the rotation to the crank 10 to the electronic controller 81.

The driving force sensor 89 is configured to detect the human driving force input to the pedals 13. The driving force sensor 89 is provided, for example, on a transmission path of the driving force from the pedals 13 to the front sprocket assembly 51. The driving force sensor 89 outputs a signal corresponding to the human driving force applied to the pedals 13. As the driving force sensor 89, for example, a strain sensor, a magnetostrictive sensor, an optical sensor, a pressure sensor, or the like can be used. The driving force sensor 89 is electrically connected to the electronic controller 81 by a conductive line. The driving force sensor 89 can be connected to the electronic controller 81 by wireless communication. The driving force sensor 89 outputs a signal corresponding to the human driving force to the electronic controller 81.

The seating sensor 90 is configured to detect whether the rider is seated on the seat 44. The seating sensor 90 is provided, for example, on the adjustable seatpost 74 or the seat 44. As the seating sensor 90, for example, a load sensor, a pressure sensor, a switch, or the like can be used. The seating sensor 90 is electrically connected to the electronic controller 81 by a conductive line. The seating sensor 90 can be connected to the electronic controller 81 by wireless communication. The seating sensor 90 outputs a signal corresponding to a seating state of the rider to the electronic controller 81.

The battery 60, the human-powered vehicle component 70, and the control device 80 constitute an electronic system S.

Figure 3:
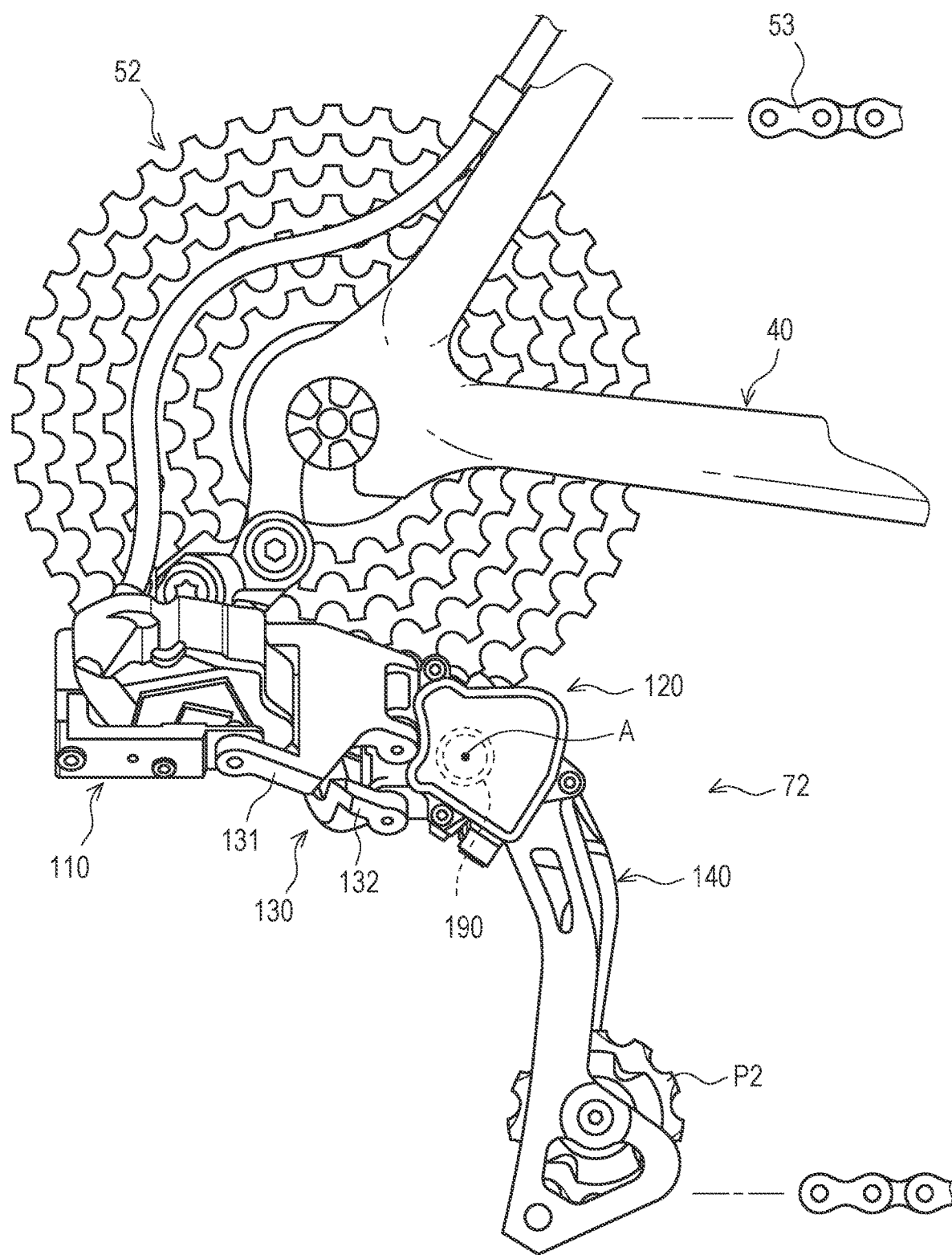
FIG. 3 is a side elevational view of a rear derailleur controlled by the human-powered vehicle control device.
Figure 4:
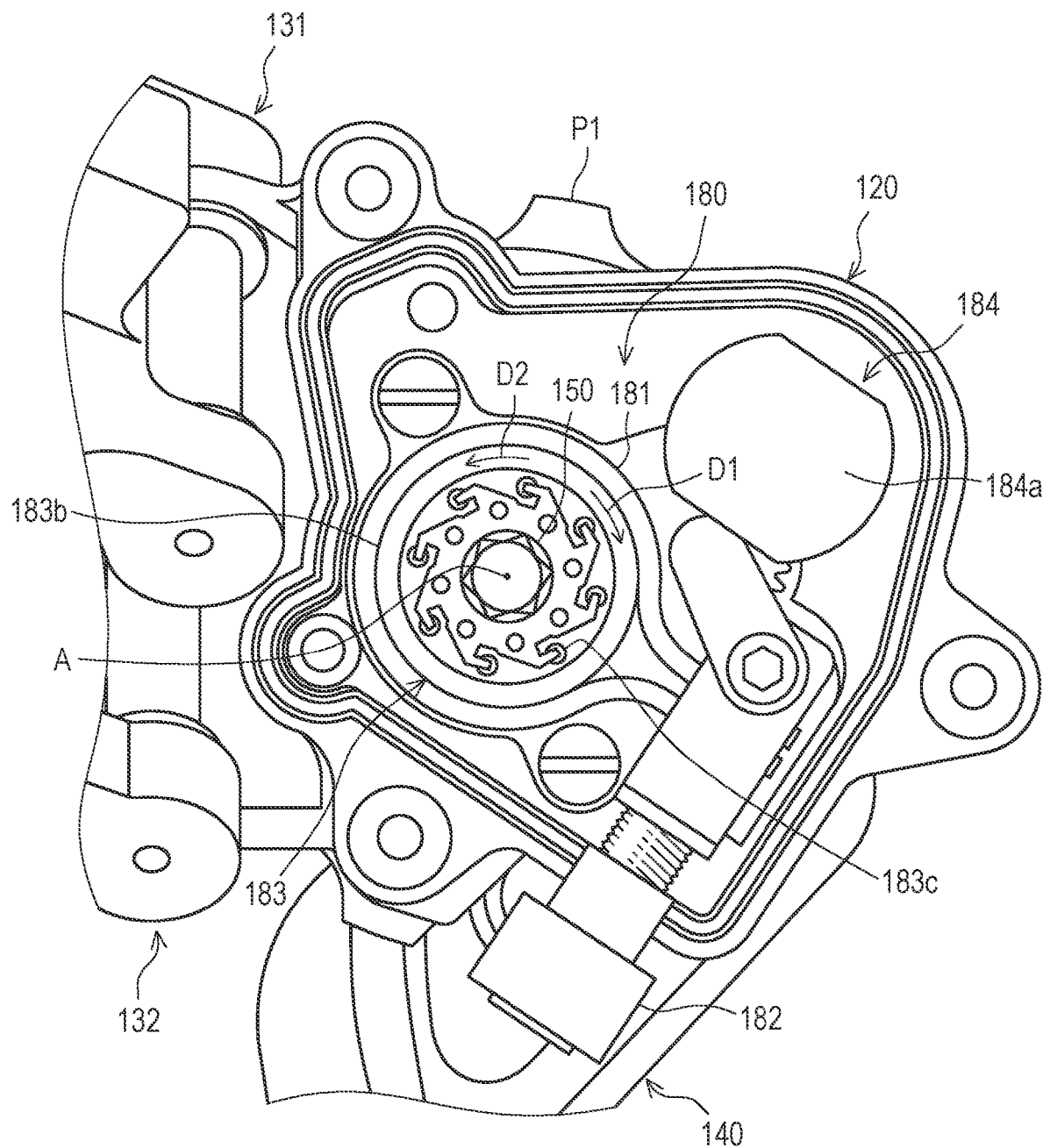
FIG. 4 is an enlarged side elevational view of a portion of the rear derailleur illustrated in FIG. 3 in which a cover of the movable member has been removed to show an inner structure of the rear derailleur.

The rear derailleur 72 illustrated in FIGS. 2 to 4 includes the fixing member 110, the movable member 120, a link mechanism 130, the pulley assembly 140, a shaft member 150, the shift motor 160, the shift stage position sensor 170, a damping mechanism 180, and a biasing member 190.

The fixing member 110 is attachable to the frame 40 of the human-powered vehicle 1. The fixing member 110 is fixed to the frame 40 with a bolt or the like. The movable member 120 is movably connected to the fixing member 110 via the link mechanism 130. The link mechanism 130 includes an outer link 131 and an inner link 132.

The pulley assembly 140 is fixed to the shaft member 150 rotatably provided with respect to the movable member 120. The pulley assembly 140 is coupled to the movable member 120 with the shaft member 150 interposed therebetween so as to pivot around a pivot axis A. The pulley assembly 140 includes at least one pulley. The pulley assembly 140 includes a first pulley P1 and a second pulley P2.

The shift motor 160 illustrated in FIG. 2 is an electric motor. The output shaft of the shift motor 160 is connected to the link mechanism 130. The movable member 120 and the pulley assembly 140 are moves with respect to the fixing member 110 via the link mechanism 130 by a rotation of the shift motor 160. In a state where the rear derailleur 72 and the rear sprocket assembly 52 are attached to the human-powered vehicle 1, the movable member 120 and the pulley assembly 140 are movable with respect to the fixing member 110 in an inward direction defined by a direction from the rear sprocket having the smallest number of teeth to the rear sprocket having the largest number of teeth. In a state where the rear derailleur 72 and the rear sprocket assembly 52 are attached to the human-powered vehicle 1, the movable member 120 and the pulley assembly 140 are movable with respect to the fixing member 110 in an outward direction defined by a direction from the rear sprocket having the largest number of teeth to the rear sprocket having the smallest number of teeth. On the basis of the operation of the shift motor 160, the movable member 120 and the pulley assembly 140 are movable with respect to the fixing member 110 in a low gear direction in which the rear sprocket has the largest number of teeth or a top gear direction in which the rear sprocket has the smallest number of teeth opposite to a low gear side. The shift stage position sensor 170 illustrated in FIG. 2 can detect positions of the movable member 120 and the pulley assembly 140 by detecting a number of rotations of the shift motor 160 and the like.

The damping mechanism 180 illustrated in FIG. 4 is configured to apply a rotation resistance to a rotation of the pulley assembly 140 in a second rotational direction D2. The damping mechanism 180 includes a friction element 181, an adjustment bolt 182, the one-way clutch 183, and an actuator 184.

The friction element 181 has a strip shape. The friction element 181 is disposed so as to wind the one-way clutch 183 described below from its outer periphery. The friction element 181 can apply resistance to a rotation of the shaft member 150 in the second rotational direction D2 via the one-way clutch 183. By adjusting a gap between both ends of the friction element 181 using the adjustment bolt 182, the rotation resistance applied to the rotation of the shaft member 150 in the second rotational direction D2 by the friction element 181 can be adjusted. The rotation resistance is friction resistance generated between the one-way clutch 183 and the friction element 181.

The one-way clutch 183 is disposed between the movable member 120 and the pulley assembly 140 and receives resistance of the friction element 181 in a case where the pulley assembly 140 rotates in the second rotational direction D2. The one-way clutch 183 is formed by a roller clutch. The one-way clutch 183 includes the shaft member 150, an outer race 183b, and a plurality of rollers 183c.

The shaft member 150 forms an inner race of the one-way clutch 183. The plurality of rollers 183c are disposed between the shaft member 150 and the outer race 183b. In a case where the shaft member 150 rotates in the second rotational direction D2, the rotation of the shaft member 150 is transmitted to the outer race 183b by the plurality of rollers 183c, and thus the outer race 183b rotates in the second rotational direction D2. In a case where the shaft member 150 rotates in a first rotational direction D1 opposite to the second rotational direction D2, the plurality of rollers 183c do not substantially transmit the rotation of the shaft member 150 in the first rotational direction D1 to the outer race 183b. In other words, in a case where the shaft member 150 rotates in the first rotational direction D1, the shaft member 150 can rotate relative to the outer race 183b. The damping mechanism 180 is switchable between a first clutch mode and a second clutch mode.

In the first clutch mode, a first frictional force is generated between the outer race 183b and the friction element 181. In the first clutch mode, in a case where the shaft member 150 rotates in the second rotational direction D2, the first frictional force is transmitted to the shaft member 150 via the plurality of rollers 183c. In a case where the shaft member 150 rotates in the first rotational direction D1, the shaft member 150 rotates relative to the outer race 183b, and thus the shaft member is not substantially affected by the first frictional force generated between the outer race 183b and the friction element 181.

In the second clutch mode, a second frictional force is generated between the outer race 183b and the friction element 181. The second frictional force is smaller than the first frictional force. In the second clutch mode, in a case where the shaft member 150 rotates in the second rotational direction D2, the second frictional force is transmitted to the shaft member 150 via the plurality of rollers 183c. In a case where the shaft member 150 rotates in the first rotational direction D1, the shaft member 150 rotates relative to the outer race 183b, and thus the shaft member is not substantially affected by the second frictional force generated between the outer race 183b and the friction element 181. In the second clutch mode, the outer race 183b can be configured not to contact the friction element 181 at all.

The actuator 184 switches the one-way clutch 183 between the first clutch mode and the second clutch mode. The actuator 184 includes an electric actuator. The actuator 184 includes the clutch motor 184a. In a case where the clutch motor 184a rotates, the one-way clutch 183 is switched between the first clutch mode and the second clutch mode.

The biasing member 190 biases the pulley assembly 140 in the first rotational direction D1 opposite to the second rotational direction D2. An example of the biasing member 190 is a torsion spring. One end of the biasing member 190 is coupled to the movable member 120, and the other end of the biasing member 190 is coupled to the pulley assembly 140.

The chain 53 coupling the front sprocket of the front sprocket assembly 51 to the rear sprocket of the rear sprocket assembly 52 are wound around the first pulley P1 and the second pulley P2.

The movable member 120 and the pulley assembly 140 are movable in the outward direction or the inward direction by driving of the shift motor 160. The chain 53 can be engaged with any sprocket of the rear sprocket assembly 52 in accordance with movement of the movable member 120 and the pulley assembly 140. As a result, the rear derailleur 72 can change the transmission ratio.

By driving the clutch motor 184a appropriately, the one-way clutch 183 is switchable between the first clutch mode and the second clutch mode. In the first clutch mode, in a case where the pulley assembly 140 rotates in the second rotational direction D2 with respect to the movable portion 120, the rotation resistance by the friction element 181 is applied to the shaft member 150 via the outer race 183b. It is therefore possible to prevent the chain 53 from slackening due to the rotation of the pulley assembly 140 in the second rotational direction D2. In the second clutch mode, in a case where the pulley assembly 140 rotates in the second rotational direction D2 with respect to the movable member 120, the rotation resistance by the friction element 181 is not applied to the shaft member 150. The first clutch mode is a first resistance force applying state in which a rotation resistance force greater than or equal to a predetermined rotation resistance force is applied to the rotation of the pulley assembly 140 in the second rotational direction D2. The second clutch mode is a second resistance force applying state in which a rotation resistance force less than the predetermined rotation resistance force is applied to the rotation of the pulley assembly 140 in the second rotational direction D2. A first resistance force is larger than a second resistance force.

The electronic controller 81 is configured to control the operation of the rear derailleur 72 by controlling the operations of the shift motor 160 and the clutch motor 184a of the rear derailleur 72.

The rear derailleur 72 includes the fixing member 110 configured to be attachable to the frame 40 of the human-powered vehicle 1, the movable member 120 configured to be movable with respect to the fixing member 110, the link mechanism 130 movably connecting the movable member 120 to the fixing member 110, the pulley assembly 140 coupled to the movable member 120 and configured to pivot about the pivot axis A, the biasing member 190 configured to bias the pulley assembly 140 in the first rotational direction D1 with respect to the movable member 120, and the damping mechanism 180 disposed between the movable member 120 and the pulley assembly 140 and configured to apply rotation resistance to rotation of the pulley assembly 140 in the second rotational direction D2 different from the first rotational direction D1, and the damping mechanism 180 includes the actuator 184 configured to switch between the first resistance force applying state in which the rotation resistance force greater than or equal to a predetermined rotation resistance force is applied to the rotation of the pulley assembly 140 in the second rotational direction D2 and the second resistance force applying state in which the rotation resistance force less than the predetermined rotation resistance force is applied to the rotation of the pulley assembly 140 in the second rotational direction D2. The actuator 184 includes an electric actuator.

Figure 5:
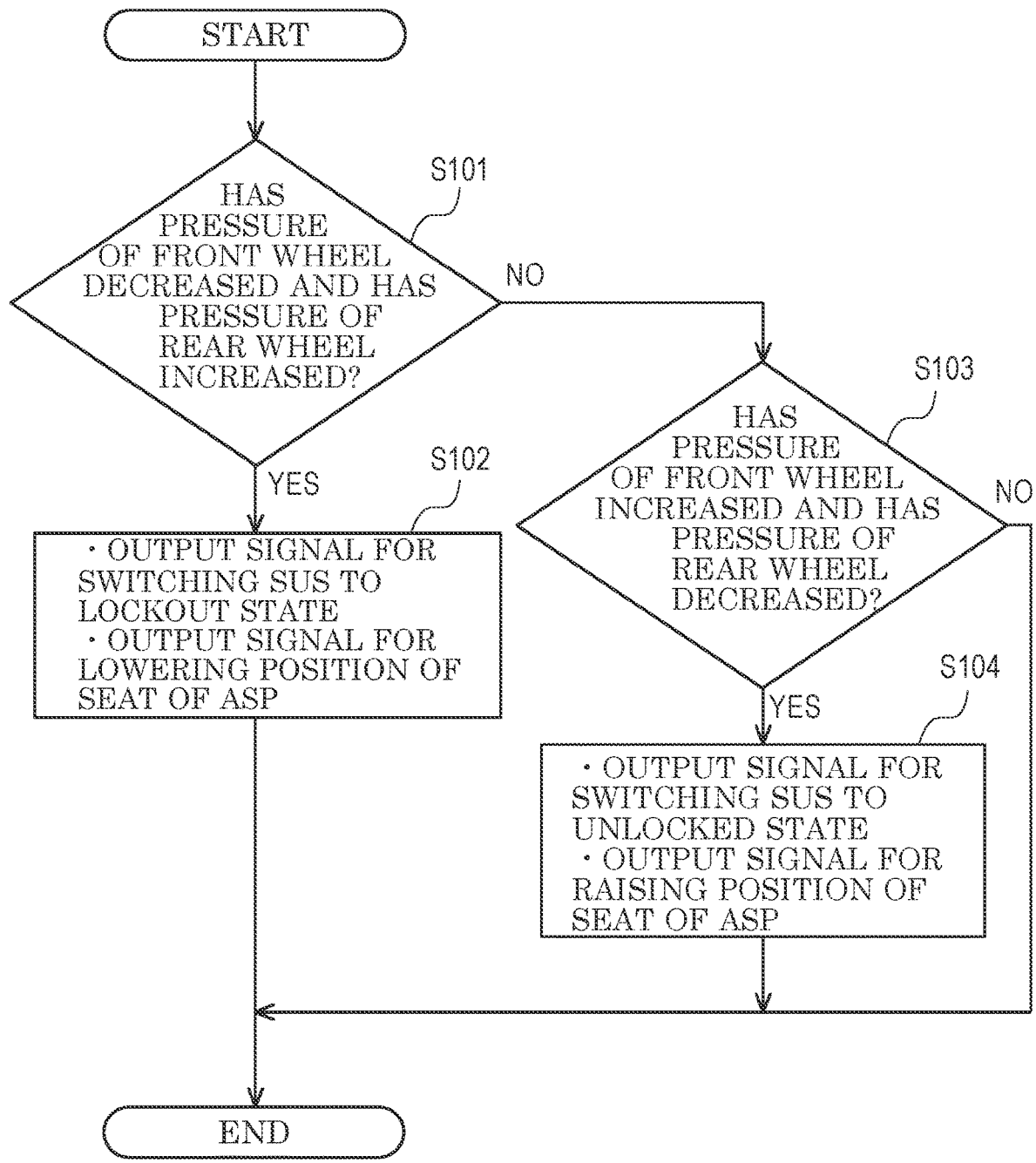
FIG. 5 is a flowchart illustrating a control process executed by an electronic controller of the human-powered vehicle control device based on an inclined state of the human-powered vehicle.

The control of the human-powered vehicle 1 by the control device 80 including the electronic controller 81 will be described with reference to FIG. 5. As illustrated in FIG. 5, the electronic controller 81 controls at least one of the suspension 73 and the adjustable seatpost 74 mounted to the human-powered vehicle 1 upon detection of an inclined state of the human-powered vehicle 1 on the basis of change in pressure of at least one tire of the human-powered vehicle 1, the pressure of the at least one tire being detected by a pressure detector 91 that is configured to detect pressure of the at least one tire of the human-powered vehicle. The pressure detector 91 includes at least one of the first tire pressure detection device 85 and the second tire pressure detection device 86. The inclined state includes a state in which the human-powered vehicle 1 is inclined upward at a front side and a state in which the human-powered vehicle 1 is inclined downward at the front side. Hereinafter, a state in which the human-powered vehicle 1 is inclined upward at the front side is referred to as an upward inclined state, and a state in which the human-powered vehicle 1 is inclined downward at the front side is referred to as a downward inclined state.

The electronic controller 81 is configured to determine that the human-powered vehicle 1 is in the upward inclined state in a case where the pressure of the tire of the front wheel 30 of the human-powered vehicle 1 decreases and the pressure of the tire of the rear wheel 20 of the human-powered vehicle 1 increases. The electronic controller 81 is configured to determine that the human-powered vehicle 1 is in the downward inclined state in a case where the pressure of the tire of the front wheel 30 of the human-powered vehicle 1 increases and the pressure of the tire of the rear wheel 20 of the human-powered vehicle 1 decreases.

The electronic controller 81 can determine that the pressure of the tire decreases or the pressure of the tire increases by determining whether the pressure of the tire changes from a standard value determined in advance by a threshold determined in advance or more. For example, the electronic controller 81 can determine that the human-powered vehicle 1 is in the upward inclined state in a case where the pressure of the tire of the front wheel 30 decreases from the standard value determined in advance by a threshold or more determined in advance and the pressure of the tire of the rear wheel 20 increases from the standard value determined in advance by a threshold determined in advance or more.

The standard value and each threshold for detecting the change in pressure of the tire can be determined by an arbitrary method. For example, the pressure of the tire at a time of non-traveling can be used as the standard value, and the pressure of the tire immediately before the pressure changes can be used as the standard value. For example, each threshold can be a predetermined constant value, or can be a value calculated on the basis of the pressure of the tire at the time of non-traveling. Examples of the value calculated on the basis of the pressure of the tire at the time of non-traveling include a value obtained by multiplying the pressure of the tire at the time of non-traveling by a predetermined ratio.

Figure 6:
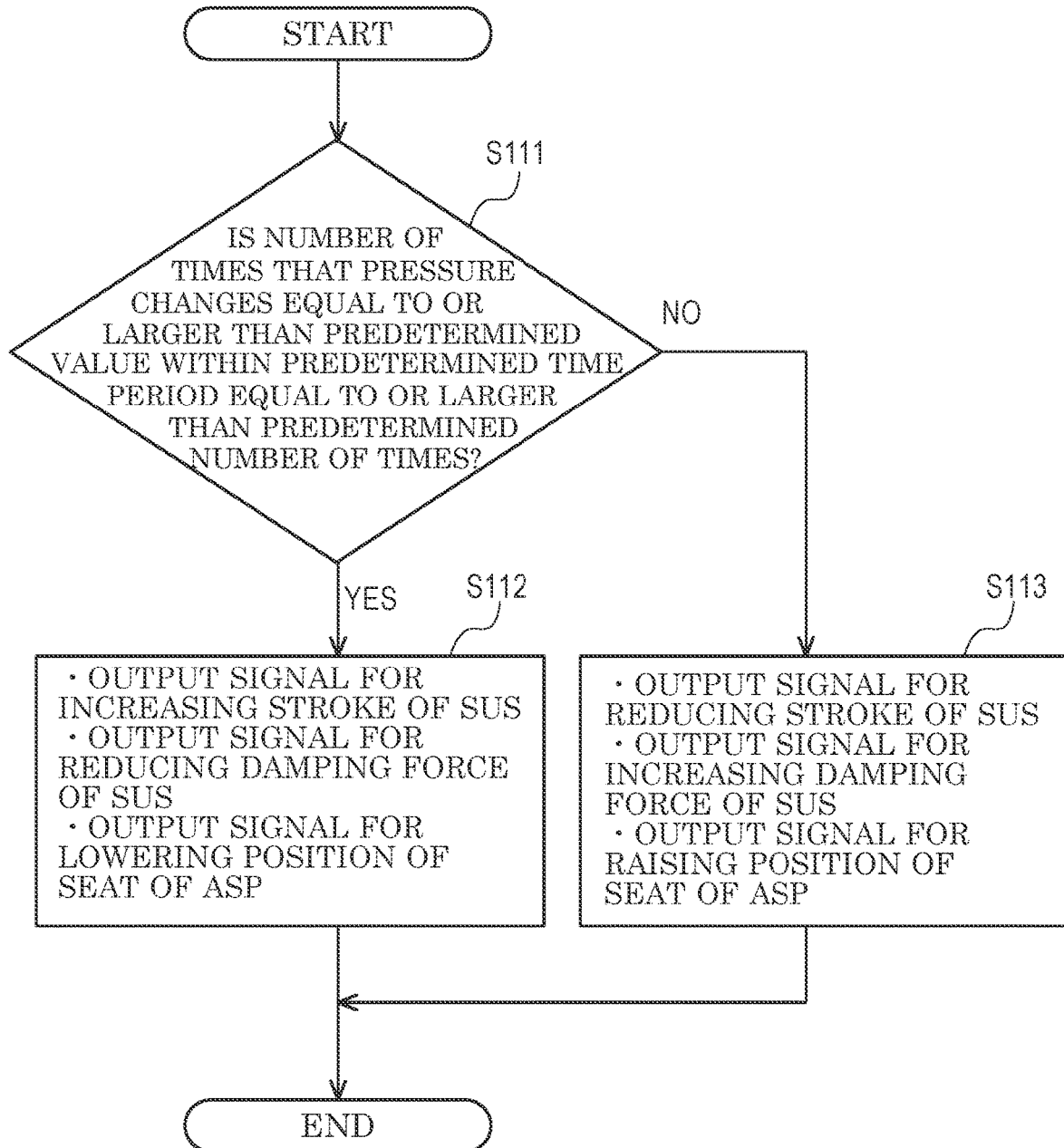
FIG. 6 is a flowchart illustrating a control process executed by an electronic controller of the human-powered vehicle control device based on a state of a road surface.

As illustrated in FIG. 6, the electronic controller 81 is configured to output a signal to perform at least one of control of increasing the stroke of the suspension 73 mounted to the human-powered vehicle 1, control of reducing a damping force of the suspension 73, and control of lowering a position of the seat 44 by the adjustable seatpost 74 mounted to the human-powered vehicle 1 in a case where change in pressure of at least one tire of the human-powered vehicle 1 corresponds to a condition in which a road surface is rough, the pressure of the at least one tire being detected by the pressure detector 91 configured to detect pressure of the at least one tire of the human-powered vehicle. The pressure detector 91 includes at least one of the first tire pressure detection device 85 and the second tire pressure detection device 86.

Here, in a case where the number of times that the pressure of the tire changes equal to or larger than a predetermined value within a predetermined time period is equal to or larger than a predetermined number of times, the electronic controller 81 can determine that the change in pressure of the tire corresponds to the condition in which the road surface is rough. Any method can be adopted to determine the predetermined time period, the predetermined value of the pressure, and the predetermined number of times, which are thresholds used as reference for determining that the change in pressure of the tire corresponds to the condition in which the road surface is rough.

Figure 7:
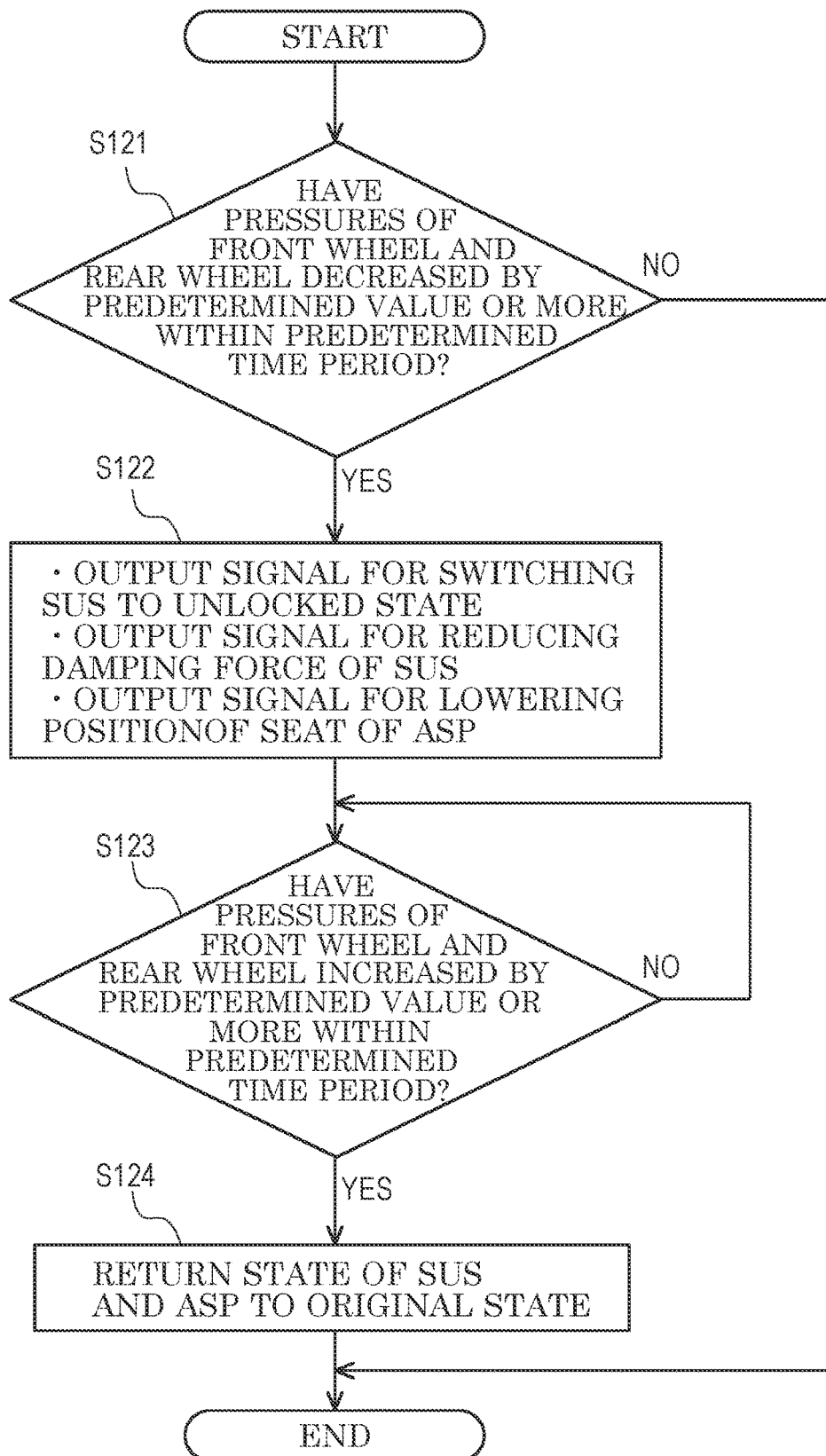
FIG. 7 is a flowchart illustrating a control process executed by an electronic controller of the human-powered vehicle control device based on a jumping state of the human-powered vehicle.

As illustrated in FIG. 7, the electronic controller 81 is configured to output a signal to control at least one of the suspension 73 and the adjustable seatpost 74 mounted to the human-powered vehicle 1 upon detection of the jumping state of the human-powered vehicle 1 on the basis of a change in pressure of at least one tire of the human-powered vehicle 1, the pressure of the at least one tire being detected by the pressure detector 91 configured to detect pressure of the at least one tire of the human-powered vehicle. The pressure detector 91 includes at least one of the first tire pressure detection device 85 and the second tire pressure detection device 86.

Here, the electronic controller 81 is configured to determine the jumping state of the human-powered vehicle 1 in a case where pressures of tires of the front wheel 30 and the rear wheel 20 of the human-powered vehicle 1 decrease within a predetermined time period.

The electronic controller 81 can determine that the pressure of the tire decreases by determining whether the pressure of the tire changes from a standard value determined in advance by a threshold determined in advance or more. For example, in a case where the pressures of the tires of the front wheel 30 and the rear wheel 20 decrease from a predetermined standard value by the predetermined threshold or more within the predetermined time period, the electronic controller 81 can detect that the human-powered vehicle 1 is jumping. Hereinafter, a state in which the human-powered vehicle 1 jumps is expressed as the jumping state.

The standard value and the threshold for detecting a decrease in pressure of the tire can be determined by an arbitrary method. For example, the pressure of the tire at the time of non-traveling can be used as the standard value, and the pressure of the tire immediately before the pressure changes can be used as the standard value. For example, the threshold can be a predetermined constant value, or can be a value calculated on the basis of the pressure of the tire at the time of non-traveling. Examples of the value calculated on the basis of the pressure of the tire at the time of non-traveling include a value obtained by multiplying the pressure of the tire at the time of non-traveling by a predetermined ratio.

Figure 8:
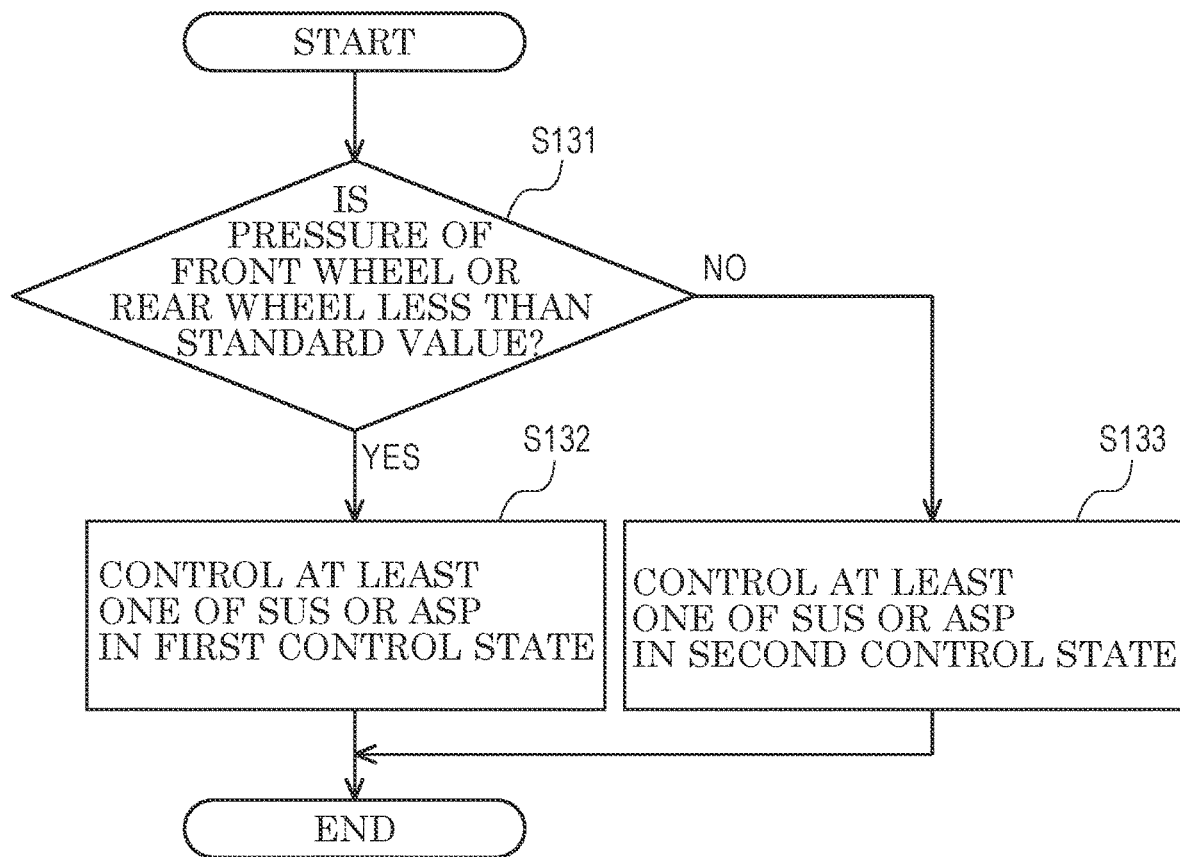
FIG. 8 is a flowchart illustrating a control process executed by an electronic controller of the human-powered vehicle control device based on a detection value of pressure.

As illustrated in FIG. 8, the electronic controller 81 is configured to control at least one of the suspension 73 and the adjustable seatpost 74 mounted to the human-powered vehicle 1 in a first control state in a case where a detection value of the pressure of at least one tire of the human-powered vehicle 1 is less than a standard value determined in advance. The pressure of the at least one tire is detected by the pressure detector 91 that is configured to detect pressure of the at least one tire of the human-powered vehicle. The electronic controller 81 is further configured to control at least one of the suspension 73 and the adjustable seatpost 74 in a second control state different from the first control state in a case where the detection value is greater than or equal to the standard value. The pressure detector 91 includes at least one of the first tire pressure detection device 85 and the second tire pressure detection device 86.

The standard value serving as a standard for determination for selecting either the first control state or the second control state can be determined by an arbitrary method. For example, the standard value can be a predetermined constant value, or can be a value calculated on the basis of the pressure of the tire at the time of non-traveling. Examples of the value calculated on the basis of the pressure of the tire at the time of non-traveling include a value obtained by multiplying the pressure of the tire at the time of non-traveling by a predetermined ratio.

Hereinafter, an example of a specific flowchart of the control of the human-powered vehicle 1 executed by the control device 80 including the electronic controller 81 will be described.

The electronic controller 81 starts control according to the flowcharts illustrated in FIGS. 5, 6, 7, and 8 at a predetermined timing. The timing of starting the control includes, for example, a timing at which power feed to the electronic controller 81 is started and a timing at which the rider performs a predetermined operation on the operation unit 84. The electronic controller 81 repeats control according to a flowchart described below for each predetermined cycle. The electronic controller 81 ends a control flow according to the flowchart described below at a predetermined timing. The timing of ending the control flow includes, for example, a timing at which power feed to the electronic controller 81 is ended and a timing at which the rider performs a predetermined operation on the operation unit 84. For simplification of description, the suspension is denoted by SUS, and the adjustable seatpost is denoted by ASP in the drawings.

FIG. 5 illustrates an example of a flowchart for performing control of the human-powered vehicle 1 by detecting that one of the pressures of the tires of the front wheel 30 or the rear wheel 20 has increased and the other has decreased.

In step S101, the electronic controller 81 determines whether the pressure of the tire of the front wheel 30 has decreased and the pressure of the tire of the rear wheel 20 has increased.

Upon determination that the pressure of the tire of the front wheel 30 has decreased and the pressure of the tire of the rear wheel 20 has increased, the electronic controller 81 proceeds the processing to step S102. The electronic controller 81 can determine that the human-powered vehicle 1 is in the upward inclined state since a load applied to the front wheel 30 has decreased and a load applied to the rear wheel 20 has increased. Upon determination that the pressure of the tire of the front wheel 30 has not decreased or the pressure of the tire of the rear wheel 20 has not increased, the electronic controller 81 proceeds the processing to step S103.

In step S102, the electronic controller 81 outputs a signal for switching the suspension 73 to the lockout state to the actuator 73a of the suspension 73. Upon receipt of the signal, the actuator 73a switches the suspension 73 to the lockout state. Upon detection that the human-powered vehicle 1 is in the upward inclined state, the electronic controller 81 switches the suspension 73 to the lockout state. Thus, driving efficiency of the human-powered vehicle 1 can be automatically brought into a suitable state in the upward inclined state.

In step S102, the electronic controller 81 outputs a signal for lowering the seatpost 74a by a predetermined amount to the actuator 74b of the adjustable seatpost 74. Upon receipt the signal, the actuator 74b lowers the seatpost 74a and the seat 44 by the predetermined amount. The electronic controller 81 lowers the position of the seat 44 by the adjustable seatpost 74 upon detection that the human-powered vehicle 1 is in the upward inclined state. As a result, in the upward inclined state, the human-powered vehicle 1 can be automatically brought into a state suitable for standing pedaling. The position of the seat 44 after lowering the seat 44 can be also arbitrarily set. It is also possible to lower the seat 44 not by the predetermined amount but to a predetermined target position.

After performing the processing of step S102, the electronic controller 81 ends the control flow in FIG. 5.

In step S103 proceeded from step S101, the electronic controller 81 determines whether the pressure of the tire of the front wheel 30 has increased and the pressure of the tire of the rear wheel 20 has decreased.

Upon determination that the pressure of the tire of the front wheel 30 has increased and the pressure of the tire of the rear wheel 20 has decreased, the electronic controller 81 proceeds the processing to step S104. The electronic controller 81 can determine that the human-powered vehicle 1 is in the downward inclined state since the load applied to the front wheel 30 has increased and the load applied to the rear wheel 20 has decreased. Upon determination that the pressure of the tire of the front wheel 30 has not increased or the pressure of the tire of the rear wheel 20 has not decreased, the electronic controller 81 ends the control flow in FIG. 5.

In step S104, the electronic controller 81 outputs a signal for switching the suspension 73 to the unlocked state to the actuator 73a of the suspension 73. Upon receipt of the signal, the actuator 73a switches the suspension 73 to the unlocked state. Upon detection that the human-powered vehicle 1 is in the downward inclined state, the electronic controller 81 switches the suspension 73 to the unlocked state. Thus, a ride quality of the human-powered vehicle 1 can be automatically brought into a suitable state in the downward inclined state.

In step S104, the electronic controller 81 outputs a signal for raising the seatpost 74a by a predetermined amount to the actuator 74b of the adjustable seatpost 74. Upon receipt the signal, the actuator 74b raises the seatpost 74a and the seat 44 by the predetermined amount. The electronic controller 81 raises the position of the seat 44 by the adjustable seatpost 74 upon detection that the human-powered vehicle 1 is in the downward inclined state. As a result, in the downward inclined state, the human-powered vehicle 1 can be automatically brought into a suitable state for seating pedaling. The position of the seat 44 after raising the seat 44 can be also arbitrarily set. After performing the processing of step S104, the electronic controller 81 ends the control flow in FIG. 5.

The flowchart in FIG. 5 illustrates an example in which the suspension 73 and the adjustable seatpost 74 are controlled in steps S102 and S104. Alternatively, it is possible to control only one of the suspension 73 or the adjustable seatpost 74, for example. Further, step S101 and step S103 can be interchanged, and step S102 and step S104 can be interchanged to detect the downward inclined state and then detect the upward inclined state.

FIG. 6 illustrates an example of a flowchart for performing control of the human-powered vehicle 1 by detecting that the number of times that the pressure of the tire changes equal to or larger than a predetermined value within a predetermined time period is equal to or larger than a predetermined number of times. In step S111, the electronic controller 81 determines whether the number of times that the pressure of the tire changes equal to or larger than the predetermined value within the predetermined time period is equal to or larger than the predetermined number of times. The tire to be determined only has to be at least one of the front wheel 30 and the rear wheel 20. The pressure of the tire of either the front wheel 30 or the rear wheel 20 can be determined, or the pressures of both tires can be determined.

Upon determination that the number of times that the pressure of the tire changes equal to or larger than the predetermined value within the predetermined time period is equal to or larger than the predetermined number of times, the electronic controller 81 proceeds the processing to step S112. Since the pressure of the tire changes greatly to some extent and frequently to some extent, it is estimated that the road surface on which the human-powered vehicle 1 is traveling is relatively rough, that is, the change in pressure corresponds to the condition in which the road surface is rough. The electronic controller 81 can detect that the road surface is relatively rough.

Upon determination that the number of times that the pressure of the tire changes equal to or larger than the predetermined value within the predetermined time period is smaller than the predetermined number of times, the electronic controller 81 proceeds the processing to step S113. Since the pressure of the tire does not change greatly or frequently, it is estimated that the road surface on which the human-powered vehicle 1 is traveling is not significantly rough, that is, the change in pressure corresponds to a condition in which the road surface is not rough. The electronic controller 81 can detect that the road surface is not significantly rough.

In step S112, the electronic controller 81 outputs a signal for increasing the stroke of the suspension 73 to the actuator 73a of the suspension 73. Upon receipt of the signal, the actuator 73a increases the stroke of the suspension 73. In step S112, the electronic controller 81 outputs a signal for reducing the damping force of the suspension 73 to the actuator 73a of the suspension 73. Upon receipt of the signal, the actuator 73a reduces the damping force of the suspension 73. In step S112, the electronic controller 81 outputs a signal for lowering the seatpost 74a by a predetermined amount to the actuator 74b of the adjustable seatpost 74. Upon receipt the signal, the actuator 74b lowers the seatpost 74a and the seat 44 by the predetermined amount. Thus, the ride quality of the human-powered vehicle 1 can be automatically brought into a suitable state in a rough road surface state. The stroke and the damping force of the suspension 73, and the height of the seat 44 can be also arbitrarily set. After performing the processing of step S112, the electronic controller 81 ends a control flow in FIG. 6.

In step S113 proceeded from step S111, the electronic controller 81 outputs a signal for decreasing the stroke of the suspension 73 to the actuator 73*a* of the suspension 73. Upon receipt of the signal, the actuator 73*a* decreases the stroke of the suspension 73. In step S113, the electronic controller 81 outputs a signal for increasing the damping force of the suspension 73 to the actuator 73*a* of the suspension 73. Upon receipt of the signal, the actuator 73*a* increases the damping force of the suspension 73. Thus, the driving efficiency of the human-powered vehicle 1 can be automatically brought into a suitable state in a smooth road surface state. The stroke and the damping force of the suspension 73 can be also arbitrarily set.

In step S113, the electronic controller 81 outputs a signal for raising the seatpost 74*a* by a predetermined amount to the actuator 74*b* of the adjustable seatpost 74. Upon receipt the signal, the actuator 74*b* raises the seatpost 74*a* and the seat 44 by the predetermined amount. Thus, the human-powered vehicle 1 can be automatically brought into a state suitable for seating pedaling in the smooth road surface state. The height of the seat 44 can be also arbitrarily set. After performing the processing of step S113, the electronic controller 81 ends the control flow in FIG. 6.

The flowchart in FIG. 6 illustrates an example in which the stroke of the suspension 73, the damping force of the suspension 73, and the adjustable seatpost 74 are controlled in steps S112 and S113, but the present invention is not limited to this example.

For example, the electronic controller 81 can perform at least one of control of reducing the stroke of the suspension 73, control of increasing the damping force of the suspension 73, and control of raising the position of the seat 44 by the adjustable seatpost 74 in a case where the change in pressure of the tire detected by the pressure detector 91 corresponds to the condition in which the road surface is not rough. The pressure detector 91 includes at least one of the first tire pressure detection device 85 and the second tire pressure detection device 86.

For example, the electronic controller 81 can perform at least one of the control of reducing the stroke of the suspension 73 and the control of increasing the damping force of the suspension 73 in a case where the change in pressure of the tire detected by the pressure detector 91 corresponds to the condition in which the road surface is not rough. The pressure detector 91 includes the first tire pressure detection device 85 and the second tire pressure detection device 86.

For example, the electronic controller 81 can perform control of raising the position of the seat 44 by the adjustable seatpost 74 mounted to the human-powered vehicle 1 in a case where the change in pressure of the tire detected by the pressure detector 91 corresponds to the condition in which the road surface is not rough. The pressure detector 91 includes at least one of the first tire pressure detection device 85 and the second tire pressure detection device 86.

FIG. 7 illustrates an example of a flowchart for performing control of the human-powered vehicle 1 by detecting that both of the pressures of the tires of the front wheel 30 and the rear wheel 20 have decreased. In step S121, the electronic controller 81 determines whether the pressures of both tires of the front wheel 30 and the rear wheel 20 of the human-powered vehicle 1 have decreased by a predetermined value or more within a predetermined time period.

Upon determination that the pressures of both tires of the front wheel 30 and the rear wheel 20 of the human-powered vehicle 1 have decreased by the predetermined value or more within the predetermined time period, the electronic controller 81 proceeds the processing to step S122. Since the loads applied to the front wheel 30 and the rear wheel 20 are both reduced, the electronic controller 81 can detect that the human-powered vehicle 1 is in the jumping state, that is, a state in which the front wheel 30 and the rear wheel 20 are both floating from a ground. Upon determination that the pressure of at least one tire of the front wheel 30 and the rear wheel 20 of the human-powered vehicle 1 has not decreased by the predetermined value or more within the predetermined time period, the electronic controller 81 ends a control flow in FIG. 7.

In step S122, the electronic controller 81 outputs a signal for switching the suspension 73 to the unlocked state to the actuator 73*a* of the suspension 73. Upon receipt of the signal, the actuator 73*a* switches the suspension 73 to the unlocked state. Upon detection of the jumping state of the human-powered vehicle 1 on the basis of change in pressure of the tire detected by the pressure detector 91, the electronic controller 81 switches the suspension 73 to the unlocked state. The pressure detector 91 includes at least one of the first tire pressure detection device 85 and the second tire pressure detection device 86. Thus, the jumping state of the human-powered vehicle 1 is detected from the pressure of the tire of the human-powered vehicle 1, and the suspension 73 can be automatically brought into a suitable state for a ground contact of the human-powered vehicle 1.

In step S122, the electronic controller 81 outputs a signal for reducing the damping force of the suspension 73 to the actuator 73*a* of the suspension 73. Upon receipt of the signal, the actuator 73*a* reduces the damping force of the suspension 73. Upon detection of the jumping state of the human-powered vehicle 1, the electronic controller 81 reduces the damping force of the suspension 73. Thus, the jumping state of the human-powered vehicle 1 is detected from the pressure of the tire of the human-powered vehicle 1, and the suspension 73 can be automatically brought into a suitable state for a ground contact of the human-powered vehicle 1. The damping force of the suspension 73 can be arbitrarily set. The damping force of the suspension 73 can be reduced to a predetermined target value instead of being reduced by a predetermined value.

In step S122, the electronic controller 81 outputs a signal for lowering the seatpost 74*a* by a predetermined amount to the actuator 74*b* of the adjustable seatpost 74. Upon receipt the signal, the actuator 74*b* lowers the seatpost 74*a* and the seat 44 by the predetermined amount. The electronic controller 81 lowers the position of the seat 44 by the adjustable seatpost 74 upon detection of the jumping state of the human-powered vehicle 1. Thus, the jumping state of the human-powered vehicle 1 is detected from the pressure of the tire of the human-powered vehicle 1, and the seatpost 74*a* can be automatically brought into a suitable state for the ground contact of the human-powered vehicle 1. The height of the seat 44 can be also arbitrarily set. After performing the processing of step S122, the electronic controller 81 proceeds the processing to step S123.

In step S123, the electronic controller 81 determines whether the pressures of both tires of the front wheel 30 and the rear wheel 20 of the human-powered vehicle 1 have increased by a predetermined value or more within a predetermined time period. Upon determination that the pressures of both tires of the front wheel 30 and the rear wheel 20 of the human-powered vehicle 1 has increased by the predetermined value or more within the predetermined time period, the electronic controller 81 proceeds the processing to step S124. Since the loads applied to the front wheel 30 and the rear wheel 20 are both increased, the electronic controller 81 can detect that the human-powered vehicle 1 is in a ground contact state, that is, a state in which the front wheel 30 and the rear wheel 20 are both in contact with the ground. Upon determination that the pressure of at least one tire of the front wheel 30 and the rear wheel 20 of the human-powered vehicle 1 has not increased by the predetermined value or more within the predetermined time period, the electronic controller 81 repeats the processing of step S123.

In step S124, the electronic controller 81 returns the state of the suspension 73 and the adjustable seatpost 74 to the state before the processing of step S122. Specifically, in a case where the suspension 73 is in the lockout state before the processing of step S122, the electronic controller 81 outputs a signal for switching the suspension 73 to the lockout state to the actuator 73*a* of the suspension 73 in step S124. In step S124, the electronic controller 81 outputs a signal for increasing the damping force of the suspension 73 to the value before the processing of step S122 to the actuator 73*a* of the suspension 73. In step S124, the electronic controller 81 outputs a signal for raising the seatpost 74*a* to the position before the processing of step S122 to the actuator 74*b* of the adjustable seatpost 74. After performing the processing of step S124, the electronic controller 81 ends the control flow in FIG. 7.

The flowchart in FIG. 7 illustrates an example in which the suspension 73 and the adjustable seatpost 74 are controlled in step S122, but the present invention is not limited to this example. For example, the electronic controller 81 can control at least one of switching of the suspension 73 mounted to the human-powered vehicle 1 to the unlocked state, reducing of the damping force of the suspension 73, and lowering of the position of the seat 44 by the adjustable seatpost 74.

The flowchart in FIG. 7 illustrates an example in which the ground contact state of the human-powered vehicle 1 is detected on the basis of the pressures of the tires of the front wheel 30 and the rear wheel 20 of the human-powered vehicle 1. However, for example, it is also possible to estimate that the human-powered vehicle 1 is in the ground contact state at a time point when a predetermined time period elapses after the human-powered vehicle 1 in step S121 is in the jumping state or after the processing of step S122 is performed, and perform the processing of step S124.

FIG. 8 illustrates an example of a flowchart for performing control of the human-powered vehicle 1 by detecting that the pressure of the tire of the front wheel 30 or the rear wheel 20 is less than the standard value. In step S131, the electronic controller 81 determines whether the pressure of at least one tire of the front wheel 30 and the rear wheel 20 is less than the standard value. Upon determination that the pressure of at least one tire of the front wheel 30 and the rear wheel 20 is less than the standard value, the electronic controller 81 proceeds the processing to step S132. Upon determination that the pressures of both tires of the front wheel 30 and the rear wheel 20 are the standard value or more, the electronic controller 81 proceeds the processing to step S133.

The processing of step S131 is not intended to detect a temporary decrease in the pressure of the tire accompanying a traveling state of the human-powered vehicle 1 such as the inclined state, the jumping state, and a vibration state, but is intended to detect a continuous decrease in pressure of the tire, that is, a deflation of the tire. Therefore, in the processing of step S131, in order to detect a continuous decrease in pressure of the tire, it can be determined whether a state in which the pressure of the tire is less than the standard value has continued for a predetermined time period or more.

In step S132, the electronic controller 81 controls at least one of the suspension 73 and the adjustable seatpost 74 in the first control state. The suspension 73 includes at least one of a front suspension and a rear suspension. The first control state includes at least one of a state in which the suspension 73 is switched to the lockout state, a state in which the stroke of the suspension 73 is reduced, a state in which the damping force of the suspension 73 is increased, and a state in which the position of the seat 44 is changed to a predetermined position by the adjustable seatpost 74.

For example, the electronic controller 81 outputs a signal for switching the suspension 73 to the lockout state to the actuator 73*a* of the suspension 73. In a case where the pressure of the tire is less than the standard value, the electronic controller 81 can automatically bring the driving efficiency of the human-powered vehicle 1 into a suitable state in a state where the pressure of the tire of the human-powered vehicle 1 is low by switching the suspension 73 to the lockout state.

The electronic controller 81 outputs a signal for reducing the stroke of the suspension 73 to the actuator 73*a* of the suspension 73. In a case where the pressure of the tire is less than the standard value, the electronic controller 81 can automatically bring the driving efficiency of the human-powered vehicle 1 into a suitable state in a state where the pressure of the tire of the human-powered vehicle 1 is low by reducing the stroke of the suspension 73.

The electronic controller 81 outputs a signal for increasing the damping force of the suspension 73 to the actuator 73*a* of the suspension 73. In a case where the pressure of the tire is less than the standard value, the electronic controller 81 can automatically bring the driving efficiency of the human-powered vehicle 1 into a suitable state in a state where the pressure of the tire of the human-powered vehicle 1 is low by increasing the damping force of the suspension 73.

The electronic controller 81 outputs a signal for raising or lowering the seatpost 74*a* by a predetermined amount to the actuator 74*b* of the adjustable seatpost 74. In a state where the pressure of the tire is less than the standard value, the electronic controller 81 can automatically bring the seat 44 into a suitable state in a case where the pressure of the tire of the human-powered vehicle 1 is low by changing the position of the seat 44 to either an upper position or a lower position by the adjustable seatpost 74. The rider can arbitrarily determine which position of the seat 44 to be changed. After performing the processing of step S132, the electronic controller 81 ends a control flow in FIG. 8.

In step S133 proceeded from step S131, the electronic controller 81 controls at least one of the suspension 73 and the adjustable seatpost 74 in the second control state different from the first control state. The second control state includes at least one of a state in which the suspension 73 is switched to the unlocked state, a state in which the stroke of the suspension 73 is greater than in the first control state, a state in which the damping force of the suspension 73 is lower than in the first control state, and a state in which the position of the seat 44 is changed to a predetermined position different in the first control state by the adjustable seatpost 74. After performing the processing of step S133, the electronic controller 81 ends the control flow in FIG. 8.

In the control according to the first embodiment, an example is described in which the electronic controller 81 outputs a signal for switching the suspension 73 to the lockout state or the unlocked state in a predetermined case. Alternatively, for example, in a state where the suspension 73 has already been switched to a desired state, the processing for outputting the signal can be canceled. For example, in a case where the suspension 73 is currently in the lockout state, the processing of outputting the signal for switching to the lockout state can be cancelled.

In the control according to the first embodiment, an example is described in which the electronic controller 81 outputs a signal for increasing the stroke of the suspension 73 or a signal for decreasing the stroke of the suspension in a predetermined case. However, for example, in a case where an adjustable range of the stroke of the suspension 73 is exceeded, the processing of outputting the signal can be canceled. For example, in a case where the stroke of the suspension 73 is currently a minimum, the processing of outputting the signal for reducing the stroke can be cancelled.

Similarly, as for the signal for reducing or increasing the damping force of the suspension 73 and the signal for raising or lowering the adjustable seatpost 74 by a predetermined amount, in a case where the adjustable range of the suspension 73 or the adjustable seatpost 74 is exceeded, the processing of outputting the signal can be canceled. The same applies to each embodiment described below.

Second Embodiment

Figure 9:
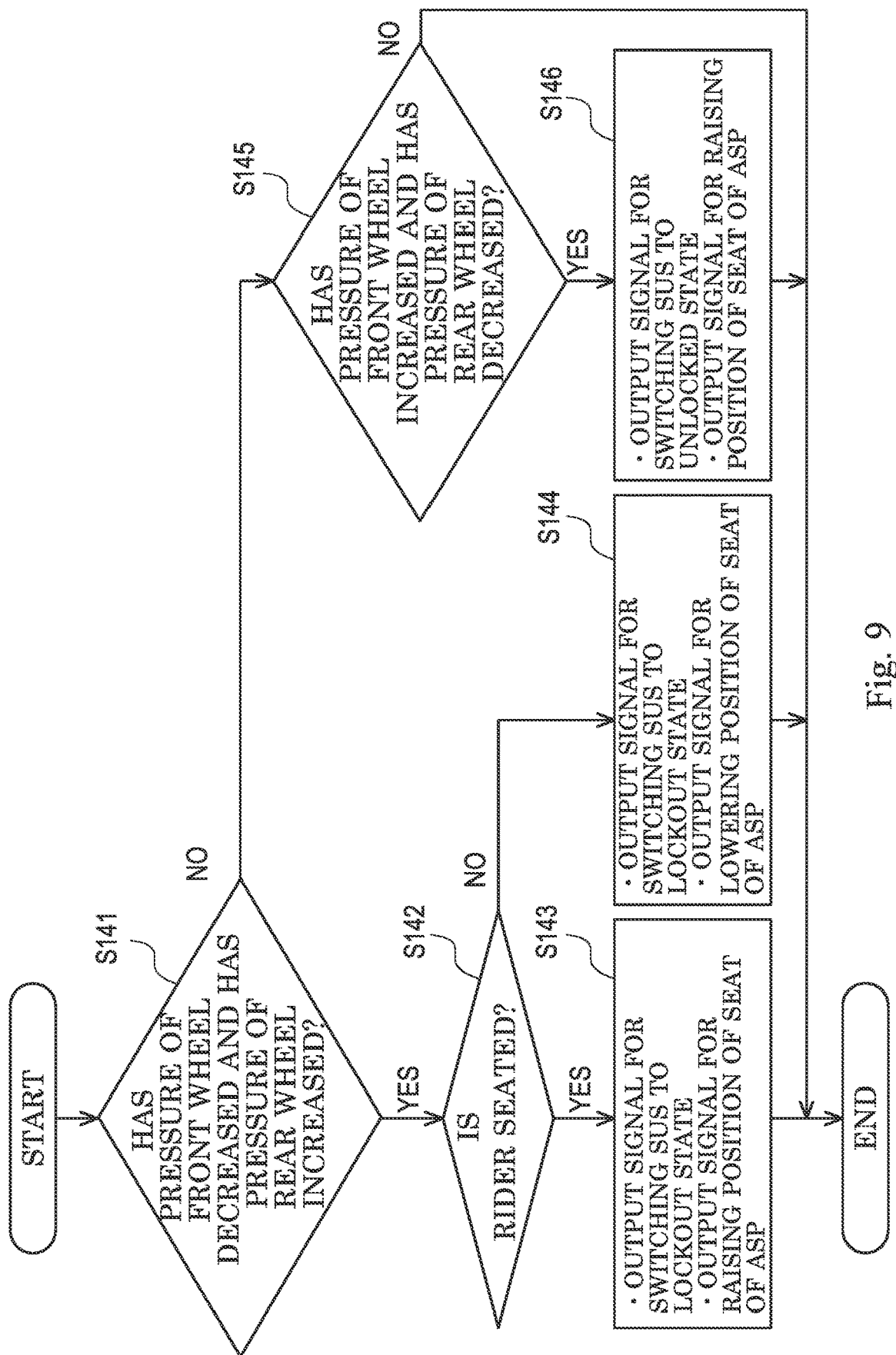
FIG. 9 is a flowchart illustrating a control process executed by an electronic controller of the human-powered vehicle control device based on the inclined state of the human-powered vehicle and whether a rider is seated in a second embodiment.

A second embodiment will be described with reference to FIG. 9. The second embodiment is similar to the first embodiment except that a flowchart illustrated in FIG. 9 is used instead of the flowchart illustrated in FIG. 5. Hereinafter, the flowchart illustrated in FIG. 9 will be described.

In step S141, the electronic controller 81 determines whether the pressure of the tire of the front wheel 30 has decreased and the pressure of the tire of the rear wheel 20 has increased. Upon determination that the pressure of the tire of the front wheel 30 has decreased and the pressure of the tire of the rear wheel 20 has increased, the electronic controller 81 proceeds the processing to step S142. Upon determination that the pressure of the tire of the front wheel 30 has decreased and the pressure of the tire of the rear wheel 20 has increased, the electronic controller 81 can determine that the human-powered vehicle 1 is in the upward inclined state. Upon determination that the pressure of the tire of the front wheel 30 has not decreased or the pressure of the tire of the rear wheel 20 has not increased, the electronic controller 81 proceeds the processing to step S145.

In step S142, the electronic controller 81 determines whether the rider is seated on the seat 44. Upon determination that the rider is seated on the seat 44, the electronic controller 81 proceeds the processing to step S143. Upon determination that the rider is not seated on the seat 44, the electronic controller 81 proceeds the processing to step S144.

In step S143, the electronic controller 81 outputs a signal for switching the suspension 73 to the lockout state to the actuator 73a of the suspension 73. Upon receipt of the signal, the actuator 73a switches the suspension 73 to the lockout state.

In step S143, the electronic controller 81 outputs a signal for raising the seatpost 74a by a predetermined amount to the actuator 74b of the adjustable seatpost 74. Upon receipt the signal, the actuator 74b raises the seatpost 74a and the seat 44 by the predetermined amount. The electronic controller 81 raises the position of the seat 44 by the adjustable seatpost 74 upon detection that the human-powered vehicle 1 is in the upward inclined state and that a rider is seated on the seat 44 by a seating detector detecting whether the rider is seated on the seat 44. As a result, in the upward inclined state, the human-powered vehicle 1 can be automatically brought into a suitable state for seating pedaling. After performing the processing of step S143, the electronic controller 81 ends a control flow in FIG. 9. The seating detector includes the seating sensor 90.

In step S144 proceeded from step S142, the electronic controller 81 outputs a signal for switching the suspension 73 to the lockout state to the actuator 73a of the suspension 73. Upon receipt of the signal, the actuator 73a switches the suspension 73 to the lockout state.

In step S144, the electronic controller 81 outputs a signal for lowering the seatpost 74a by a predetermined amount to the actuator 74b of the adjustable seatpost 74. Upon receipt the signal, the actuator 74b lowers the seatpost 74a and the seat 44 by the predetermined amount. The electronic controller 81 lowers the position of the seat 44 by the adjustable seatpost 74 upon detection that the human-powered vehicle 1 is in the upward inclined state and that a rider is not seated on the seat 44 by a seating detector detecting whether the rider is seated on the seat 44. As a result, in the upward inclined state, the human-powered vehicle 1 can be automatically brought into a state suitable for standing pedaling. After performing the processing of step S144, the electronic controller 81 ends the control flow in FIG. 9. The seating detector includes the seating sensor 90.

Since the processing of step S145 and step S146 proceeded from step S141 is similar to the processing of step S103 and step S104 in FIG. 5, description thereof will be omitted. The flowchart in FIG. 9 illustrates an example in which the suspension 73 and the adjustable seatpost 74 are controlled in steps S143, S144, and S146. Alternatively, it is possible to control only one of the suspension 73 or the adjustable seatpost 74, for example.

Third Embodiment

Figure 10:
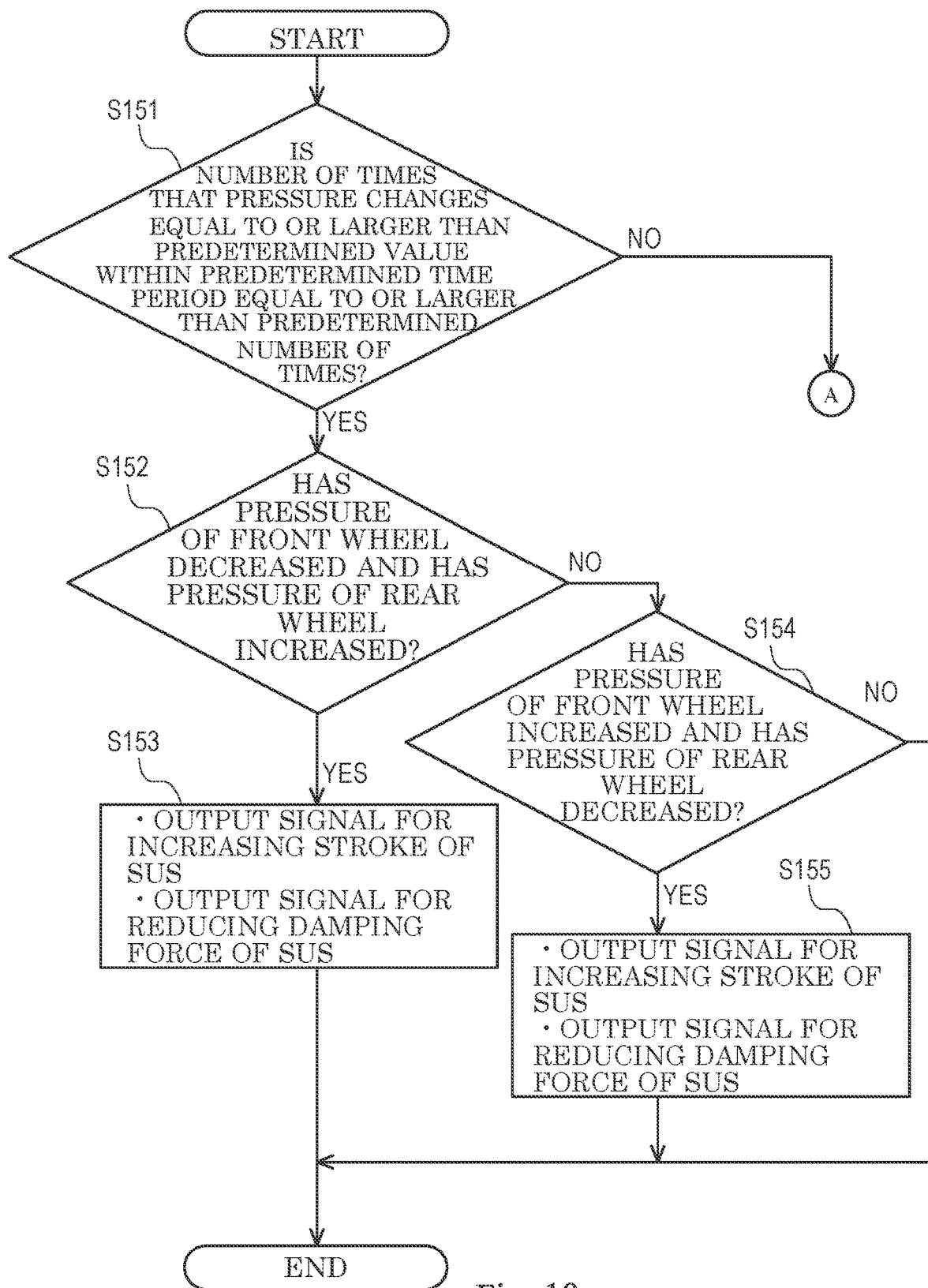
FIG. 10 is a first portion of a flowchart illustrating a control process executed by an electronic controller of the human-powered vehicle control device based on the state of the road surface and the inclined state of the human-powered vehicle in a third embodiment.
Figure 11:
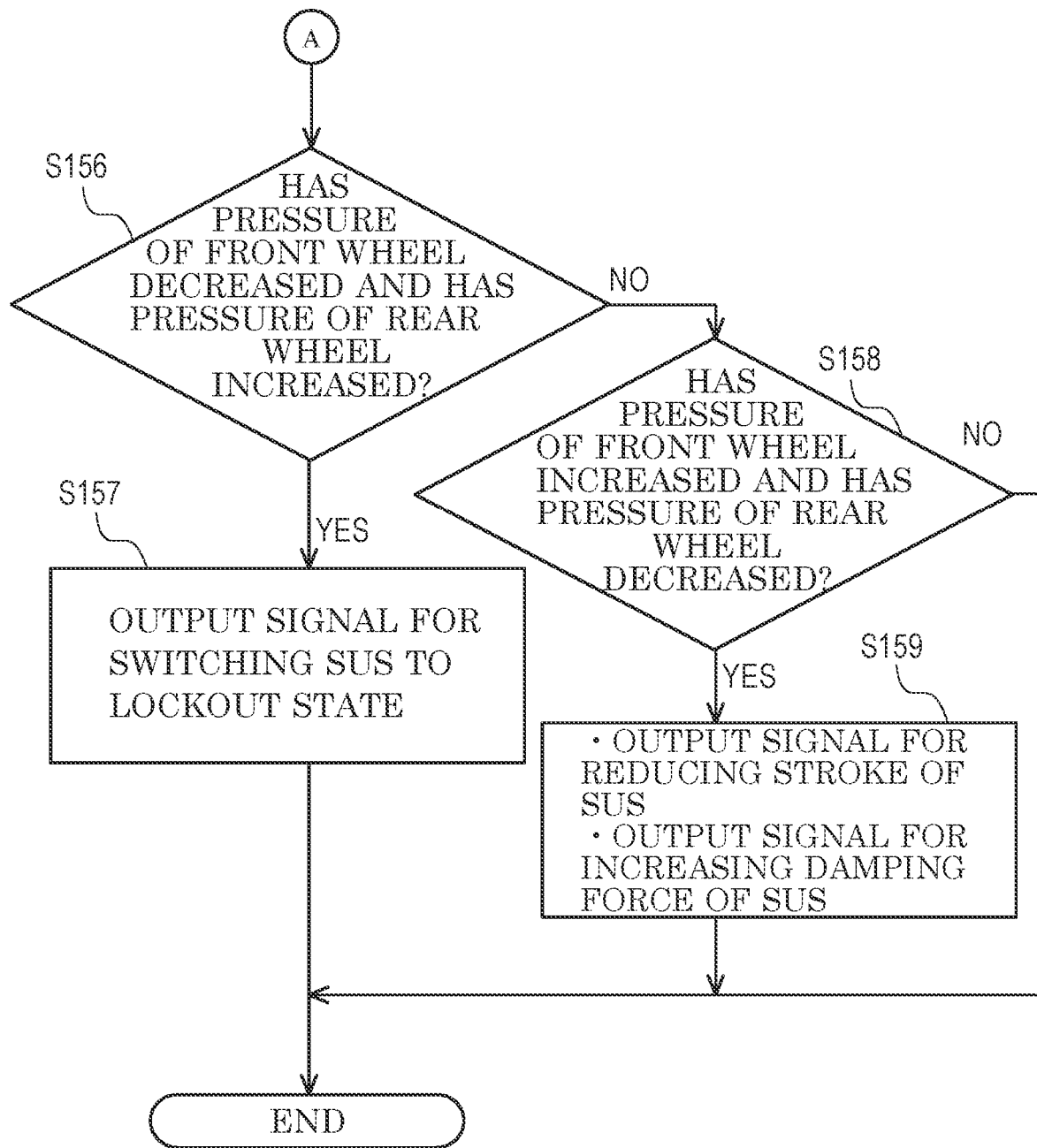
FIG. 11 is a second portion of the flowchart of processing in FIG. 10.

A third embodiment will be described with reference to FIGS. 10 and 11. The third embodiment is similar to the first embodiment except that flowcharts illustrated in FIGS. 10 and 11 are used instead of the flowchart illustrated in FIG. 6. Hereinafter, the flowcharts illustrated in FIGS. 10 and 11 will be described.

In step S151, the electronic controller 81 determines whether the number of times that the pressure of the tire changes equal to or larger than the predetermined value within the predetermined time period is equal to or larger than the predetermined number of times. Upon determination that the number of times that the pressure of the tire changes equal to or larger than the predetermined value within the predetermined time period is equal to or larger than the predetermined number of times, the electronic controller 81 proceeds the processing to step S152. Upon determination that the number of times that the pressure of the tire changes equal to or larger than a predetermined value within a predetermined time period is equal to or larger than a predetermined number of times, the electronic controller 81 can detect that the road surface on which the human-powered vehicle 1 is traveling is relatively rough, that is, the change in pressure corresponds to a condition in which the road surface is rough. Upon determination that the number of times that the pressure of the tire changes equal to or larger than the predetermined value within the predetermined time period is smaller than the predetermined number of times, the electronic controller 81 proceeds the processing to step S156. Upon determination that the number of times that the pressure of the tire equal to or larger than the predetermined value within the predetermined time is smaller than the predetermined number of times, the electronic controller 81 can determine that the road surface on which the human-powered vehicle 1 is traveling is not significantly rough, that is, the change in pressure corresponds to the condition in which the road surface is not rough.

In step S152, the electronic controller 81 determines whether the pressure of the tire of the front wheel 30 has decreased and the pressure of the tire of the rear wheel 20 has increased. Upon determination that the pressure of the tire of the front wheel 30 has decreased and the pressure of the tire of the rear wheel 20 has increased, the electronic controller 81 proceeds the processing to step S153. Upon determination that the pressure of the tire of the front wheel 30 has decreased and the pressure of the tire of the rear wheel 20 has increased, the electronic controller 81 can detect that the human-powered vehicle 1 is in the upward inclined state. Upon determination that the pressure of the tire of the front wheel 30 has not decreased or the pressure of the tire of the rear wheel 20 has not increased, the electronic controller 81 proceeds the processing to step S154.

In step S153, the electronic controller 81 outputs a signal for increasing the stroke of the suspension 73 to the actuator 73*a* of the suspension 73. Upon receipt of the signal, the actuator 73*a* increases the stroke of the suspension 73. In step S153, the electronic controller 81 outputs a signal for reducing the damping force of the suspension 73 to the actuator 73*a* of the suspension 73. Upon receipt of the signal, the actuator 73*a* reduces the damping force of the suspension 73. The stroke and the damping force of the suspension 73 can be also arbitrarily set. For example, the stroke of the suspension 73 can be increased to a predetermined target value instead of increasing by a predetermined amount.

The electronic controller 81 performs at least one of the control of increasing the stroke of the suspension 73 and the control of reducing the damping force of the suspension 73 upon detection that the change in pressure of the tire detected by the pressure detector 91 corresponds to the condition in which the road surface is rough and the human-powered vehicle 1 is in the upward inclined state. The pressure detector 91 includes at least one of the first tire pressure detection device 85 and the second tire pressure detection device 86. Thus, the ride quality of the human-powered vehicle 1 can be automatically brought into a suitable state in the rough road surface state and in the upward inclined state. After performing the processing of step S153, the electronic controller 81 ends control flows in FIGS. 10 and 11.

In step S154 proceeded from step S152, the electronic controller 81 determines whether the pressure of the tire of the front wheel 30 has increased and the pressure of the tire of the rear wheel 20 has decreased. Upon determination that the pressure of the tire of the front wheel 30 has increased and the pressure of the tire of the rear wheel 20 has decreased, the electronic controller 81 proceeds the processing to step S155. Upon determination that the pressure of the tire of the front wheel 30 has increased and the pressure of the tire of the rear wheel 20 has decreased, the electronic controller 81 can detect that the human-powered vehicle 1 is in the downward inclined state. Upon determination that the pressure of the tire of the front wheel 30 has not increased or the pressure of the tire of the rear wheel 20 has not decreased, the electronic controller 81 ends the control flows in FIGS. 10 and 11.

In step S155, the electronic controller 81 outputs a signal for increasing the stroke of the suspension 73 to the actuator 73*a* of the suspension 73. Upon receipt of the signal, the actuator 73*a* increases the stroke of the suspension 73. In step S153, the electronic controller 81 outputs a signal for reducing the damping force of the suspension 73 to the actuator 73*a* of the suspension 73. Upon receipt of the signal, the actuator 73*a* reduces the damping force of the suspension 73. The stroke and the damping force of the suspension 73 can be also arbitrarily set.

The electronic controller 81 performs at least one of the control of increasing the stroke of the suspension 73 and the control of reducing the damping force of the suspension 73 upon detection that the change in pressure of the tire detected by the pressure detector 91 corresponds to the condition in which the road surface is rough and the human-powered vehicle 1 is in the downward inclined state. Thus, the ride quality of the human-powered vehicle 1 can be automatically brought into a suitable state in the rough road surface state and in the downward inclined state. After performing the processing of step S155, the electronic controller 81 ends the control flows in FIGS. 10 and 11. The pressure detector 91 includes at least one of the first tire pressure detection device 85 and the second tire pressure detection device 86.

In step S156 proceeded from step S151, the electronic controller 81 determines whether the pressure of the tire of the front wheel 30 has decreased and the pressure of the tire of the rear wheel 20 has increased. Upon determination that the pressure of the tire of the front wheel 30 has decreased and the pressure of the tire of the rear wheel 20 has increased, the electronic controller 81 proceeds the processing to step S157. Upon determination that the pressure of the tire of the front wheel 30 has decreased and the pressure of the tire of the rear wheel 20 has increased, the electronic controller 81 can detect that the human-powered vehicle 1 is in the upward inclined state. Upon determination that the pressure of the tire of the front wheel 30 has not decreased or the pressure of the tire of the rear wheel 20 has not increased, the electronic controller 81 proceeds the processing to step S158.

In step S157, the electronic controller 81 outputs a signal for switching the suspension 73 to the lockout state to the actuator 73*a* of the suspension 73. Upon receipt of the signal, the actuator 73*a* switches the suspension 73 to the lockout state. Thus, the driving efficiency of the human-powered vehicle 1 can be automatically brought into a suitable state in the smooth road surface state and in the upward inclined state.

The electronic controller 81 switches the suspension 73 to the lockout state upon detection that the change in pressure of the tire detected by the pressure detector 91 corresponds to the condition in which the road surface is not rough and the human-powered vehicle 1 is in the upward inclined state. Thus, the driving efficiency of the human-powered vehicle 1 can be automatically brought into a suitable state in the smooth road surface state and in the upward inclined state. After performing the processing of step S157, the electronic controller 81 ends the control flows in FIGS. 10 and 11. The pressure detector 91 includes at least one of the first tire pressure detection device 85 and the second tire pressure detection device 86.

In step S158 proceeded from step S156, the electronic controller 81 determines whether the pressure of the tire of the front wheel 30 has increased and the pressure of the tire of the rear wheel 20 has decreased. Upon determination that the pressure of the tire of the front wheel 30 has increased and the pressure of the tire of the rear wheel 20 has decreased, the electronic controller 81 proceeds the processing to step S159. Upon determination that the pressure of the tire of the front wheel 30 has increased and the pressure of the tire of the rear wheel 20 has decreased, the electronic controller 81 can detect that the human-powered vehicle 1 is in the downward inclined state. Upon determination that the pressure of the tire of the front wheel 30 has not increased or the pressure of the tire of the rear wheel 20 has not decreased, the electronic controller 81 ends the control flows in FIGS. 10 and 11.

In step S159, the electronic controller 81 outputs a signal for reducing the stroke of the suspension 73 to the actuator 73*a* of the suspension 73. Upon receipt of the signal, the actuator 73*a* decreases the stroke of the suspension 73. In step S159, the electronic controller 81 outputs a signal for increasing the damping force of the suspension 73 to the actuator 73*a* of the suspension 73. Upon receipt of the signal, the actuator 73*a* increases the damping force of the suspension 73. The stroke and the damping force of the suspension 73 can be also arbitrarily determined.

The electronic controller 81 performs at least one of the control of reducing the stroke of the suspension 73 and the control of increasing the damping force of the suspension 73 upon detection that the change in pressure of the tire detected by the pressure detector 91 corresponds to the condition in which the road surface is not rough and the human-powered vehicle 1 is in the downward inclined state. Thus, the driving efficiency of the human-powered vehicle 1 can be automatically brought into a suitable state in the smooth road surface state and in the downward inclined state. The pressure detector 91 includes at least one of the first tire pressure detection device 85 and the second tire pressure detection device 86.

The flowcharts in FIGS. 10 and 11 illustrate an example in which the stroke and the damping force of the suspension 73 are controlled in steps S153, S155, and S159. Alternatively, it is possible to control only one of the stroke or the damping force of the suspension 73, for example.

Fourth Embodiment

A fourth embodiment will be described below with reference to FIGS. 12 to 20. The configuration of the human-powered vehicle 1 according to the fourth embodiment is similar to the configuration in the first embodiment except that the front derailleur 75 is included in addition to the rear derailleur 72 as the transmission device. In the present embodiment, the derailleur includes the front derailleur 75 and the rear derailleur 72. In the following description, components common to those of the first embodiment are denoted by the same reference signs as those of the first embodiment, and description thereof will be omitted as appropriate.

Figure 12:
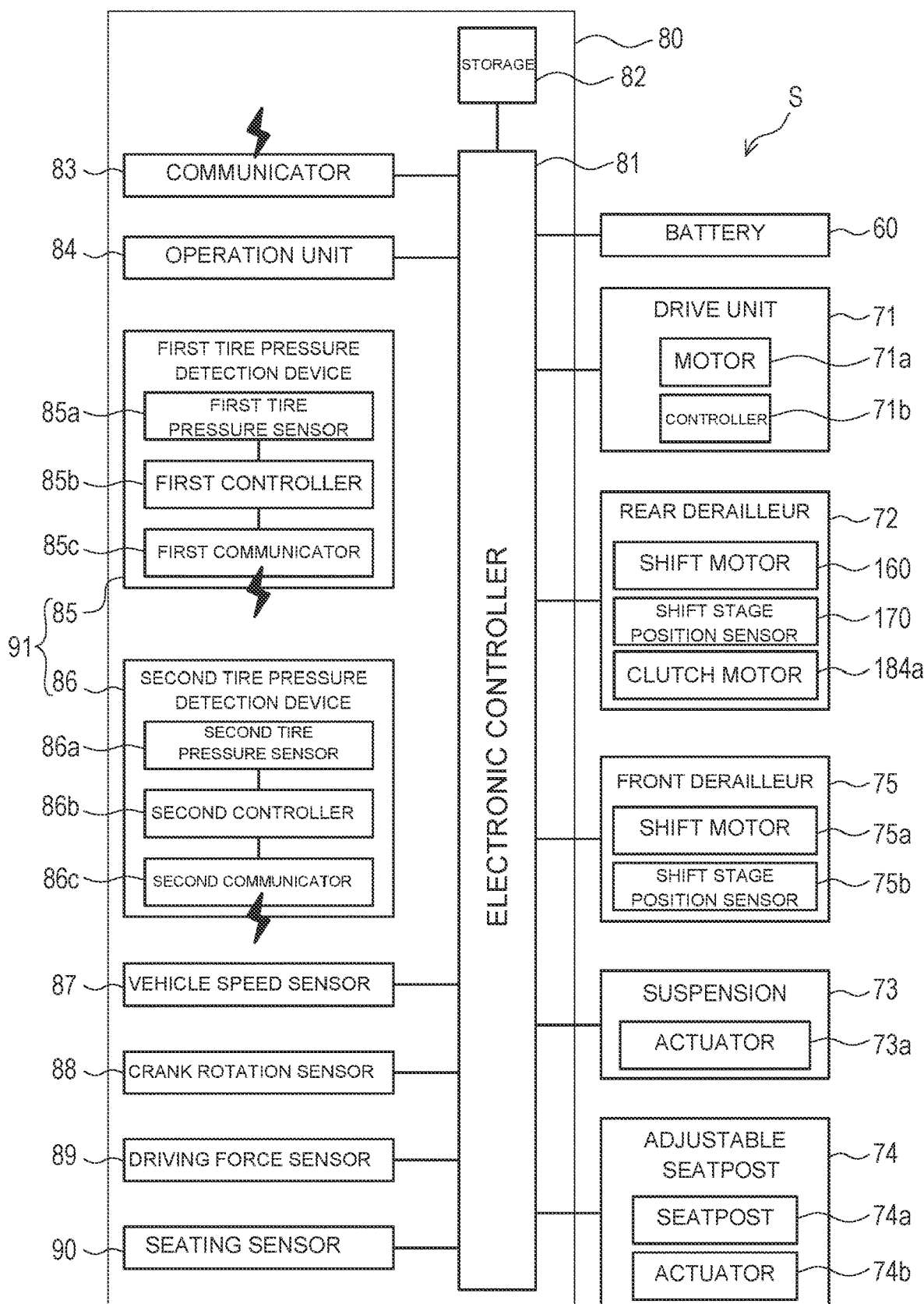
FIG. 12 is a block diagram of an electronic system included in the human-powered vehicle in a fourth embodiment.

The front derailleur 75 illustrated in FIG. 12 is a transmission device that changes the transmission ratio together with the rear derailleur 72. The front derailleur 75 can change the transmission ratio by replacing the chain 53 between a plurality of front sprockets. The front derailleur 75 includes a shift motor 75*a* that operates the front derailleur 75 and a shift stage position sensor 75*b* that detects an operation status of the front derailleur 75. The shift motor 75*a* and the shift stage position sensor 75*b* are electrically connected to the electronic controller 81 by wire. The shift motor 75*a* and the shift stage position sensor 75*b* can be electrically connected to the electronic controller 81 wirelessly. The shift motor 75*a* is driven in response to a control signal from the electronic controller 81. The shift stage position sensor 75*b* outputs a signal corresponding to a detection value to the electronic controller 81.

The front sprocket assembly 51 and the rear sprocket assembly 52 according to the present embodiment are described below with reference to FIG. 1. The front sprocket assembly 51 and the rear sprocket assembly 52 according to the present embodiment each include a plurality of sprockets. The front sprocket assembly 51 includes a plurality of front sprockets having different numbers of teeth. The front sprocket assembly 51 includes at least a first front sprocket and a second front sprocket different from the first front sprocket. In the present embodiment, the front sprocket assembly 51 includes the first front sprocket and the second front sprocket. The first front sprocket has more teeth than the second front sprocket. The front sprocket assembly 51 can include three or more front sprockets having different numbers of teeth. In a case where the front sprocket assembly 51 includes two or more front sprockets having different numbers of teeth, in a state where the front sprocket assembly 51 is attached to the human-powered vehicle 1, a front sprocket having the largest number of teeth is disposed farther from a center surface of the frame of the bicycle than a front sprocket having the smallest number of teeth.

The rear sprocket assembly 52 includes a plurality of rear sprockets having different numbers of teeth. The rear sprocket assembly 52 includes at least a first rear sprocket and a second rear sprocket different from the first rear sprocket. In the present embodiment, the rear sprocket assembly 52 includes ten rear sprockets. The rear sprocket assembly 52 can include eleven or more rear sprockets having different numbers of teeth, or can include nine or less sprockets having different numbers of teeth. In a case where the rear sprocket assembly 52 includes two or more rear sprockets, in a state where the rear sprocket assembly 52 is attached to the human-powered vehicle 1, a rear sprocket having the largest number of teeth is disposed closest to the center surface of the frame of the bicycle than a rear sprocket having the smallest number of teeth. The chain 53 is coupled to one of the front sprockets included in the front sprocket assembly 51 and one of the rear sprockets included in the rear sprocket assembly 52. A rotational force of the front sprocket assembly 51 is transmitted to the rear sprocket via the chain 53.

Figure 13:
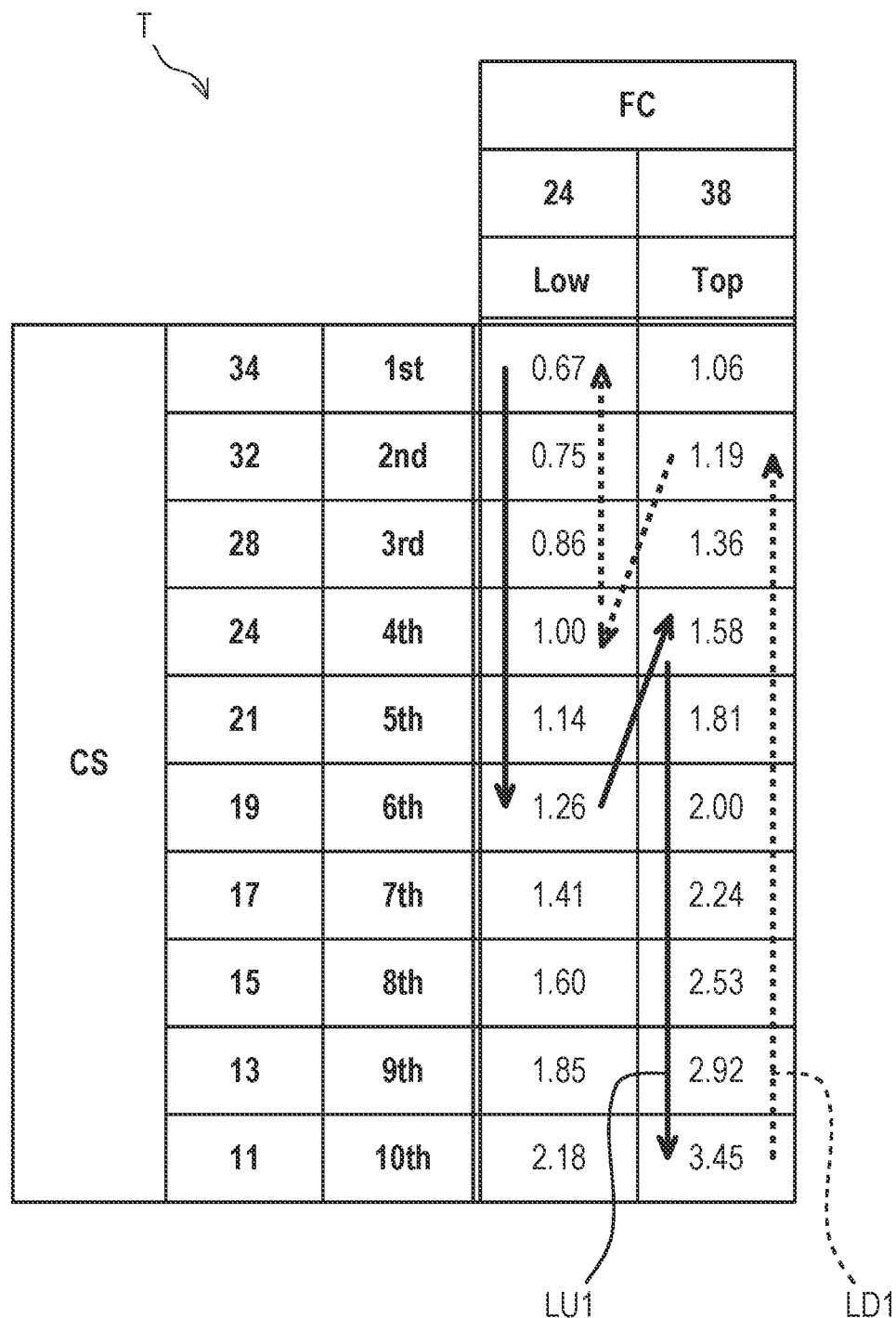
FIG. 13 is a diagram illustrating an example of a shift table and a shift route.

A shift table T illustrated in FIG. 13 relates to the front sprocket assembly 51 including the plurality of front sprockets having different numbers of teeth and the rear sprocket assembly 52 including the plurality of rear sprockets having different numbers of teeth. The shift table T relates to the transmission ratio calculated by a value obtained by dividing the number of teeth of the front sprocket with which the chain 53 is engaged by the number of teeth of the rear sprocket with which the chain 53 is engaged. In the shift table T, 20 types of transmission ratios are defined by a combination of two front sprockets included in the front sprocket assembly 51 and ten rear sprockets included in the rear sprocket assembly 52. In the shift table T illustrated in FIG. 13, the front sprocket is referred to as "FC", and the rear sprocket is referred to as "CS".

In an example in FIG. 13, since the transmission ratio is calculated by dividing the number of teeth of the front sprocket by the number of teeth of the rear sprocket, the value of the transmission ratio increases by upshifting. However, a method of calculating the transmission ratio defined by the shift table T is not limited. For example, it is also possible to set, as the transmission ratio, a value of the transmission ratio defined by the shift table T calculated by dividing the number teeth of the rear sprocket by the number of teeth of the front sprocket. In a case where the value calculated by dividing the number of teeth of the rear sprocket by the number teeth of the front sprocket is set as the transmission ratio, unlike the example in FIG. 13, the value of the transmission ratio decreases along with upshifting, and thus a magnitude relationship in determination of various control using the transmission ratio is also reversed. In the present embodiment described below, the value calculated by dividing the number of teeth of the front sprocket by the number of teeth of the rear sprocket is defined as the transmission ratio.

In the shift table T illustrated in FIG. 13, of the two front sprockets included in the front sprocket assembly 51, the first front sprocket which is a front sprocket having a larger number of teeth is referred to as "Top", and the second front sprocket which is a front sprocket having a smaller number of teeth is referred to as "Low". In the shift table T, the ten rear sprockets included in the rear sprocket assembly 52 are referred to as "1st", "2nd", "3rd", . . . , and "10th" in an order from the rear sprocket having a larger number of teeth to the rear sprocket having a smaller number of teeth. In the shift table T illustrated in FIG. 13, for the purpose of explanation, examples of specific numbers of teeth of the sprockets and specific numerical values of the transmission ratio are illustrated. The front derailleur 75 and the rear derailleur 72 can change the transmission ratio of the human-powered vehicle 1 to an arbitrary transmission ratio defined by the shift table T, that is, change shift by engaging the chain 53 with an arbitrary sprocket out of the sprockets of the front sprocket assembly 51 and the rear sprocket assembly 52.

In the present embodiment, the electronic controller 81 includes two shift modes, which are a manual shift mode and an automatic shift mode. In the manual shift mode, the electronic controller 81 outputs a signal to the derailleur in accordance with the operation of the operation unit 84 by the rider. As a result, in the manual shift mode, the shift is changed in accordance with the operation of the operation unit 84 by the rider. In the automatic shift mode, the electronic controller 81 controls the derailleur in a case where a reference value related to the traveling state of the human-powered vehicle 1 reaches a predetermined threshold. In the automatic shift mode, the electronic controller 81 drives a shift motor of the derailleur in a case where the reference value related to the traveling state of the human-powered vehicle 1 reaches the predetermined threshold. Accordingly, in the automatic shift mode, the shift is automatically changed in accordance with the traveling state of the human-powered vehicle 1. The reference value related to the traveling state of the human-powered vehicle 1 includes, for example, a value related to a speed of the human-powered vehicle 1, inclination of the human-powered vehicle 1, a cadence input to the human-powered vehicle 1, a torque input to the human-powered vehicle 1, and the like. The manual shift mode and the automatic shift mode can be arbitrarily switched by an operation input to the operation unit 84. The electronic controller 81 can automatically switch between the manual shift mode and the automatic shift mode in accordance with the state of the human-powered vehicle 1.

The manual shift mode and the automatic shift mode further include two shift modes which are a synch mode in which the front derailleur 75 and the rear derailleur 72 are controlled cooperatively and a non-synch mode in which the front derailleur 75 and the rear derailleur 72 are individually controlled. The synch mode and the non-synch mode can be arbitrarily switched by an operation input to the operation unit 84. The electronic controller 81 can automatically switch between the synch mode and the non-synch mode in accordance with the state of the human-powered vehicle 1.

In a case where the shift mode is the synch mode, for example, as indicated by an upshifting route LU1 and a downshifting route LD1 in FIG. 13, the electronic controller 81 controls the front derailleur 75 and the rear derailleur 72 cooperatively so as to pass through a predetermined shift route in the shift table T. The upshifting route LU1 is a shift route used for changing the transmission ratio to be larger. The downshifting route LD1 is a shift route used for changing the transmission ratio to be smaller.

For example, in the example illustrated in FIG. 13, in a case where an upshifting operation is performed by the operation unit 84 from a state in which the front sprocket with which the chain 53 is engaged is "Low" and the rear sprocket with which the chain 53 is engaged is "1st", the rear sprocket with which the chain 53 is engaged is sequentially switched from "1st" to "6th". In a case where the upshifting operation is further performed, the front sprocket with which the chain 53 is engaged is switched from "Low" to "Top", and the rear sprocket with which the chain 53 is engaged is switched from "6th" to "4th". Although the rear sprocket engaged with the chain 53 is switched to a rear sprocket having a larger number of teeth, the transmission ratio is increased, and the shift can be smoothly changed. In a case where the upshifting operation is further performed, the rear sprocket with which the chain 53 is engaged is sequentially switched from "4th" to "10th". In a case where the upshifting operation is performed, the electronic controller 81 controls the front derailleur 75 and the rear derailleur 72 cooperatively so as to pass through the upshifting route LU1.

Similarly, in a case where a downshifting operation is performed, the electronic controller 81 controls the front derailleur 75 and the rear derailleur 72 cooperatively so as to pass through the downshifting route LD1. The upshifting route LU1 and the downshifting route LD1 illustrated in FIG. 13 are an example, and can be arbitrarily set. In the example illustrated in FIG. 13, the upshifting route LU1 and the downshifting route LD1 are different from each other. Alternatively, for example, the upshifting route LU1 and the downshifting route LD1 can be the same.

In the manual shift mode, the electronic controller 81 controls the derailleur in accordance with an operation input to the operation unit 84 provided in the human-powered vehicle 1. The electronic controller 81 controls the front derailleur 75 or the rear derailleur 72 in accordance with the operation input to the operation unit 84 provided in the human-powered vehicle 1. In the manual shift mode, the shift can be changed by one-stage transmission and by multi-stage transmission in accordance with the operation of the operation unit 84. In the one-stage transmission, the front derailleur 75 or the rear derailleur 72 is operated by a first shift amount within a predetermined shift period in response to a first operation input to the operation unit 84. Specifically, in a case where the first operation is input to the operation unit 84, the electronic controller 81 controls the shift motor 75a of the front derailleur 75 or the shift motor 160 of the rear derailleur 72 to be driven by the first shift amount within the predetermined time. In a case where the first operation is input to the operation unit 84, the electronic controller 81 can control the shift motor 75a of the front derailleur 75 and the shift motor 160 of the rear derailleur 72 to be driven by the first shift amount within the predetermined time period. The first operation includes, for example, an operation of pressing a switch of the operation unit 84 only once, an operation of operating a lever of the operation unit 84 only once, and the like. The one-stage transmission can change the sprocket of the front sprocket assembly 51 or the rear sprocket assembly 52 with which the chain 53 is engaged, stage by stage.

In the multi-stage transmission, the front derailleur 75 or the rear derailleur 72 is operated by a second shift amount greater than the first shift amount within a predetermined shift period in response to a second operation different from the first operation. Specifically, in a case where the second operation is input to the operation unit 84, the electronic controller 81 controls the shift motor 75a of the front derailleur 75 or the shift motor 160 of the rear derailleur 72 to be driven by the second shift amount within the predetermined time period. The multi-stage transmission can include a shifting operation in which the chain 53 is not engaged with a sprocket next to the sprocket with which the chain 53 is engaged but engaged with a sprocket apart by two or more sprockets. In a case where the second operation is input to the operation unit 84, the electronic controller 81 can control the shift motor 75a of the front derailleur 75 and the shift motor 160 of the rear derailleur 72 to be driven by the second shift amount within the predetermined time period. The second operation includes, for example, a repeated press operation of pressing the switch of the operation unit 84 a plurality of times within a predetermined time period, a long press operation of continuously pressing the switch of the operation unit 84 for a predetermined time period or longer, and an operation of continuously operating the lever of the operation unit 84 for a predetermined time period or longer. The multi-stage transmission can change the sprockets of the front sprocket assembly 51 or the rear sprocket assembly 52 with which the chain 53 is engaged, for multiple stages together at a time. The multi-stage transmission can change the rear sprockets of the rear sprocket assembly 52 with which the chain 53 is engaged, for multiple stages.

The control of the human-powered vehicle 1 by the control device 80 including the electronic controller 81 according to the fourth embodiment will be described. The electronic controller 81 controls the derailleur the human-powered vehicle 1 on the basis of change in pressure of a tire detected by the pressure detector 91 detecting the pressure of at least one tire of the human-powered vehicle 1. The pressure detector 91 includes at least one of the first tire pressure detection device 85 and the second tire pressure detection device 86.

The electronic controller 81 controls the actuator 184 such that a rotation resistance force is in a first resistance force applying state in a case where a fluctuation of a detection value detected by the pressure detector 91 within a predetermined time period is greater than or equal to a predetermined value. The pressure detector 91 includes at least one of the first tire pressure detection device 85 and the second tire pressure detection device 86. The pressure detector 91 includes the first tire pressure detection device 85 and the second tire pressure detection device 86.

Figure 20:
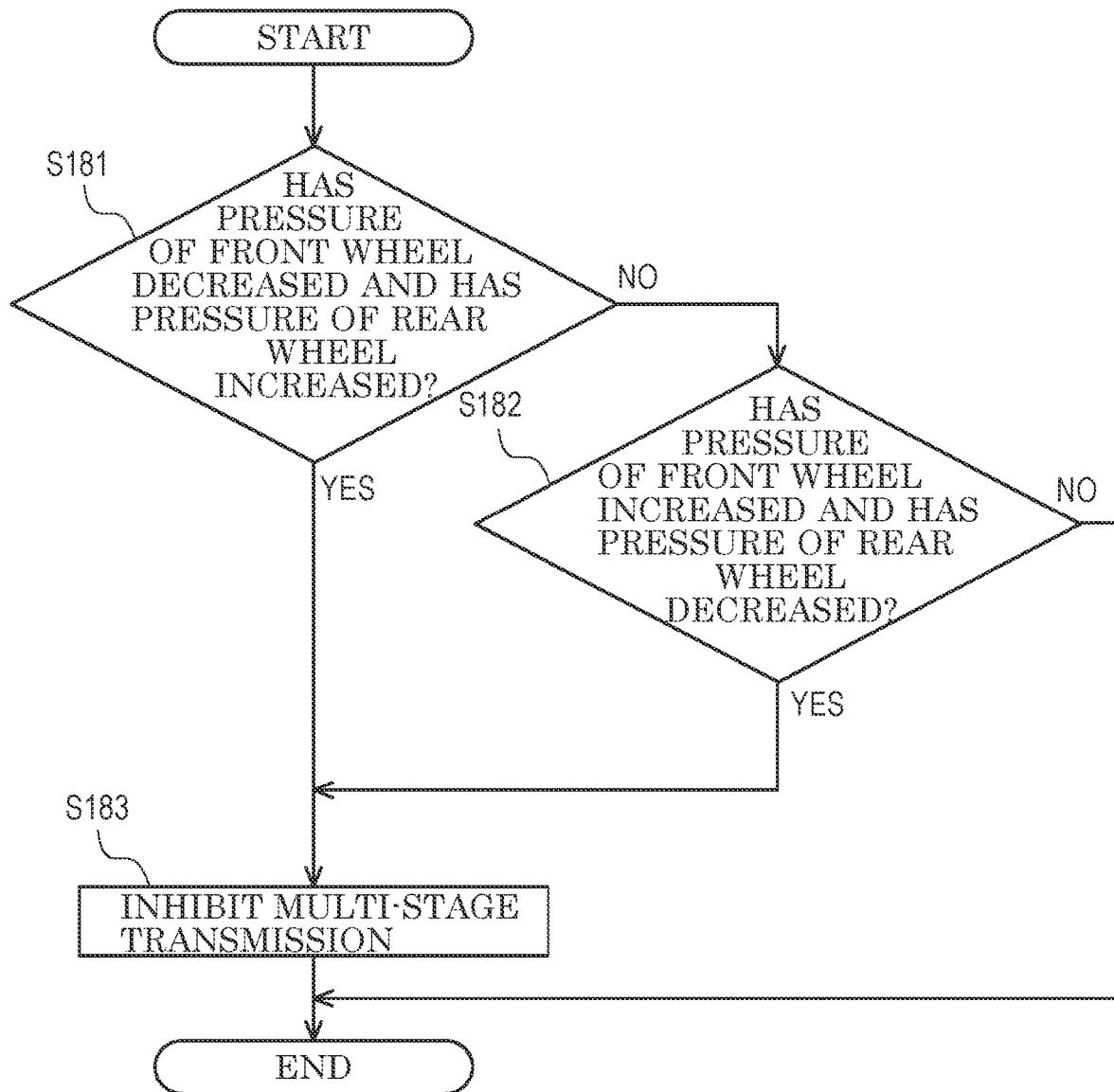
FIG. 20 is a flowchart illustrating a control process executed by an electronic controller of the human-powered vehicle control device based on the inclined state of the human-powered vehicle.

As illustrated in FIG. 20, the electronic controller 81 controls the derailleur in accordance with the operation input to the operation unit 84 provided in the human-powered vehicle 1. Upon detection of the inclined state of the human-powered vehicle 1 on the basis of change in pressure of the tire detected by the pressure detector 91, the electronic controller 81 can cause the derailleur to operate by the first shift amount within the predetermined shift period in response to the first operation input to the operation unit 84, and can inhibit the derailleur from operating by the second shift amount larger than the first shift amount within the predetermined shift period in response to the second operation different from the first operation. The electronic controller 81 determines the inclined state of the human-powered vehicle 1 on the basis of detection values of a first pressure detector and a second pressure detector.

Hereinafter, an example of a specific flowchart of the control of the human-powered vehicle 1 by the control device 80 including the electronic controller 81 will be described. The electronic controller 81 starts control according to flowcharts illustrated in FIGS. 14, 19, and 20 at a predetermined timing. The timing of starting the control includes, for example, a timing at which power feed to the electronic controller 81 is started and a timing at which the rider performs a predetermined operation on the operation unit 84. The electronic controller 81 repeats control according to a flowchart described below for each predetermined cycle. The electronic controller 81 ends a control flow according to the flowchart described below at a predetermined timing. The timing of ending the control flow includes, for example, a timing at which power feed to the electronic controller 81 is ended and a timing at which the rider performs a predetermined operation on the operation unit 84.

Figure 14:
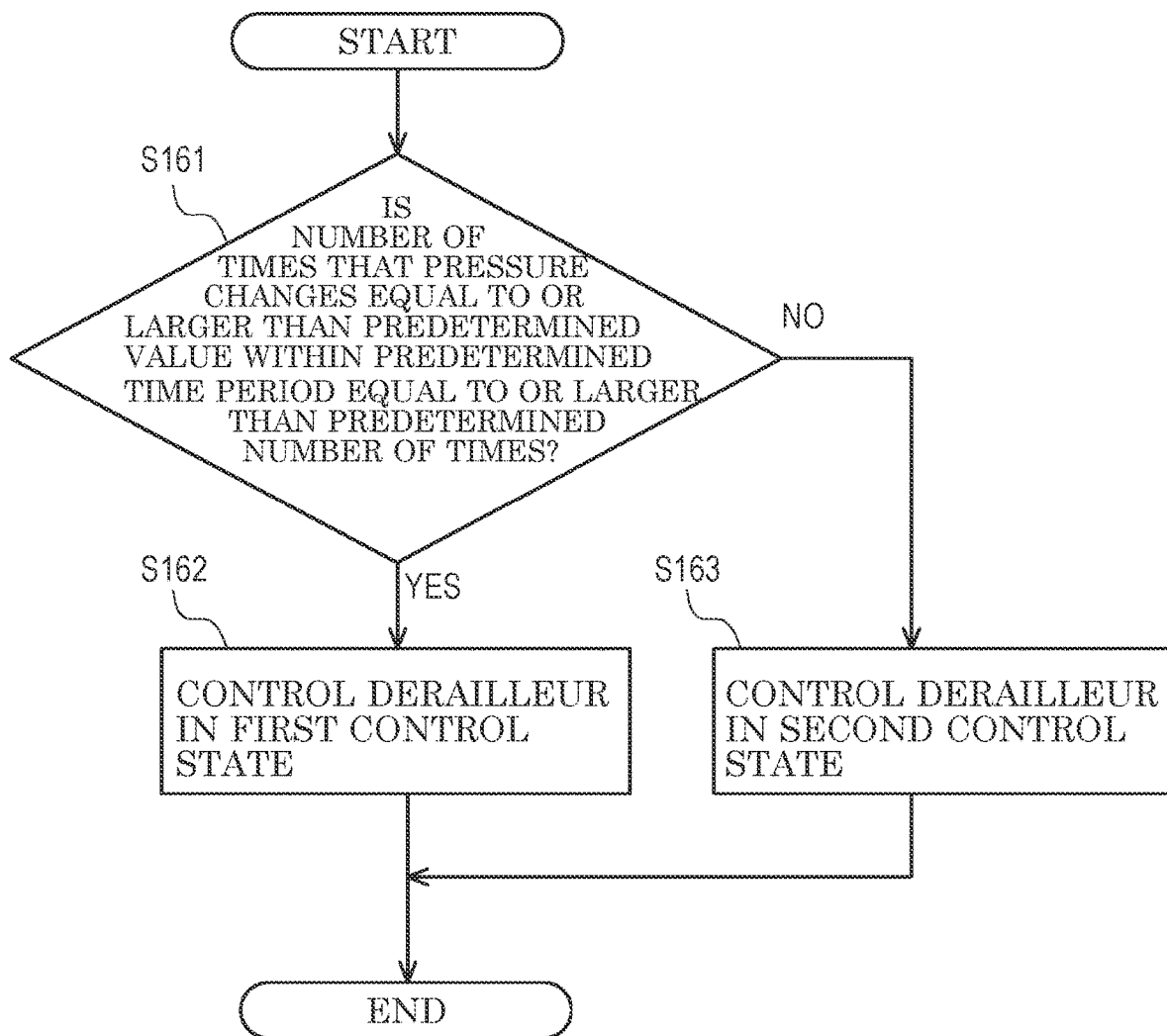
FIG. 14 is a flowchart illustrating a control process executed by an electronic controller of the human-powered vehicle control device based on the state of the road surface.

FIG. 14 illustrates an example of a flowchart for performing control of the human-powered vehicle 1 by detecting that the number of times that the pressure of the tire by a predetermined value within a predetermined time period is equal to or larger than a predetermined number of times. In step S161, the electronic controller 81 determines whether the number of times that the pressure of the tire changes equal to or larger than the predetermined value within the predetermined time period is equal to or larger than the predetermined number of times. The tire to be determined only has to be at least one of the front wheel 30 and the rear wheel 20. The pressure of the tire of either the front wheel 30 or the rear wheel 20 can be determined, or the pressures of both tires can be determined.

Upon determination that the number of times that the pressure of the tire changes equal to or larger than the predetermined value within the predetermined time period is equal to or larger than the predetermined number of times, the electronic controller 81 proceeds the processing to step S162. In a case where the road surface on which the human-powered vehicle 1 is traveling is rough, an impact on the tire contacting the road surface is assumed to be stronger than in a case where the human-powered vehicle 1 is traveling on a flat road surface. The pressure in the tire changes in accordance with the impact applied to the tire. In a case where the pressure of the tire changes greatly to some extent and frequently to some extent, it is estimated that the road surface on which the human-powered vehicle 1 is traveling is relatively rough. The electronic controller 81 can detect that the road surface is relatively rough.

Upon determination that the number of times that the pressure of the tire changes equal to or larger than a predetermined value within a predetermined time period is smaller than a predetermined number of times, the electronic controller 81 proceeds the processing to step S163. Since the pressure of the tire does not change greatly or frequently, it is estimated that roughness of the road surface on which the human-powered vehicle 1 is traveling is less than a predetermined level. The electronic controller 81 can detect that the road surface is not significantly rough.

In step S162, the electronic controller 81 starts control of the derailleur in a first control state described later. The derailleur includes at least one of the front derailleur 75 and the rear derailleur 72. The electronic controller 81 controls the derailleur in the first control state in a case where the number of times that the pressure of the tire changes equal to or larger than a predetermined value within a predetermined time period is equal to or larger than a predetermined number of times. After performing the processing of step S162, the electronic controller 81 ends a control flow in FIG. 14.

In step S163, the electronic controller 81 starts control of the derailleur in a second control state described later. The derailleur includes at least one of the front derailleur 75 and the rear derailleur 72. The electronic controller 81 controls the derailleur in the second control state in a case where the number of times that the pressure of the tire changes equal to or larger than the predetermined value within the predetermined time period is smaller than the predetermined number of times. After performing the processing of step S163, the electronic controller 81 ends the control flow in FIG. 14.

Hereinafter, the first control state and the second control state will be specifically described. The electronic controller 81 can perform at least one of first processing to fifth processing described below in the first control state and the second control state.

The electronic controller 81 can perform the first processing which is processing of inhibiting or permitting shift change by the multi-stage transmission in the first control state and the second control state.

In the first control state, the electronic controller 81 can perform first inhibition processing which is processing of permitting shift change by the one-stage transmission and inhibiting shift change by the multi-stage transmission. The electronic controller 81 inhibits the derailleur to operate by the first shift amount within the predetermined shift period in response to the first operation input to the operation unit 84 in the first control state, and inhibits the derailleur to operate by the second shift amount larger than the first shift amount within the predetermined shift period in response to the second operation different from the first operation in the first control state. As a result, the derailleur can be controlled in a suitable state in the first control state. In a case where it is estimated that the road surface is rough, shift change by the multi-stage transmission is inhibited, and thus comfortability of the human-powered vehicle 1 traveling on the rough road surface can be improved.

In the second control state, the electronic controller 81 can perform first permission processing which is processing of permitting shift change by the one-stage transmission and shift change by the multi-stage transmission. The electronic controller 81 permits the derailleur to operate by the second shift amount within the predetermined shift period in response to the second operation in the second control state. As a result, the derailleur can be controlled in a suitable state in the second control state. In a case where it is estimated that the road surface is not rough, operability of the human-powered vehicle 1 can be improved by permitting shift change by the multi-stage transmission.

The electronic controller 81 can perform second processing which is processing of making thresholds of shift change in the automatic shift mode in the first control state and the second control state different. The electronic controller 81 includes an automatic shift mode, the electronic controller 81 controls the derailleur in a case where a reference value related to the traveling state of the human-powered vehicle 1 reaches a threshold determined in advance in the automatic shift mode, and the threshold determined in advance is different between in the first control state and in the second control state.

As a specific example, the reference value includes a value related to a cadence input to the human-powered vehicle 1, the threshold is a value related to the cadence, and the electronic controller 81 performs second increase processing which is processing of increasing the threshold in the first control state. When performing the shifting operation by controlling the derailleur with the cadence as the reference value in the automatic shift mode, the electronic controller 81 sets the threshold in the first control state to a value larger than the threshold in the second control state. As a result, the derailleur can be controlled in a suitable state in the first control state. In a situation where it can be estimated that the road surface is rough, it is possible to maintain a state where the transmission ratio is small by increasing the threshold related to the cadence even in a case where the cadence is large. Therefore, the comfortability during traveling on a rough road surface is improved.

It is possible to reduce the threshold of the cadence in the second control state instead of increasing the threshold of the cadence in the first control state. Specifically, the reference value includes a cadence input to the human-powered vehicle 1, the threshold is a value related to the cadence, and the electronic controller 81 performs second decrease processing which is processing of decreasing the threshold in the second control state. When performing the shifting operation by controlling the derailleur with the cadence as the reference value in the automatic shift mode, the electronic controller 81 sets the threshold in the second control state to a value smaller than the threshold in the first control state. As a result, the derailleur can be controlled in a suitable state in the second control state. In a situation where it can be estimated that the road surface is not rough, it is possible to increase the transmission ratio earlier by decreasing the threshold related to the cadence in a case where the cadence is increased. Therefore, the comfortability during traveling on a road surface that is not rough is improved.

The second processing only has to include at least one of the second increase processing and the second decrease processing. In the second processing, only one of the second increase processing or the second decrease processing can be performed, or both the second increase processing and the second decrease processing can be performed.

The reference value related to the traveling state of the human-powered vehicle 1 used in the automatic shift mode can include, for example, the vehicle speed of the human-powered vehicle 1, the torque input to the pedals 13, the inclined state of the human-powered vehicle 1, and the like in addition to the cadence. It is also possible to use a combination of a plurality of reference values.

The electronic controller 81 can perform third processing which is processing of changing the rotation resistance force against the rotation of the pulley assembly 140 by the damping mechanism 180 between the first control state and the second control state.

As a specific example, the electronic controller 81 outputs a signal to the actuator 184 so as to set the one-way clutch 183 to the first clutch mode in the first control state. The electronic controller 81 controls the actuator 184 such that the rotation resistance force is in the first resistance force applying state in a state where the control state is the first control state. In the first control state, the electronic controller 81 applies a relatively large rotation resistance force to the rotation of the pulley assembly 140 in a second rotational direction D2. Therefore, slack of the chain 53 can be suppressed in the first control state in which the road surface is estimated to be rough.

The electronic controller 81 outputs a signal to the actuator 184 so as to set the one-way clutch 183 to the second clutch mode in the second control state. The electronic controller 81 controls the actuator 184 such that the rotational resistance force is in the second resistance force applying state in a state where the control state is the second control state. In the second control state, the electronic controller 81 thus applies a relatively small rotational resistance force to the rotation of the pulley assembly 140 in the second rotational direction D2. Therefore, the shift can be changed suitably in the second control state. The pulley assembly 140 is easily rotated in accordance with a change in tension of the chain 53 corresponding to the shift change, and the shift can be suitably changed. The actuator 184 can be an electric actuator.

The electronic controller 81 can perform fourth processing which is processing of making the shift routes used in the synch mode between the first control state and the second control state at least partially different. The electronic controller 81 controls the derailleur on the basis of the shift table T related to the transmission ratio. In the first control state, the electronic controller 81 controls the derailleur in a first shift route based on the shift table T. In the second control state, the electronic controller 81 controls the derailleur in a second shift route. The first shift route and the second shift route are at least partially different from each other. The first shift route includes the upshifting route LU1 and the downshifting route LD1. The second shift route includes an upshifting route LU2 and a downshifting route LD2.

Figure 15:
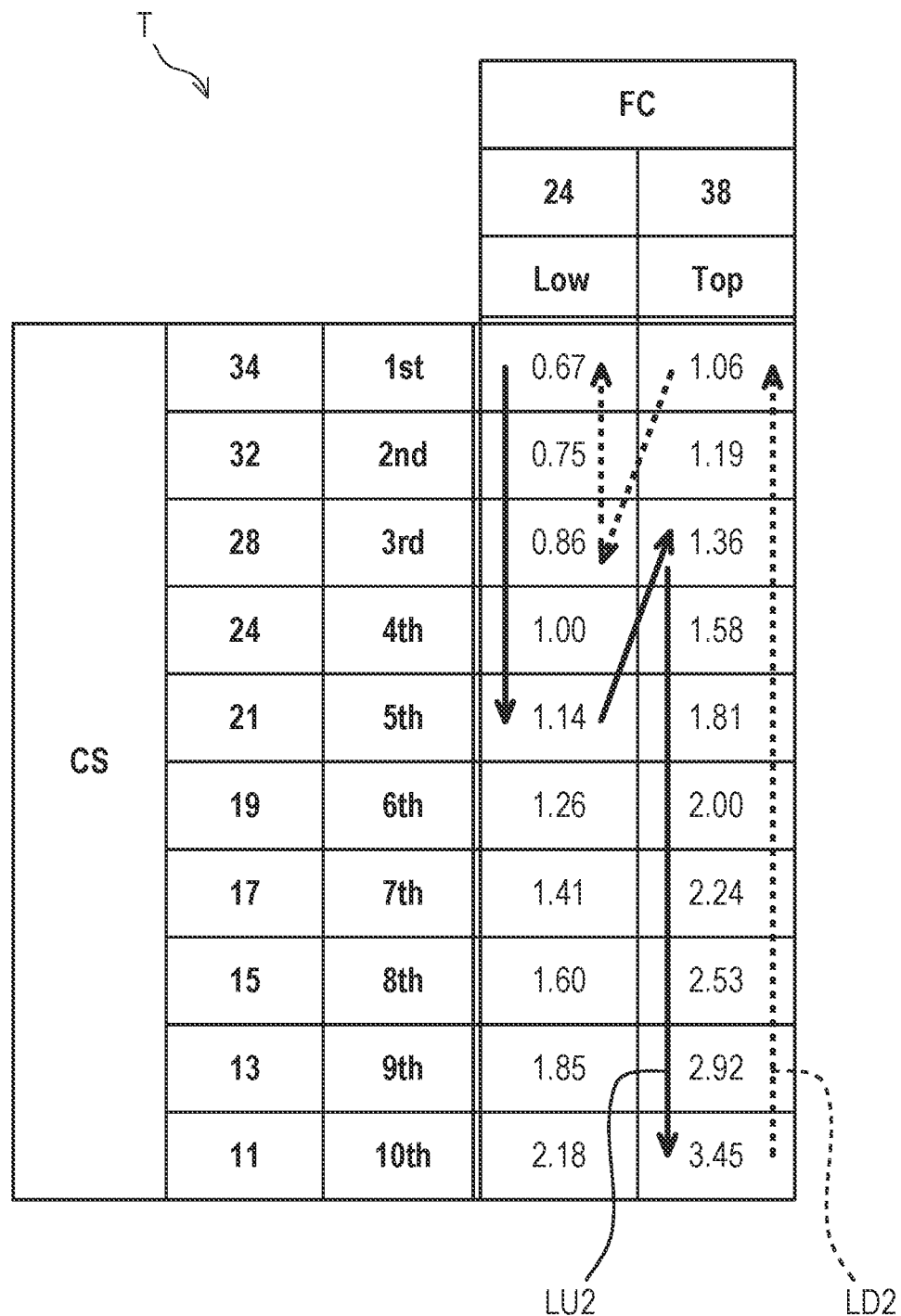
FIG. 15 is a diagram illustrating an example of the shift table and a second shift route.

As a specific example, as illustrated in FIGS. 13 and 15, the electronic controller 81 can perform processing of making effective ranges of the transmission ratio of the shift route different between in the first control state and in the second control state in a case where the chain 53 is engaged with the front sprocket of "Low".

Specifically, in the upshifting route LU1 in the first control state illustrated in FIG. 13, the effective range of the transmission ratio in a case where the chain 53 is engaged with the front sprocket of "Low" is from 0.67 to 1.26. In the upshifting route LU2 in the second control state illustrated in FIG. 15, the effective range of the transmission ratio in a case where the chain 53 is engaged with the front sprocket of "Low" is from 0.67 to 1.14.

An effective range in a chain engagement of the chain 53 with the second front sprocket state in the first shift route is larger than an effective range of the transmission ratio in the chain engagement of the chain 53 with the second front sprocket state in the second shift route in a transmission order where the transmission is increased. As a result, the derailleur can be controlled in a suitable state. In a case where the road surface is estimated to be rough, switching from "Low" to "Top" hardly occurs at a time of upshifting by securing a long period during which the chain 53 is engaged with the front sprocket of "Low".

Figure 16:
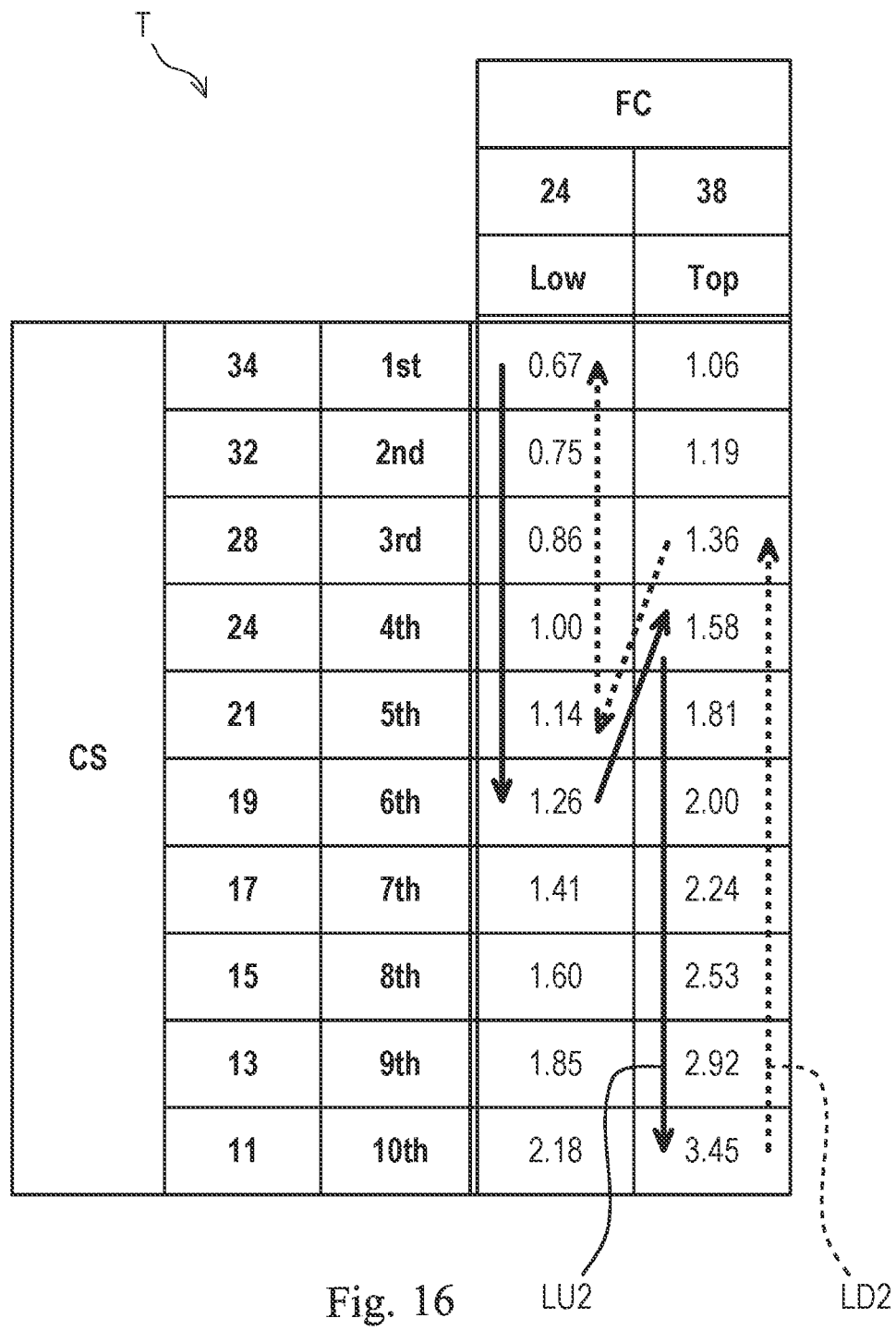
FIG. 16 is a diagram illustrating another example of the shift table and the second shift route.

As another example, as illustrated in FIGS. 13 and 16, the electronic controller 81 can perform processing of making effective ranges of the transmission ratio of the shift route different between in the first control state and in the second control state in a case where the front sprocket is engaged with "Top".

Specifically, in the downshifting route LD1 in the first control state illustrated in FIG. 13, the effective range of the transmission ratio in a case where the chain 53 is engaged with the front sprocket of "Top" is from 1.19 to 3.45. In the downshifting route LD2 in the second control state illustrated in FIG. 16, the effective range of the transmission ratio in a case where the chain 53 is engaged with the front sprocket of "Top" is from 1.36 to 3.45.

An effective range in a chain engagement of the chain 53 with the second front sprocket state in the first shift route is larger than an effective range of the transmission ratio in the chain engagement of the chain 53 with the second front sprocket state in the second shift route in a transmission order where the transmission is decreased. As a result, the derailleur can be controlled in a suitable state. In a case where the road surface is estimated to be rough, switching from "Top" to "Low" hardly occurs at a time of downshifting by securing a long period during which the chain 53 is engaged with the front sprocket of "Top".

The electronic controller 81 can perform fifth processing which is processing of making a maximum value and a minimum value of the transmission ratio in the first control state and the second control state different. As a specific example, as illustrated in FIGS. 17 and 18, the electronic controller 81 can perform processing of making the maximum value and the minimum value of the transmission ratio different between in the first control state and in the second control state.

Figure 17:
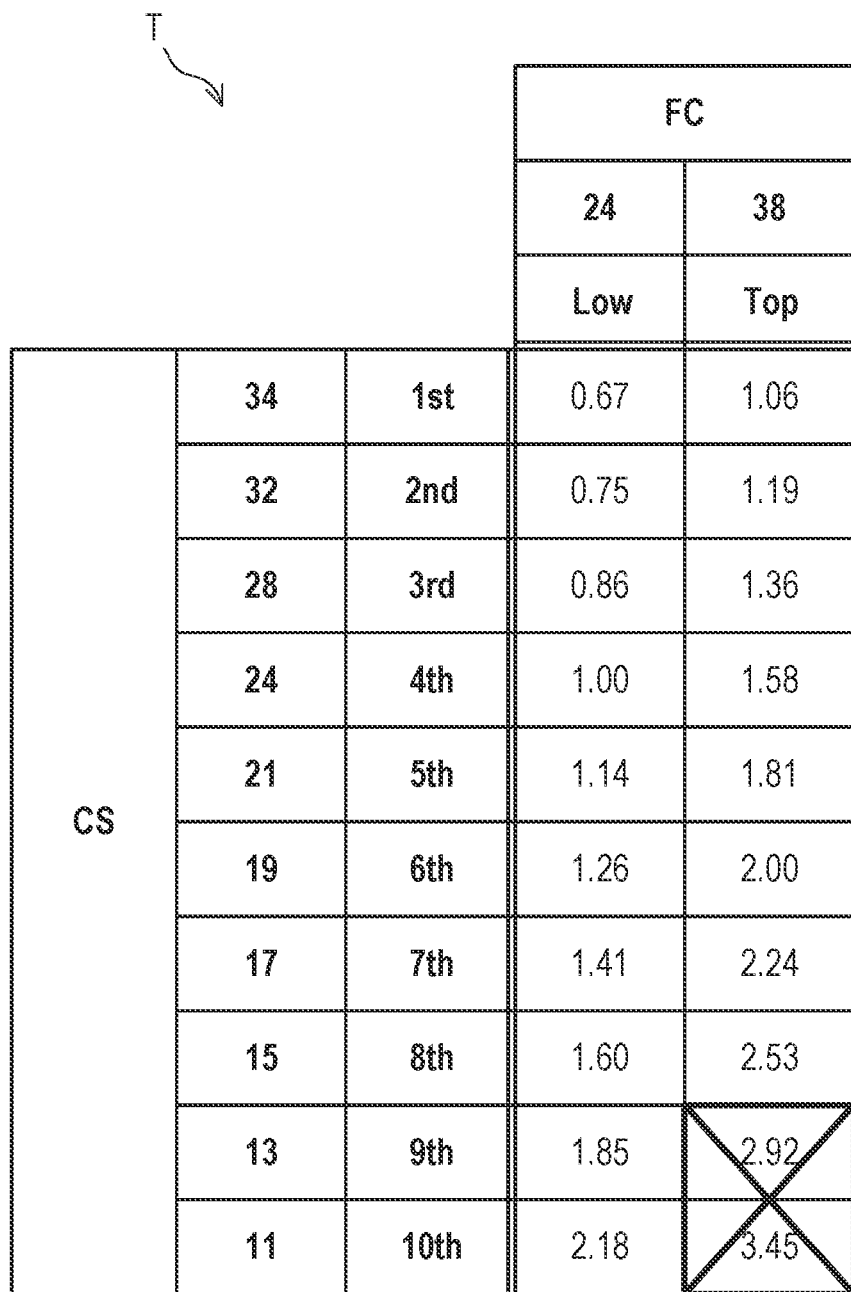
FIG. 17 is a diagram illustrating a shift table in a state where use of a gear ratio around a maximum value is inhibited.

Specifically, in the first control state, as illustrated in FIG. 17, the electronic controller 81 inhibits the use of at least the maximum value and the second maximum value of transmission ratio among the transmission ratios on the shift table T. In the first control state, the electronic controller 81 can inhibit the use of the third maximum value and values after the third maximum value of transmission ratio among the transmission ratios on the shift table T. The electronic controller 81 controls the derailleur such that the inhibited transmission ratio is not used. The electronic controller 81 can control the derailleur such that the maximum value of the transmission ratio in the first control state is smaller than the maximum value of the transmission ratio in the second control state. As a result, the derailleur can be controlled in a suitable state. In a case where the road surface is estimated to be rough, by making the maximum value of the transmission ratio smaller than in a case where the road surface is estimated to be smooth, the vehicle speed of the human-powered vehicle 1 is suppressed, and the human-powered vehicle 1 can easily stably travel on the rough road surface.

In the second control state, as illustrated in FIG. 18, the electronic controller 81 inhibits the use of at least the minimum value and the second minimum value of transmission ratio among the transmission ratios on the shift table T. In the second control state, the electronic controller 81 can inhibit the use of the third minimum value and values after the third minimum value of transmission ratio among the transmission ratios on the shift table T. The electronic controller 81 controls the derailleur such that the inhibited transmission ratio is not used. The electronic controller 81 can control the derailleur such that the minimum value of the transmission ratio in the first control state is smaller than the minimum value of the transmission ratio in the second control state. As a result, the derailleur can be controlled in a suitable state. In a case where the road surface is estimated to be rough, by making the minimum value of the transmission ratio smaller than in a case where the road surface is estimated to be smooth, the vehicle speed of the human-powered vehicle 1 is suppressed, and the human-powered vehicle 1 can easily stably travel on the rough road surface.

The electronic controller 81 can appropriately combine and perform the first to fifth processing. The electronic controller 81 can perform only one of the first to fifth processing or perform two or more processing in combination. Which processing to be performed can be arbitrarily determined.

Figure 19:
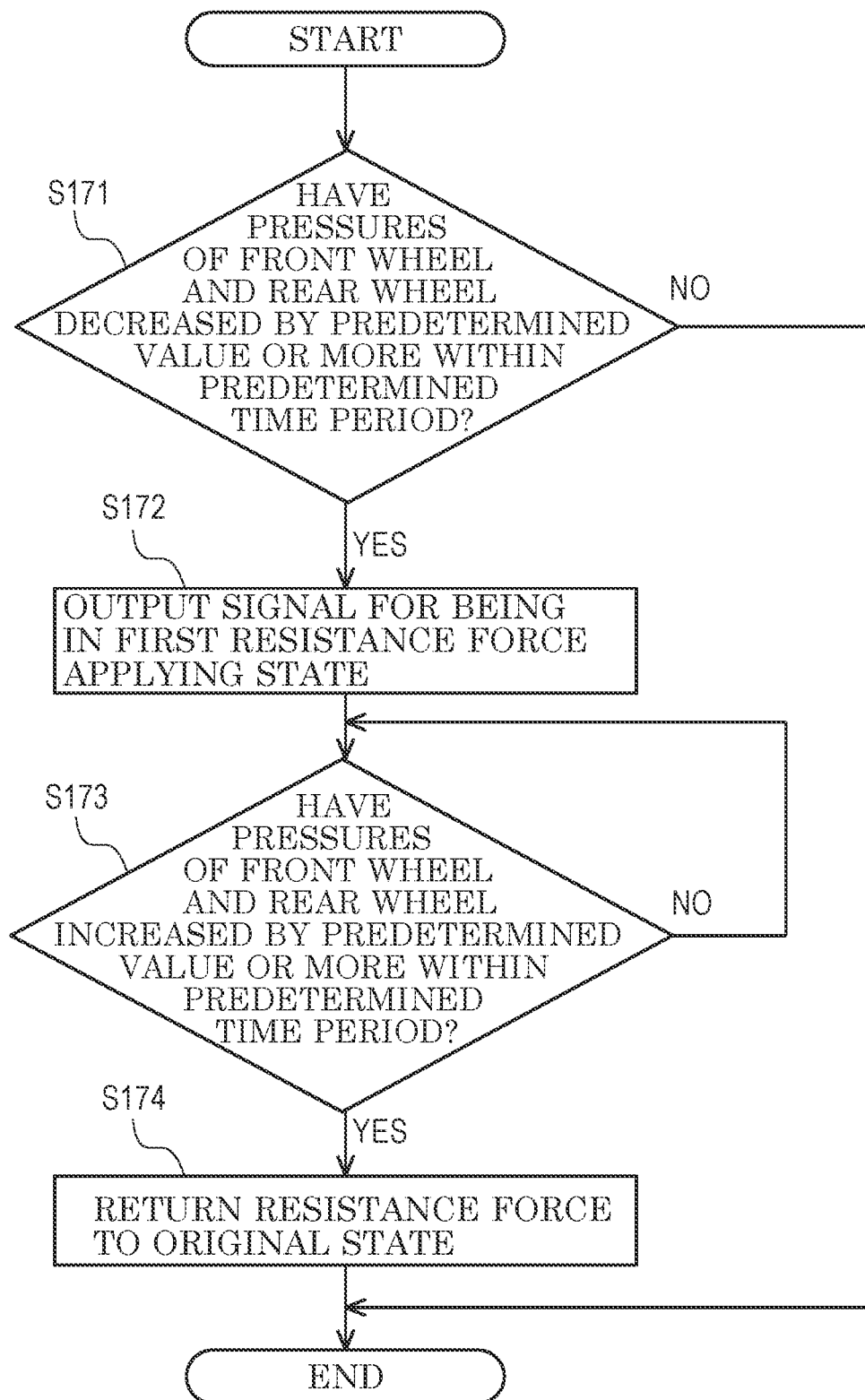
FIG. 19 is a flowchart illustrating a control process executed by an electronic controller of the human-powered vehicle control device based on the jumping state of the human-powered vehicle.

FIG. 19 illustrates an example of a flowchart for performing control of the human-powered vehicle 1 by detecting that both of the pressures of the tires of the front wheel 30 and the rear wheel 20 have decreased. In step S171, the electronic controller 81 determines whether the pressures of both tires of the front wheel 30 and the rear wheel 20 of the human-powered vehicle 1 have decreased by a predetermined value or more within a predetermined time period.

Upon determination that the pressures of both tires of the front wheel 30 and the rear wheel 20 of the human-powered vehicle 1 have decreased by the predetermined value or more within the predetermined time period, the electronic controller 81 proceeds the processing to step S172. The electronic controller 81 can estimate that the human-powered vehicle 1 is in the jumping state since the load applied to the front wheel 30 and the load applied to the rear wheel 20 have both decreased. The jumping state is, for example, a state in which at least one of the front wheel 30 and the rear wheel 20 is floating from the ground. The jumping state is, for example, a state in which both the front wheel 30 and the rear wheel 20 are floating from the ground. Upon determination that the pressure of at least one tire of the front wheel 30 and the rear wheel 20 of the human-powered vehicle 1 has not decreased by the predetermined value or more within the predetermined time period, the electronic controller 81 ends a control flow in FIG. 19.

In step S172, the electronic controller 81 outputs a signal to the actuator 184 so as to set the one-way clutch 183 to the first clutch mode. The electronic controller 81 controls the actuator 184 such that a rotational resistance force is in a first resistance force applying state in a case where a fluctuation of a detection value detected by the pressure detector 91 within a predetermined time period is greater than or equal to a predetermined value. As a result, the electronic controller 81 can control the derailleur in a suitable state. By detecting the jumping state of the human-powered vehicle 1 from the pressure of the tires of the human-powered vehicle 1 and applying a relatively large rotational resistance force to the rotation of the pulley assembly 140 in the second rotational direction D2, the rotation of the pulley assembly 140 in the second rotational direction D2 by vibration of the human-powered vehicle 1 can be suppressed. Thus, large slack of the chain 53 due to the vibration of the human-powered vehicle 1 can be suppressed. After performing the processing of step S172, the electronic controller 81 proceeds the processing to step S173. The pressure detector 91 includes at least one of the first tire pressure detection device 85 and the second tire pressure detection device 86. The pressure detector 91 preferably includes both the first tire pressure detection device 85 and the second tire pressure detection device 86.

In step S173, the electronic controller 81 determines whether the pressures of both tires of the front wheel 30 and the rear wheel 20 of the human-powered vehicle 1 have increased by a predetermined value or more within a predetermined time period. In step S173, the electronic controller 81 can determine whether an increase in pressure having the same value as an amount of change in pressure detected in step S171 has been detected.

Upon determination that the pressures of both tires of the front wheel 30 and the rear wheel 20 of the human-powered vehicle 1 have increased by the predetermined value or more within the predetermined time period, the electronic controller 81 proceeds the processing to step S174. The electronic controller 81 can estimate that the human-powered vehicle 1 is in the ground contact state since the load applied to the front wheel 30 and the load applied to the rear wheel 20 have both increased. The ground contact state is a state in which at least one of the front wheel 30 and the rear wheel 20 is in contact with the ground. The ground contact state is a state in which both the front wheel 30 and the rear wheel 20 are in contact with the ground.

Upon determination that the pressure of at least one tire of the front wheel 30 and the rear wheel 20 of the human-powered vehicle 1 has not increased by the predetermined value or more within the predetermined time period, the electronic controller 81 repeats the processing of step S173. Upon determination that the pressure of both tires of the front wheel 30 or the rear wheel 20 of the human-powered vehicle 1 have not increased by the predetermined value or more within the predetermined time period, the electronic controller 81 can repeat the processing of step S173.

In step S174, the electronic controller 81 returns the state of the one-way clutch 183 to the state before the processing of step S172. Specifically, in a case where the one-way clutch 183 is in the second clutch mode before the processing of step S172, the electronic controller 81 outputs a signal for switching the one-way clutch 183 to the second clutch mode to the actuator 184. As a result, the actuator 184 can be controlled for the pulley assembly 140 to be in the second resistance force applying state. After performing the processing of step S174, the electronic controller 81 ends the control flow in FIG. 19.

The flowchart in FIG. 19 illustrates an example in which the ground contact state of the human-powered vehicle 1 is detected on the basis of the pressures of the tires of the front wheel 30 and the rear wheel 20 of the human-powered vehicle 1. However, for example, it is also possible to estimate that the human-powered vehicle 1 is in the ground contact state at a time point when a predetermined time period elapses after the human-powered vehicle 1 is in the jumping state in step S171 or after the processing of step S172 is performed, and perform the processing of step S174.

FIG. 20 illustrates an example of a flowchart for the electronic controller 81 to control the rear derailleur 72 on the basis of change in pressure detected by the pressure detector 91. Specifically, the pressure detector 91 includes the first tire pressure detection device 85 and the second tire pressure detection device 86. An example will be illustrated of the flowchart for the electronic controller 81 to control the rear derailleur 72 on the basis of change in pressure of the tire detected by the first tire pressure detection device 85 and the second tire pressure detection device 86. The rear derailleur 72 can be controlled in accordance with the inclined state of the human-powered vehicle 1 by detecting the change of the first tire pressure detection device 85 and the second tire pressure detection device 86.

In step S181, the electronic controller 81 determines whether the pressure of the tire of the front wheel 30 has decreased and the pressure of the tire of the rear wheel 20 has increased. Upon determination that the pressure of the tire of the front wheel 30 has decreased and the pressure of the tire of the rear wheel 20 has increased, the electronic controller 81 proceeds the processing to step S183. The electronic controller 81 can estimate that the human-powered vehicle 1 is in the upward inclined state since a load applied to the front wheel 30 has decreased and a load applied to the rear wheel 20 has increased. Upon determination that the pressure of the tire of the front wheel 30 has not decreased or the pressure of the tire of the rear wheel 20 has not increased, the electronic controller 81 proceeds the processing to step S182.

In step S182, the electronic controller 81 determines whether the pressure of the tire of the front wheel 30 has increased and the pressure of the tire of the rear wheel 20 has decreased. Upon determination that the pressure of the tire of the front wheel 30 has increased and the pressure of the tire of the rear wheel 20 has decreased, the electronic controller 81 proceeds the processing to step S183. The electronic controller 81 can estimate that the human-powered vehicle 1 is in the downward inclined state since the load applied to the front wheel 30 has increased and the load applied to the rear wheel 20 has decreased. Upon determination that the pressure of the tire of the front wheel 30 has not increased or the pressure of the tire of the rear wheel 20 has not decreased, the electronic controller 81 ends the control flow in FIG. 20.

In step S183, the electronic controller 81 permits the shift change by the one-stage transmission and inhibits the shift change by the multi-stage transmission. Upon detection of the inclined state of the human-powered vehicle 1 on the basis of change in pressure of the tire detected by the pressure detector 91, the electronic controller 81 controls the derailleur to operate by the first shift amount within the predetermined shift period in response to the first operation input to the operation unit 84, and the electronic controller 81 inhibits the derailleur to operate by the second shift amount larger than the first shift amount within the predetermined shift period in response to the second operation different from the first operation. The pressure detector 91 includes the first tire pressure detection device 85 and the second tire pressure detection device 86. Upon detection of the inclined state of the human-powered vehicle 1 on the basis of change in pressure of the tire detected by the first tire pressure detection device 85 and the second tire pressure detection device 86, the electronic controller 81 controls the derailleur to operate by the first shift amount within the predetermined shift period in response to the first operation input to the operation unit 84, and the electronic controller 81 inhibits the derailleur to operate by the second shift amount larger than the first shift amount within the predetermined shift period in response to the second operation different from the first operation. As a result, the derailleur can be controlled in a suitable state. In a case where it is estimated that the road surface is inclined, the shift change by the multi-stage transmission is inhibited, and thus comfortability of the human-powered vehicle 1 traveling on the inclined road surface can be improved. After performing the processing of step S183, the electronic controller 81 ends the control flow in FIG. 20.

The flowchart in FIG. 20 illustrates an example in which the multi-stage transmission is inhibited in a case where the human-powered vehicle 1 is in at least one of the upward inclined state and the downward inclined state. Alternatively, for example, the multi-stage transmission can be inhibited only in a case where the human-powered vehicle 1 is in the upward inclined state or only in a case where the human-powered vehicle 1 is in the downward inclined state.

Fifth Embodiment

Figure 21:
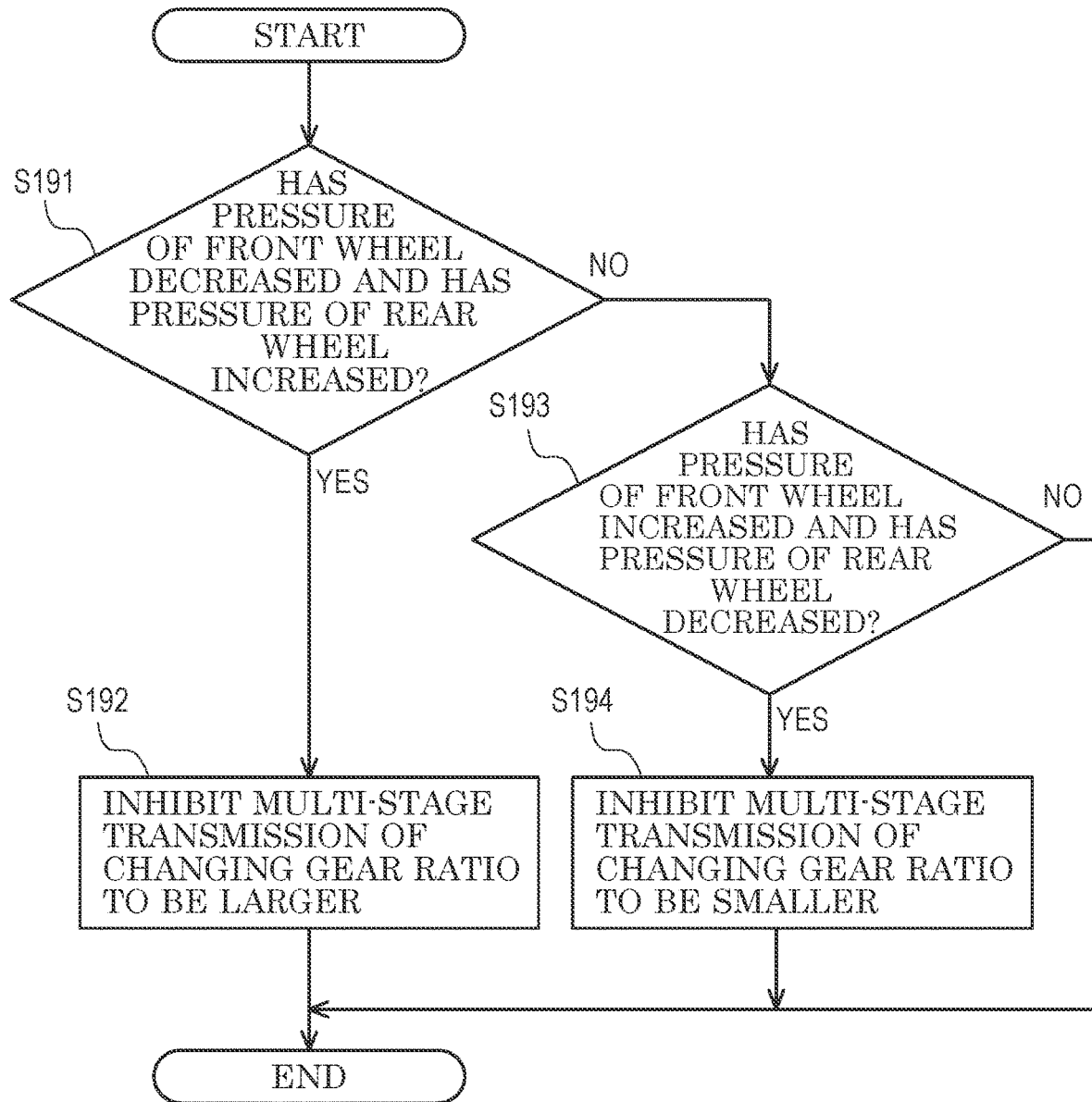
FIG. 21 is a flowchart illustrating a control process executed by an electronic controller of the human-powered vehicle control device based on the inclined state of the human-powered vehicle in a fifth embodiment.

A fifth embodiment will be described below with reference to FIG. 21. The fifth embodiment is similar to the fourth embodiment except that a flowchart illustrated in FIG. 21 is used instead of the flowchart illustrated in FIG. 20. Therefore, the flowchart illustrated in FIG. 21 will be described.

In step S191, the electronic controller 81 determines whether the pressure of the tire of the front wheel 30 has decreased and the pressure of the tire of the rear wheel 20 has increased. Upon determination that the pressure of the tire of the front wheel 30 has decreased and the pressure of the tire of the rear wheel 20 has increased, the electronic controller 81 proceeds the processing to step S192. Upon determination that the pressure of the tire of the front wheel 30 has decreased and the pressure of the tire of the rear wheel 20 has increased, the electronic controller 81 can determine that the human-powered vehicle 1 is in the upward inclined state. Upon determination that the pressure of the tire of the front wheel 30 has not decreased or the pressure of the tire of the rear wheel 20 has not increased, the electronic controller 81 proceeds the processing to step S193.

In step S192, the electronic controller 81 inhibits the shift change by the multi-stage transmission at the time of upshifting in which the transmission ratio is changed to be larger. In a case where the pressure of the tire of the front wheel 30 of the human-powered vehicle 1 decreases and the pressure of the tire of the rear wheel 20 of the human-powered vehicle 1 increases, the electronic controller 81 inhibits the derailleur to operate by the second shift amount within the predetermined shift period in response to the second operation to change the transmission ratio to be larger. As a result, the derailleur can be controlled in a suitable state. In a case where it is estimated that the human-powered vehicle 1 is in the upward inclined state, the shift change by the multi-stage transmission is inhibited, and thus comfortability of the human-powered vehicle 1 traveling on the inclined road surface can be improved. In the processing of step S192, the multi-stage transmission in a case where the transmission ratio is changed to be larger is inhibited, but the multi-stage transmission at the time of downshifting to change the transmission ratio to be smaller is not inhibited.

In step S193 proceeded from step S191, the electronic controller 81 determines whether the pressure of the tire of the front wheel 30 has increased and the pressure of the tire of the rear wheel 20 has decreased. Upon determination that the pressure of the tire of the front wheel 30 has increased and the pressure of the tire of the rear wheel 20 has decreased, the electronic controller 81 proceeds the processing to step S194. Upon determination that the pressure of the tire of the front wheel 30 has increased and the pressure of the tire of the rear wheel 20 has decreased, the electronic controller 81 can detect that the human-powered vehicle 1 is in the downward inclined state. Upon determination that the pressure of the tire of the front wheel 30 has not increased or the pressure of the tire of the rear wheel 20 has not decreased, the electronic controller 81 ends the control flow in FIG. 21.

In step S194, the electronic controller 81 inhibits the shift change by the multi-stage transmission at the time of downshifting to change the transmission ratio to be smaller. In a case where the pressure of the tire of the front wheel 30 of the human-powered vehicle 1 increases and the pressure of the tire of the rear wheel 20 of the human-powered vehicle 1 decreases, the electronic controller 81 inhibits the derailleur to operate by the second shift amount within the predetermined shift period in response to the second operation to change the transmission ratio to be smaller. As a result, the derailleur can be controlled in a suitable state. In a case where it is estimated that the human-powered vehicle 1 is in the downward inclined state, the shift change by the multi-stage transmission is inhibited, and thus comfortability of the human-powered vehicle 1 traveling on the inclined road surface can be improved.

In the processing of step S194, the multi-stage transmission in a case where the transmission ratio is changed to be smaller is inhibited, but the multi-stage transmission at the time of upshifting to change the transmission ratio to be larger is not inhibited. After performing the processing of step S192 or S194, the electronic controller 81 ends the control flow in FIG. 21.

Sixth Embodiment

Figure 22:
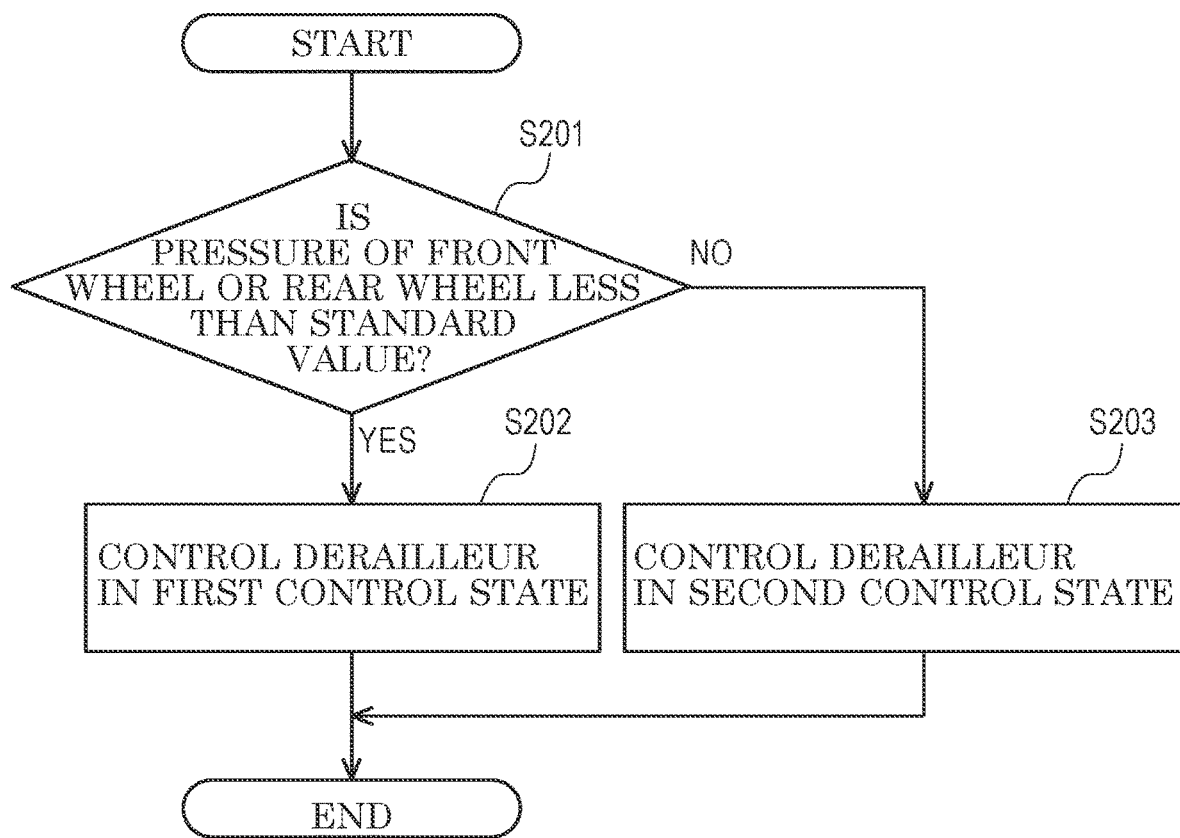
FIG. 22 is a flowchart illustrating a control process executed by an electronic controller of the human-powered vehicle control device based on the detection value of pressure in a sixth embodiment.

A sixth embodiment will be described below with reference to FIG. 22. In the sixth embodiment, the electronic controller 81 can control the derailleur in accordance with the detection value of the pressure of the tire detected by the pressure detector 91. The pressure detector 91 includes at least one of the first tire pressure detection device 85 and the second tire pressure detection device 86. The sixth embodiment is similar to the fourth embodiment except that a flowchart illustrated in FIG. 22 is used instead of the flowchart illustrated in FIG. 14. Therefore, the flowchart illustrated in FIG. 22 will be described.

In step S201, the electronic controller 81 determines whether the pressure of at least one tire of the front wheel 30 and the rear wheel 20 is less than the standard value. Upon determination that the pressure of at least one tire of the front wheel 30 and the rear wheel 20 is less than the standard value, the electronic controller 81 proceeds the processing to step S202. Upon determination that the pressures of both tires of the front wheel 30 and the rear wheel 20 are the standard value or more, the electronic controller 81 proceeds the processing to step S203.

In step S202, the electronic controller 81 starts control of the derailleur in a first control state described later. After performing the processing of step S202, the electronic controller 81 ends a control flow in FIG. 22.

In step S203, the electronic controller 81 starts control of the derailleur in a second control state described later. After performing the processing of step S203, the electronic controller 81 ends the control flow in FIG. 22.

Hereinafter, the first control state and the second control state will be specifically described. Processing performed by the electronic controller 81 in the first control state and the second control state according to the sixth embodiment is substantially similar to the processing performed by the electronic controller 81 in the first control state and the second control state according to the fourth embodiment. Therefore, in the following description, the same points as those of the fourth embodiment will be simplified, and different points will be described in detail.

In the first control state and the second control state according to the sixth embodiment, the electronic controller 81 can perform sixth processing described later in addition to first processing to fifth processing similar to those in the fourth embodiment. In the sixth embodiment, the electronic controller 81 can perform at least one of the first processing to the sixth processing.

In the first control state, the electronic controller 81 can perform first inhibition processing which is processing of permitting shift change by the one-stage transmission and inhibiting shift change by the multi-stage transmission. The electronic controller 81 can perform the second processing which is processing of making thresholds of the shift change in the automatic shift mode in the first control state and the second control state different. The electronic controller 81 includes an automatic shift mode, the electronic controller 81 controls the derailleur in a case where a reference value related to the traveling state of the human-powered vehicle 1 reaches a threshold determined in advance in the automatic shift mode, and the threshold determined in advance is different between in the first control state and in the second control state. Specifically, the electronic controller 81 includes the automatic shift mode, and the electronic controller 81 can control the derailleur in a case where the reference value related to the traveling state of the human-powered vehicle 1 reaches the threshold determined in advance in the automatic shift mode, and increase the threshold determined in advance in a case where the pressure of the tire is less than the standard value determined in advance. The reference value includes a value related to a cadence input to the human-powered vehicle 1, the threshold is a value related to the cadence, and the electronic controller 81 can increase the threshold in a case where the pressure of the tire is less than the standard value determined in advance.

The electronic controller 81 can perform the third processing which is processing of changing the rotational resistance force against the rotation of the pulley assembly 140 in the second rotational direction D2 by the damping mechanism 180 between the first control state and the second control state. Specifically, in a case where the pressure of the tire is less than a predetermined standard value, the electronic controller 81 can control the actuator 184 for the rotational resistance force to be in the first resistance force applying state. The pressure detector 91 includes at least one of the first tire pressure detection device 85 and the second tire pressure detection device 86. The actuator 184 can be an electric actuator.

The electronic controller 81 can perform fourth processing which is processing of making the shift routes used in the synch mode between the first control state and the second control state at least partially different. The electronic controller 81 controls the derailleur on the basis of the shift table T related to the transmission ratio. In a case where the pressure of the tire is less than a standard value determined in advance, the electronic controller 81 controls the derailleur in a third shift route based on the shift table T. In a case where the pressure of the tire is the standard value determined in advance or more, the electronic controller 81 controls the derailleur in a fourth shift route based on the shift table T. The third shift route and the fourth shift route are at least partially different from each other. The third shift route includes the upshifting route LU1 and the downshifting route LD1. The fourth shift route includes the upshifting route LU2 and the downshifting route LD2.

For example, an effective range of the transmission ratio in a chain engagement of the chain 53 with the second front sprocket state in the third shift route is larger than an effective range of the transmission ratio in the chain engagement of the chain 53 the second front sprocket state in the fourth shift route in a transmission order where the transmission ratio is increased. The third shift route includes the upshifting route LU1. The fourth shift route includes the upshifting route LU2.

The electronic controller 81 controls the derailleur on the basis of the shift table T related to the transmission ratio. In a case where the pressure of the tire is less than a standard value determined in advance, the electronic controller 81 controls the derailleur in the first shift route based on the shift table T. In a case where the pressure of the tire is the standard value determined in advance or more, the electronic controller 81 controls the derailleur in the second shift route based on the shift table T. The third shift route and the fourth shift route are at least partially different from each other. The first shift route includes the upshifting route LU1 and the downshifting route LD1. The second shift route includes an upshifting route LU2 and a downshifting route LD2.

For example, an effective range of the transmission ratio in a chain engagement of the chain 53 with the second front sprocket state in the first shift route is larger than an effective range of the transmission ratio in the chain engagement of the chain 53 the second front sprocket state in the second shift route in a transmission order where the transmission ratio is increased. The first shift route includes the upshifting route LU1. The second shift route includes the upshifting route LU2.

The electronic controller 81 can perform fifth processing which is processing of making a maximum value and a minimum value of the transmission ratio in the first control state and the second control state different. Since the first processing to the fifth processing are similar to those in the fourth embodiment, detailed description thereof is omitted.

The electronic controller 81 can perform the sixth processing which is processing of inhibiting or permitting the shift change by the multi-stage transmission at the time of upshifting to change the transmission ratio to be larger in the first control state and the second control state.

As a specific example, in the first control state, the electronic controller 81 can perform sixth inhibition processing which is processing of permitting the shift change by the one-stage transmission and inhibiting the shift change by the multi-stage transmission at the time of upshifting to change the transmission ratio to be larger. In a case where the pressure of the tire is less than a standard value determined in advance, the electronic controller 81 controls the derailleur to operate by the first shift amount within a predetermined shift period in response to the first operation input to the operation unit 84, and inhibits the derailleur to operate by the second shift amount larger than the first shift amount within the predetermined shift period in response to the second operation different from the first operation to increase the transmission ratio. As a result, the derailleur can be controlled in a suitable state in the first control state. In a case where the pressure of the tires of the human-powered vehicle 1 is low, the comfortability of the human-powered vehicle 1 can be improved by inhibiting the shift change by the multi-stage transmission that changes the transmission ratio to be larger.

In the second control state, the electronic controller 81 can perform sixth permission processing which is processing of permitting the shift change by the one-stage transmission and the shift change by the multi-stage transmission in a case where the transmission ratio is changed to be larger. As a result, the derailleur can be controlled in a suitable state in the second control state. In a case where the pressure of the tires of the human-powered vehicle 1 is large, the operability of the human-powered vehicle 1 can be improved by permitting the shift change by the multi-stage transmission.

The human-powered vehicle 1 according to the sixth embodiment includes the electronic controller 81 configured to control the derailleur mounted to the human-powered vehicle 1 in the first control state in a case where the detection value of pressure of at least one tire of the human-powered vehicle 1 detected by the pressure detector 91 detecting the pressure of the at least one tire of the human-powered vehicle is less than the standard value, and control the derailleur in the second control state different from the first control state in a case where the detection value is greater than or equal to the standard value. Thus, the derailleur can be automatically controlled in a suitable state on the basis of the pressure of the tire of the human-powered vehicle 1. In a case where the first processing to the sixth processing are performed in the first control state and the second control state in the sixth embodiment, the shift route, various thresholds, and the like used in each processing can be different from those in the fifth embodiment.

Seventh Embodiment

Figure 24:
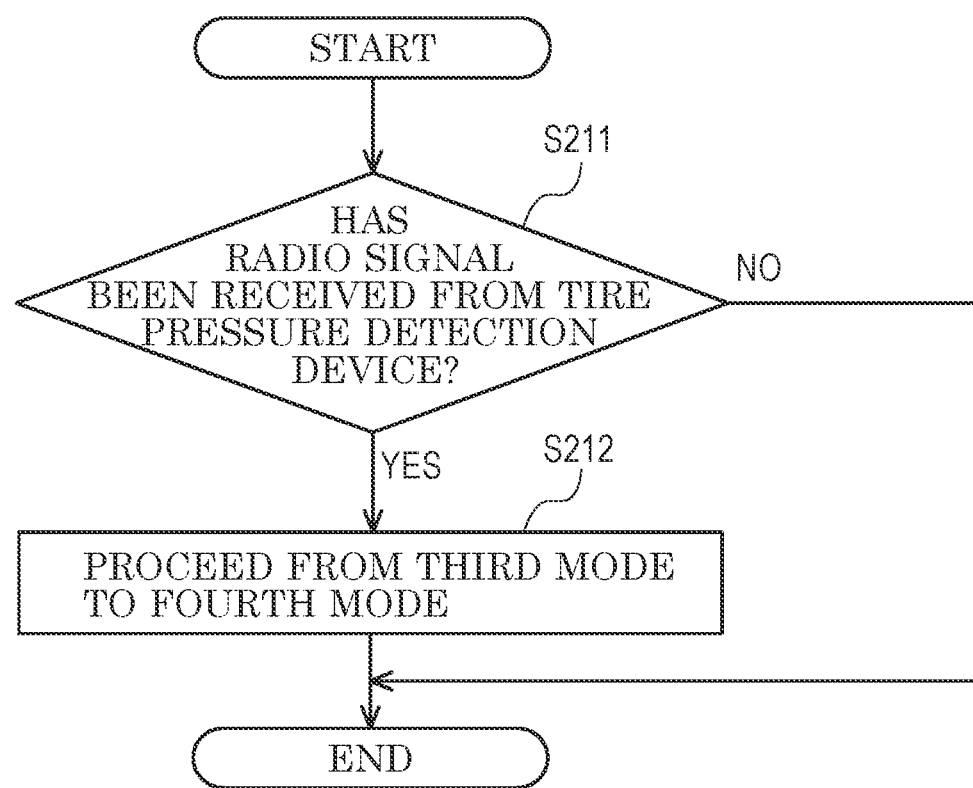
FIG. 24 is a flowchart illustrating a control process executed by an electronic controller of the human-powered vehicle control device based on a wireless (e.g., radio) signal from a tire pressure detection device.
Figure 25:
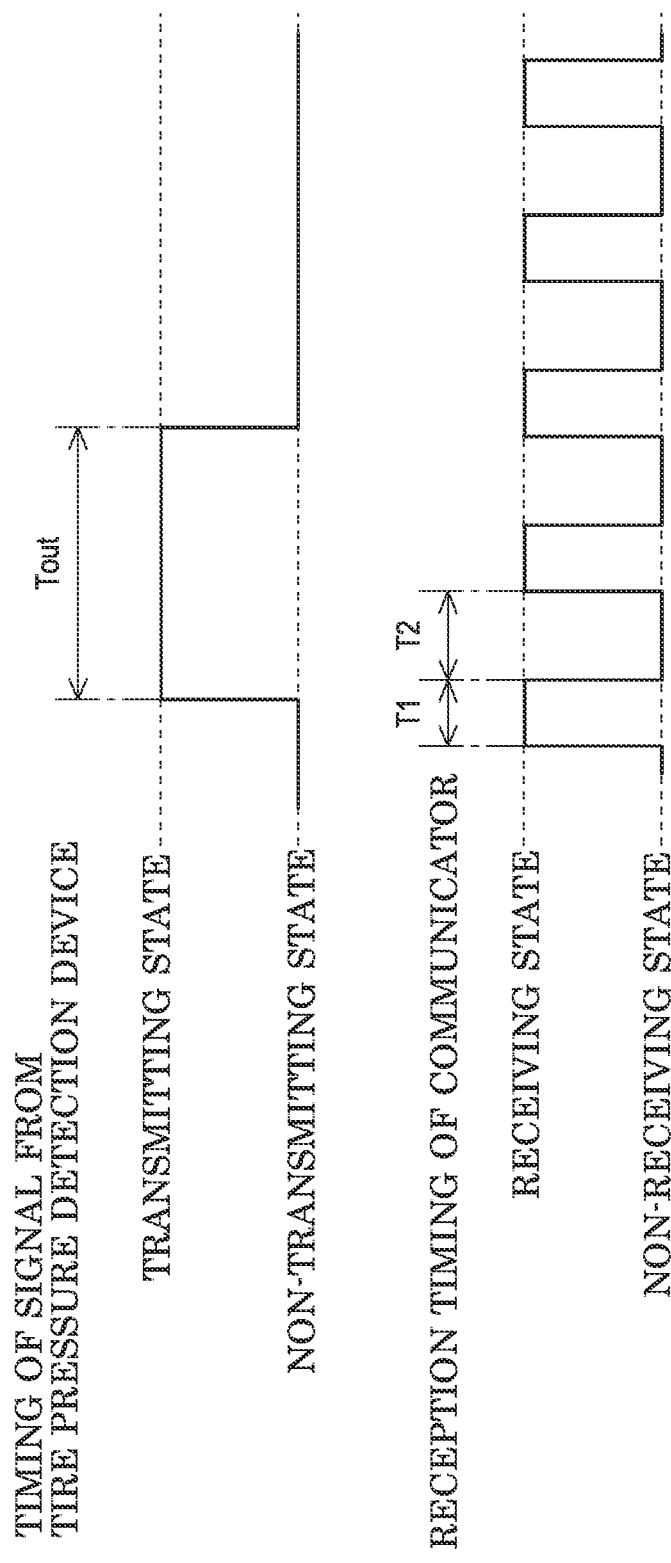
FIG. 25 is a time chart illustrating transmission and reception of signals between the tire pressure detection device and an electronic device.

A seventh embodiment will be described with reference to FIGS. 23 to 25. In the human-powered vehicle 1 according to the seventh embodiment, the configurations of the first tire pressure detection device 85, the second tire pressure detection device 86, and the rear derailleur 72 are different from those in the first embodiment, but the other configurations are similar to those in the first embodiment. Components common to those in the first embodiment are denoted by the same reference signs as those in the first embodiment, and description thereof will be omitted as appropriate.

Figure 23:
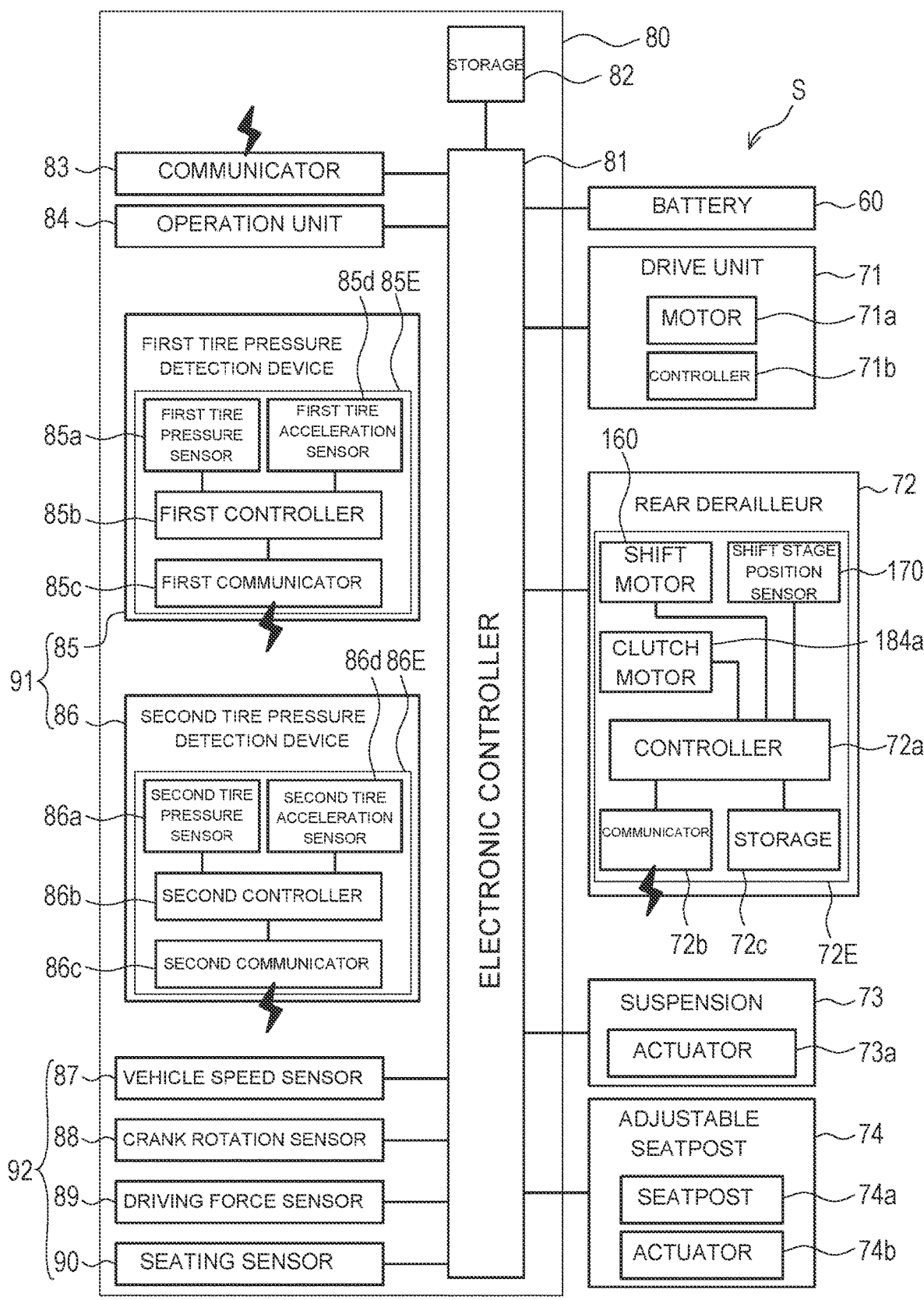
FIG. 23 is a block diagram of an electronic system included in the human-powered vehicle in a seventh embodiment.

The first tire pressure detection device 85 according to the seventh embodiment illustrated in FIG. 23 includes an electronic device 85E. The electronic device 85E includes the first tire pressure sensor 85a, the first controller 85b, the first communicator 85c, and a first tire acceleration sensor 85d. The first tire pressure sensor 85a, the first controller 85b, and the first communicator 85c have similar configurations to those in the first embodiment.

The first tire acceleration sensor 85d detects acceleration of the front wheel 30. The first tire acceleration sensor 85d is provided on the front wheel 30 and outputs information corresponding to angular acceleration of the front wheel 30.

The first controller 85b according to the seventh embodiment can change an operation mode of the first tire pressure detection device 85 between a first mode and a second mode. The power consumption of the first tire pressure detection device 85 in the first mode is smaller than the power consumption of the first tire pressure detection device 85 in the second mode. In the first mode, the first controller 85b suppresses power consumption without performing processing related to detection of the pressure of the tire. In the second mode, the first controller 85b performs processing related to detection of the pressure of the tire. The first mode corresponds to a sleep mode.

For example, in the second mode, the first controller 85b detects the pressure of the tire of the front wheel 30 by the first tire pressure sensor 85a, and outputs information on the detected pressure to the outside via the first communicator 85c. The first controller 85b outputs, for example, the information on the pressure to the electronic controller 81 and the communicator 72b of the rear derailleur 72 described later. For example, in the first mode, the first controller 85b does not detect the pressure of the tire of the front wheel 30 by the first tire pressure sensor 85a, and does not output a signal via the first communicator 85c.

The first controller 85b switches between the first mode and the second mode on the basis of a detection result of the acceleration by the first tire acceleration sensor 85d. In the first mode, in a case where the first tire acceleration sensor 85d detects acceleration that is a predetermined threshold or more, the first controller 85b proceeds from the first mode to the second mode. In a case where the acceleration detected by the first tire acceleration sensor 85d is a predetermined threshold or more, it is estimated that the front wheel 30 is rotating. In a case where it is estimated that the front wheel 30 is rotating, the first controller 85b can automatically proceed to the second mode.

In the second mode, in a case where the first tire acceleration sensor 85d does not detect acceleration that is the predetermined threshold or more for a predetermined time period and the signal output from the first tire pressure sensor 85a does not change for a predetermined time period, the first controller 85b proceeds from the second mode to the first mode. In a case where the first tire acceleration sensor 85d does not detect acceleration that is a predetermined threshold or more for a predetermined time period and the signal output from the first tire pressure sensor 85a does not change for a predetermined time period, it is estimated that the front wheel 30 is not rotating. In a case where it is estimated that the front wheel 30 is not rotating, the first controller 85b can automatically proceed to the first mode.

The second tire pressure detection device 86 according to the seventh embodiment includes an electronic device 86E. The electronic device 86E includes the second tire pressure sensor 86a, the second controller 86b the second communicator 86c, and a second tire acceleration sensor 86d. The second tire pressure sensor 86a has a configuration similar to the configuration of the first tire pressure sensor 85a. The second controller 86b has a configuration similar to the configuration of the first controller 85b. The second communicator 86c has a configuration similar to the configuration of the first communicator 85c. The second tire acceleration sensor 86d has a configuration similar to the configuration of the first tire acceleration sensor 85d. The configuration of the second tire pressure detection device 86 is similar to the configuration of the first tire pressure detection device 85 except that the second tire pressure detection device 86 is provided on the rear wheel 20 and detects the pressure of the tire of the rear wheel 20, and thus the detailed description of the configuration of the second tire pressure detection device 86 is omitted.

The rear derailleur 72 according to the seventh embodiment includes an electronic device 72E. The electronic device 72E includes the shift motor 160, the shift stage position sensor 170, the clutch motor 184a, an electronic controller 72a, the communicator 72b, and a storage 72c. Conceptually, the electronic device 72E can also include an information acquirer described later. The configurations of the shift motor 160, the shift stage position sensor 170, and the clutch motor 184a are similar to those in the first embodiment. The rear derailleur 72 according to the seventh embodiment communicates with other devices. The rear derailleur 72 according to the seventh embodiment is connected to the first tire pressure detection device 85 and the second tire pressure detection device 86 by wireless communication.

The electronic controller 72a controls the rear derailleur 72. The electronic controller 72a includes a calculation processor that executes a predetermined control program.

The communicator 72b is provided in the rear derailleur 72. The communicator 72b is provided, for example, in a fixing member 110, a movable member 120, or a link mechanism 130. The communicator 72b communicates with other devices. The communicator 72b is connected to the first communicator 85c of the first tire pressure detection device 85 and the second communicator 86c of the second tire pressure detection device 86 by wireless communication.

The storage 72c stores information used for various control programs and various control processing. The storage 82 includes, for example, a nonvolatile memory and a volatile memory.

The electronic controller 72a of the rear derailleur 72 can change an operation mode between a third mode and a fourth mode. The power consumption of the electronic controller 72a in the third mode is smaller than the power consumption of the electronic controller 72a in the fourth mode. For example, in the third mode, the electronic controller 72a suppresses power consumption without operating the shift motor 160 and the clutch motor 184a. The electronic controller 72a drives the shift motor 160 and the clutch motor 184a in response to a control signal from the electronic controller 81 in the fourth mode. In the third mode, the electronic controller 72a does not perform detection by the shift stage position sensor 170 and does not output a signal. In the fourth mode, the electronic controller 72a outputs a signal corresponding to the detection of the shift stage position sensor 170 to the electronic controller 81.

The electronic controller 72a can control the shift motor 160 and the clutch motor 184a on the basis of a wireless signal (e.g., a radio signal) directly received from the first tire pressure detection device 85 and the second tire pressure detection device 86. The electronic controller 72a can control the operation of the rear derailleur 72 based on at least one of the detection value of the pressure of the tire and the change in pressure of the tire, for example, as in the examples shown in the fourth, fifth, and sixth embodiments. In a case where the electronic controller 72a controls the operation of the rear derailleur 72 on the basis of at least one of the detection value of the pressure of the tire and the change in pressure of the tire, the electronic controller 72a can suitably control the rear derailleur 72.

In the fourth mode, the electronic controller 72a stores first information on the pressure of the tire detected by the first tire pressure detection device 85 and the second tire pressure detection device 86 in the storage 72c. The electronic controller 72a stores second information on at least one of information on the human-powered vehicle 1 and information on the human-powered vehicle component 70 in the storage 72c in the second mode. The electronic controller 72a stores the first information and the second information in the storage 72c in association with each other.

The electronic controller 72a can acquire the first information from the radio or wireless signal received from the first tire pressure detection device 85 and the second tire pressure detection device 86. The information on the human-powered vehicle 1 includes, for example, at least one of the vehicle speed, cadence, human driving force, and riding state of the human-powered vehicle 1. The first information acquirer 92 that acquires the information on the human-powered vehicle 1 includes at least one of the vehicle speed sensor 87, the crank rotation sensor 88, the driving force sensor 89, and the seating sensor 90.

The information on the human-powered vehicle component 70 includes, for example, at least one of information on an operation status of the drive unit 71, information on an operation status of the suspension 73, and information on an operation status of the adjustable seatpost 74. The information on the operation status of the drive unit 71 includes at least one of information on whether the propulsion of the human-powered vehicle 1 is assisted, information on the number of rotations of the motor 71a, information on temperature of the drive unit 71, information on temperature of the motor 71a, information on temperature of a control board, or information on an assist force. The information on the operation status of the suspension 73 includes at least one of information on the stroke, information on the damping force, information on the lockout state, and information on the unlocked state. The information on the operation status of the adjustable seatpost 74 includes information on a length of the seatpost 74*a*. The second information acquirer that acquires information on the human-powered vehicle component 70 includes an actuator provided in each component and a sensor provided in each component.

The electronic controller 72*a* receives information from the first information acquirer 92 and the second information acquirer via the electronic controller 81. The communicator 72*b* can directly receive the information from the first information acquirer 92 and the second information acquirer by wireless communication, and the electronic controller 72*a* can receive the information from the first information acquirer 92 and the second information acquirer via the communicator 72*b*.

The electronic device 72E includes the information acquirer configured to acquire at least one of the information on the human-powered vehicle 1 and the information on the human-powered vehicle component 70, and the storage 72*c* configured to store the first information detected by the pressure detector 91 and the second information acquired by the information acquirer in association with each other. The electronic device 72E includes the information acquirer configured to acquire at least one of the information on the human-powered vehicle 1 and the information on the component mounted to the human-powered vehicle 1, and the storage 72*c* configured to store the first information detected by the pressure detector 91 detecting pressure of at least one tire of the human-powered vehicle 1 and the second information acquired by the information acquirer in association with each other. The component includes a human-powered vehicle component 70. The pressure detector 91 includes at least one of the first tire pressure detection device 85 and the second tire pressure detection device 86. The information acquirer includes at least one of the first information acquirer 92 and the second information acquirer.

The information in which the first information and the second information stored in the storage 72*c* are associated with each other can be used by a user of the human-powered vehicle 1 to improve a riding technique of the human-powered vehicle 1 or used by a development company of the human-powered vehicle 1 for the development of the human-powered vehicle 1. The storage 72*c* stores, for example, information on a change in the operation status of the drive unit 71, the human driving force, and the like from the pressure of the tire in the inclined state of the human-powered vehicle 1.

The electronic device 72E for a human-powered vehicle includes the communicator 72*b* configured to wirelessly communicate with the pressure detector 91 detecting the pressure of at least one tire of the human-powered vehicle 1, the electronic device 72E being provided in the human-powered vehicle component 70 including at least one of the transmission mounted to the human-powered vehicle 1, the suspension 73 mounted to the human-powered vehicle 1, and the adjustable seatpost 74 mounted to the human-powered vehicle 1. The electronic device 72E for a human-powered vehicle wirelessly communicates with the pressure detector 91 that detects the pressure of at least one tire of the human-powered vehicle 1, and includes the communicator 72*b* provided in the human-powered vehicle component 70 mounted to the human-powered vehicle 1. The electronic device 72E for a human-powered vehicle includes the communicator 72*b* configured to wirelessly communicate with the pressure detector 91 that detects the pressure of at least one tire of the human-powered vehicle 1. The pressure detector 91 includes at least one of the first tire pressure detection device 85 and the second tire pressure detection device 86. The electronic device 72E further includes the electronic controller 72*a* configured to control the human-powered vehicle component 70 in accordance with the information received by the communicator 72*b* from the pressure detector 91.

The electronic controller 72*a* proceeds from the third mode to the fourth mode on the basis of a wireless signal (e.g., a radio signal) from at least one of the first tire pressure detection device 85 and the second tire pressure detection device 86. FIG. 24 is a flowchart illustrating an example of a control flow in which the operation mode of the electronic controller 72*a* proceeds from the third mode to the fourth mode in response to the radio or wireless signal from at least one of the first tire pressure detection device 85 and the second tire pressure detection device 86. The electronic controller 72*a* performs the processing of the flowchart illustrated in FIG. 24 in the third mode.

In step S211, the electronic controller 72*a* determines whether a radio or wireless signal has been received from at least one of the first tire pressure detection device 85 and the second tire pressure detection device 86. The radio or wireless signal includes a signal related to the pressure of the tire detected by the first tire pressure detection device 85 or the second tire pressure detection device 86 in the second mode. In a case where the electronic controller 72*a* receives a radio or wireless signal from at least one of the first tire pressure detection device 85 and the second tire pressure detection device 86, it is estimated that the human-powered vehicle 1 is travelling.

Upon determination that a radio or wireless signal has been received from at least one of the first tire pressure detection device 85 and the second tire pressure detection device 86, the electronic controller 72*a* proceeds to step S212. Upon determination that a radio or wireless signal has not been received from at least one of the first tire pressure detection device 85 and the second tire pressure detection device 86, the electronic controller 72*a* ends the control flow in FIG. 24.

In step S212, the electronic controller 72*a* proceeds the operation mode from the third mode to the fourth mode. For example, the electronic controller 72*a* controls the operation of the shift motor 160 and the clutch motor 184*a* in response to a signal from the electronic controller 81 in the fourth mode. After performing the processing of step S212, the electronic controller 72*a* ends the control flow in FIG. 24.

The electronic controller 72*a* has a configuration in which a power consumption state is switched between a first power state and a second power state having a higher power consumption than the first power state, and the first power state is switched to the second power state upon receipt of a radio or wireless signal from the pressure detector 91 by the communicator 72*b* in the first power state. The pressure detector 91 includes at least one of the first tire pressure detection device 85 and the second tire pressure detection device 86. The first power state of the electronic controller 72*a* corresponds to the third mode of the electronic controller 72*a*. The second power state of the electronic controller 72*a* corresponds to the fourth mode of the electronic controller 72*a*.

The electronic controller 72*a* switches the control mode from the fourth mode to the third mode again in a case where a predetermined condition is satisfied after the control mode is switched from the third mode to the fourth mode. For example, the electronic controller 72a can switch the control mode from the fourth mode to the third mode in at least one of a case where a radio or wireless signal is not received from the first tire pressure detection device 85 and the second tire pressure detection device 86 for a predetermined time period or more and a case where a predetermined operation is performed by the operation unit 84.

Processing of wireless communication between the first tire pressure detection device 85 and the second tire pressure detection device 86 and the electronic device 72E of the rear derailleur 72 will be described with reference to FIG. 25. FIG. 25 is a time chart illustrating transmission timings of radio or wireless signals transmitted by the first tire pressure detection device 85 and the second tire pressure detection device 86 and reception timings at which the communicator 72b of the electronic device 72E receives signals. As illustrated in FIG. 25, the communicator 72b of the electronic device 72E intermittently receives a radio or wireless signal. The communicator 72b continues a first state for reception time T1 and continues a second state for non-reception time T2. The communicator 72b repeatedly switches between the first state in which a signal can be received and the second state in which a signal cannot be received. The reception time T1 can be the same as the non-reception time T2, can be shorter than the non-reception time T2, or can be longer than the non-reception time T2.

When outputting a signal to the communicator 72b, the first tire pressure detection device 85 and the second tire pressure detection device 86 continuously output a signal for transmission time Tout set in advance. The transmission time Tout is longer than the non-reception time T2 of the communicator 72b. The transmission time Tout is preferably longer than the non-reception time T2 of the communicator 72b by 1.5 times or more. The communicator 72b intermittently receives a radio or wireless signal from the pressure detector 91, and has the non-reception time T2 shorter than the transmission time Tout of a signal by the pressure detector 91.

Since the communicator 72b intermittently receives a signal, the power consumption of the communicator 72b can be suppressed. Setting the transmission time Tout longer than the non-reception time T2 facilitate a reception of a signal output from at least one of the first tire pressure detection device 85 and the second tire pressure detection device 86.

In the seventh embodiment, an example is illustrated in which the electronic device 72E is provided in the rear derailleur 72. Alternatively, an electronic device similar to the electronic device 72E can be provided in the human-powered vehicle component 70 other than the rear derailleur 72. For example, an electronic device similar to the electronic device 72E can be provided in at least one of the drive unit 71, the suspension 73, the adjustable seatpost 74, and the front derailleur 75. In a case where the human-powered vehicle component 70 includes an electronic device similar to the electronic device 72E, the operation can be controlled on the basis of the radio or wireless signal directly received from the first tire pressure detection device 85 and the second tire pressure detection device 86 regardless of the signal from the electronic controller 81.

An electronic device similar to the electronic device 72E can be provided in the control device 80, not necessarily in the human-powered vehicle component 70. The control device 80 can proceed from the third mode to the fourth mode in response to the radio or wireless signal from the first tire pressure detection device 85 and the second tire pressure detection device 86. The first information and the second information can be stored in association with each other in the storage 82 of the control device 80.

Eighth Embodiment

The electronic device 85E and the electronic device 86E according to an eighth embodiment will be described with reference to FIG. 26. The electronic device 85E and the electronic device 86E according to the eighth embodiment are provided not in the rear derailleur 72 but in at least one of the first tire pressure detection device 85 and the second tire pressure detection device 86. At least one of the first tire pressure detection device 85 and the second tire pressure detection device 86 proceeds from the first mode to the second mode in response to a radio or wireless signal from an external device. A basic configuration of the first tire pressure detection device 85 according to the eighth embodiment is similar to that of the first tire pressure detection device 85 according to the seventh embodiment. A basic configuration of the second tire pressure detection device 86 according to the eighth embodiment is similar to that of the second tire pressure detection device 86 according to the seventh embodiment. Processing for proceeding at least one of the first tire pressure detection device 85 and the second tire pressure detection device 86 from the first mode to the second mode will be described with reference to FIG. 26.

Figure 26:
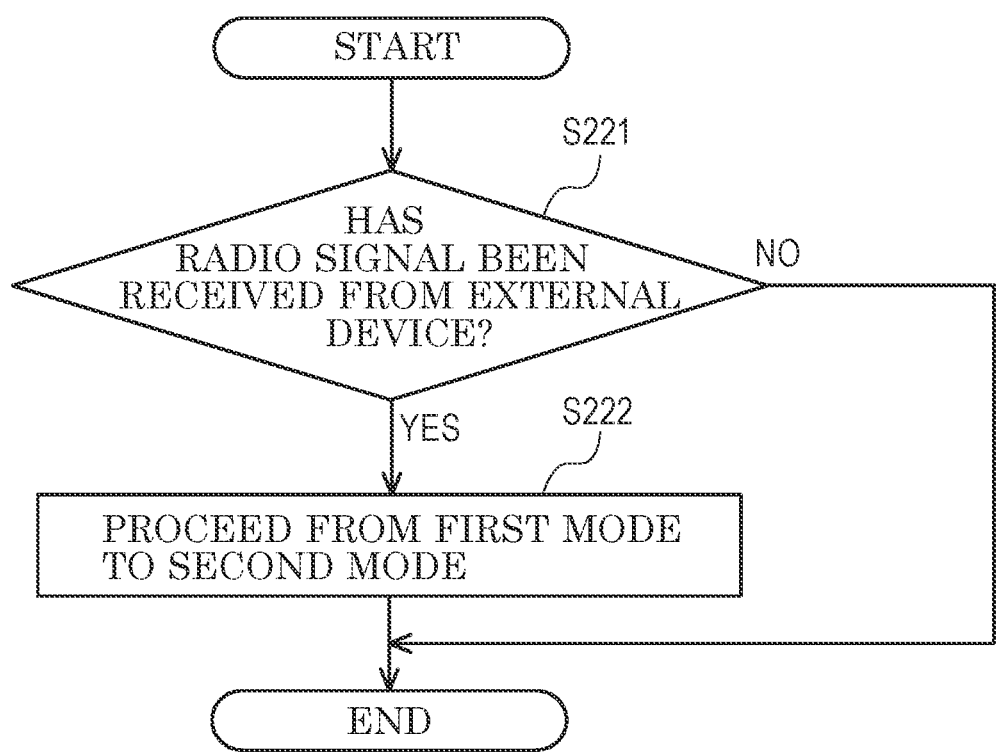
FIG. 26 is a flowchart illustrating a control process executed by an electronic controller of the human-powered vehicle control device based on a wireless (e.g., radio) signal from an external device in an eighth embodiment.

FIG. 26 is a flowchart illustrating an example of a control flow for proceeding to the second mode in response to a radio or wireless signal from an external device in a case where the operation mode of the first tire pressure detection device 85 is the first mode. The first controller 85b performs the processing of the flowchart illustrated in FIG. 26 in the first mode.

In step S221, the first controller 85b determines whether a radio or wireless signal has been received from an external device. The external device serving as a transmission source of the radio or wireless signal includes various devices. For example, the external device includes the operation unit 84, the electronic controller 81, and the like provided in the human-powered vehicle 1. In a case where the user performs a predetermined operation on the operation unit 84, the first tire pressure detection device 85 receives a radio or wireless signal directly output from the operation unit 84 and a radio or wireless signal output from the communicator 83 by the electronic controller 81 on the basis of the operation of the operation unit 84.

The external device includes a device other than the devices provided in the human-powered vehicle 1. For example, the external device includes a portable communication device or the like owned by the user of the human-powered vehicle 1. Specifically, in a case where a predetermined operation is performed by a portable terminal, the first tire pressure detection device 85 can receive a radio or wireless signal output from the portable communication device. The portable communication device includes, for example, a smartphone or a tablet computer.

Upon determination that the first communicator 85c has received a radio or wireless signal from an external device, the first controller 85b proceeds the processing to step S222. Upon determination that a radio or wireless signal has not been received from an external device, the first controller 85b ends the control flow in FIG. 26.

In step S222, the first controller 85b proceeds from the first mode to the second mode. In the second mode, the first controller 85b detects the pressure of the tire of the front wheel 30 by the first tire pressure sensor 85a, and outputs a signal according to the detected pressure to the outside by wireless communication. After performing the processing of step S222, the first controller 85*b* ends the control flow in FIG. 26.

In the second mode, the first controller 85*b* can proceeds to the first mode again in a predetermined case. For example, the first controller 85*b* proceeds the control mode from the second mode to the first mode in at least one of a case where the first tire acceleration sensor 85*d* does not detect acceleration that is a predetermined threshold or more for a predetermined time period, a case where a radio or wireless signal is not received from the external device for a predetermined time period or more, and a case where a predetermined operation is performed by the operation unit 84.

In the eighth embodiment, in a case where the first tire pressure detection device 85 transmits and receives a radio or wireless signal to and from an external device, the first tire pressure detection device 85 can intermittently transmit and receive a signal as in the seventh embodiment.

The electronic device 85E is the electronic device 85E for a human-powered vehicle, the electronic device 85E including the pressure detector 91 configured to detect the pressure of at least one tire of the human-powered vehicle 1, and the communicator configured to wirelessly communicate with an external device, in which the pressure detector 91 has a configuration in which the power consumption state is switched between the first power state and the second power state having a higher power consumption than the first power state, and the first power state is switched to the second power state upon receipt of a radio or wireless signal from the external device by the communicator in the first power state. The pressure detector 91 includes at least one of the first tire pressure detection device 85 and the second tire pressure detection device 86. The communicator includes at least one of the first communicator 85*c* and the second communicator 86*c*.

Although the processing in which the first tire pressure detection device 85 proceeds from the first mode to the second mode has been described with reference to FIG. 26, the second tire pressure detection device 86 can also proceed from the first mode to the second mode on the basis of a radio or wireless signal from an external device, similarly to the first tire pressure detection device 85.

The electronic system S can include at least one of the electronic device 72E, the electronic device 85E, and the electronic device 86E according to the seventh embodiment and at least one of the electronic device 85E and the electronic device 86E according to the eighth embodiment. The electronic system S can include the electronic device 72E according to the seventh embodiment, and the pressure detector 91 or the electronic device 85E and the electronic device 86E according to the eighth embodiment. The electronic system S can include the electronic device 72E and at least one of the electronic device 85E and the electronic device 86E. In a case where the electronic system S includes the electronic device 72E and at least one of the electronic device 85E and the electronic device 86E, at least one of the first tire pressure detection device 85 and the second tire pressure detection device 86 proceeds from the first mode to the second mode in response to a radio or wireless signal from the external device, and the rear derailleur 72 proceeds from the third mode to the fourth mode in response to a radio or wireless signal from at least one of the first tire pressure detection device 85 and the second tire pressure detection device 86.

Modifications

The description about the embodiments exemplifies forms that can be taken by a human-powered vehicle control device, an electronic device, and an electronic system according to the present invention, and is not intended to limit the present invention. The human-powered vehicle control device, the electronic device, and the electronic system according to the present invention can take a form in which, for example, the following modifications of the embodiments and at least two modifications that do not contradict each other are combined.

For example, the configuration of the human-powered vehicle 1 according to each embodiment is an example. The human-powered vehicle 1 can include various devices not illustrated in each embodiment, and do not have to include some of the various devices illustrated in each embodiment. In each embodiment, the rear derailleur 72 and the front derailleur 75 are illustrated as the transmission device, but the transmission device can include a configuration other than the derailleur. For example, the transmission device can include an internal transmission device.

The configurations exemplified in each embodiment can be combined with each other within a range not contradictory to each other. It is not necessary to implement all of the flowcharts illustrated in each embodiment, and it is possible to appropriately omit the processing of some of the flowcharts. The processing contents and the processing order of the flowcharts exemplified in each embodiment are merely examples, and the processing contents and the processing order can be appropriately changed within the scope of the present invention.

Various thresholds used in the control exemplified in the embodiment are not limited, and can be arbitrarily set. Various thresholds can be arbitrarily changed by an operation of the operation unit 84 or the like.

The shift table T exemplified in each embodiment is an example, and the specific content of the shift table T is not limited. For example, the number and the number teeth of rear sprockets and front sprockets can be arbitrarily changed. The shift route illustrated in the shift table T is an example and is not limited. The shift route can be arbitrarily changed by an operation of the operation unit 84 or the like. The timing chart illustrated in FIG. 25 is an example, and the transmission timing and the reception timing of radio or wireless signals can be arbitrarily changed.

In each embodiment, various controls corresponding to the state of the human-powered vehicle 1 and the state of the road surface are exemplified. In the control, physical quantities by which the state of the human-powered vehicle 1 and the state of the road surface can be estimated based on a detection result of one or more sensors, and the control can be performed on the basis of the detection result. For example, the physical quantities for estimating the pressure of the tire, the change amount of the pressure of the tire, the state of the human-powered vehicle 1, and the state of the road surface are not limited to the physical quantities exemplified in each embodiment, and each state can be estimated from various other physical quantities. The various other physical quantities include, for example, at least one of vibration, impact, and acceleration.

The expression "at least one" as used herein means "one or more" of the desired options. As an example, the expression "at least one" as used herein means "only one option" or "both of two options" if the number of options is two. As another example, the expression "at least one" as used herein means "only one option" or "a combination of two or more arbitrary options" if the number of options is three or more.

What is claimed is:

1. An electronic device for a human-powered vehicle, the electronic device comprising:

a communicator configured to wirelessly communicate with a pressure detector detecting pressure of at least one tire of the human-powered vehicle, the electronic device being configured to be provided in a human-powered vehicle component including at least one of a transmission mounted to the human-powered vehicle, a suspension mounted to the human-powered vehicle, and an adjustable seatpost mounted to the human-powered vehicle;

an electronic controller configured to output a signal to control the human-powered vehicle component in accordance with information received by the communicator from the pressure detector, the electronic controller having a configuration in which a power consumption state is switched between a mode having a first power state and another mode having a second power state with a higher power consumption than the first power state, the electronic controller switching the mode having the first power state to the another mode having the second power state upon receipt of a wireless signal from the pressure detector by the communicator where the electronic controller is in the mode having the first power state;

an information acquirer configured to acquire at least one of information on the human-powered vehicle and information on the human-powered vehicle component; and a storage configured to store both first information detected by the pressure detector and second information acquired by the information acquirer, such that the first information detected by the pressure detector and the second information acquired by the information acquirer are stored in association with each other when in the another mode having the second power state such that a change in the first information detected by the pressure detector results in a predetermined change in the human-powered vehicle component, the change in the first information detected by the pressure detector being caused by operation of an operable input device, and the storage configured to store the change in the first information as a change in operation status.

2. The electronic device according to claim 1, wherein the communicator is configured to intermittently receive a wireless signal from the pressure detector, and has a non-reception time shorter than a transmission time of a signal by the pressure detector.

3. An electronic system comprising the electronic device according to claim 1, and further comprising:
the pressure detector.

4. An electronic device for a human-powered vehicle, the electronic device comprising:
a communicator configured to wirelessly communicate with a pressure detector detecting pressure of at least one tire of the human-powered vehicle and provided in a human-powered vehicle component mounted to the human-powered vehicle, the communicator being configured to intermittently receive a wireless signal from the pressure detector, and having a non-reception time shorter than a transmission time of a signal by the pressure detector;

an electronic controller configured to output a signal to control the human-powered vehicle component in accordance with information received by the communicator from the pressure detector, the electronic controller having a configuration in which a power consumption state is switched between a mode having a first power state and another mode having a second power state with a higher power consumption than the first power state, the electronic controller switching the mode having the first power state to the another mode having the second power state upon receipt of a wireless signal from the pressure detector by the communicator where the electronic controller is in the mode having the first power state;

an information acquirer configured to acquire at least one of information on the human-powered vehicle and information on the human-powered vehicle component; and a storage configured to store both first information detected by the pressure detector and second information acquired by the information acquirer, such that the first information detected by the pressure detector and the second information acquired by the information acquirer are stored in association with each other when in the another mode having the second power state such that a change in the first information detected by the pressure detector results in a predetermined change in the human-powered vehicle component, the change in the first information detected by the pressure detector being caused by operation of an operable input device, and the storage configured to store the change in the first information as a change in operation status.

5. An electronic system comprising the electronic device according to claim 4, and further comprising:
the pressure detector.

6. An electronic device for a human-powered vehicle, the electronic device comprising:
a communicator configured to wirelessly communicate with a pressure detector detecting pressure of at least one tire of the human-powered vehicle; and an electronic controller configured to control a human-powered vehicle component in accordance with information received by the communicator from the pressure detector, the electronic controller having a configuration in which a power consumption state is switched between a mode having a first power state and another mode having a second power state having a higher power consumption than the first power state, and the first power state is switched to the second power state upon receipt of a wireless signal from the pressure detector by the communicator where the electronic controller is in the first power state;

an information acquirer configured to acquire at least one of information on the human-powered vehicle and information on the human-powered vehicle component; and a storage configured to store both first information detected by the pressure detector and second information acquired by the information acquirer, such that the first information detected by the pressure detector and the second information acquired by the information acquirer are stored in association with each other when in the another mode having the second power state such that a change in the first information detected by the pressure detector results in a predetermined change in the human-powered vehicle component, the change in the first information detected by the pressure detector being caused by operation of an operable input device, and the storage configured to store the change in the first information as a change in operation status.

7. An electronic system comprising the electronic device according to claim 6, and further comprising:
the pressure detector.

8. An electronic device for a human-powered vehicle, the electronic device comprising:
an information acquirer configured to acquire at least one of information on the human-powered vehicle and information on a component mounted to the human-powered vehicle;
an electronic controller configured to output a signal to control a human-powered vehicle component, the electronic controller having a configuration in which a power consumption state is switched between a mode having a first power state and another mode having a second power state with a higher power consumption than the first power state,
the mode having the first power state being switched to the another mode having the second power state upon receipt of a wireless signal from the pressure detector by the communicator where the electronic controller is in the mode having the first power state; and
a storage configured to store both first information detected by a pressure detector detecting pressure of at least one tire of the human-powered vehicle and second information acquired by the information acquirer, such that the first information detected by the pressure detector and the second information acquired by the information acquirer are stored in association with each other when in the another mode having the second power state such that a change in the first information detected by the pressure detector results in a predetermined change in the human-powered vehicle component,
the change in the first information detected by the pressure detector being caused by operation of an operable device, and the storage configured to store the change in the first information as a change in operation status.

9. An electronic system comprising the electronic device according to claim 8, and further comprising:
the pressure detector.

10. An electronic device for a human-powered vehicle, the electronic device comprising:
a pressure detector configured to detect pressure of at least one tire of the human-powered vehicle;
a communicator configured to wirelessly communicate with an external device,
the pressure detector having a configuration in which a power consumption state is switched between a first mode having a first power state and another mode having a second power state having a higher power consumption than the first power state, and
the first power state is switched to the second power state upon receipt of a wireless signal from the external device by the communicator where the pressure detector is in the first power state; and
a storage configured to store both first information detected by the pressure detector and second information acquired by the information acquirer, such that the first information detected by the pressure detector and the second information acquired by the information acquirer are stored in association with each other when in the another mode having the second power state such that a change in the first information detected by the pressure detector results in a predetermined change in a human-powered vehicle component,
the change in the first information detected by pressure detector being caused by operation of an operable input device, and the storage configured to store the change in the first information as a change in operation status.

* * * * *